United States Patent [19]

Hoshi

[11] Patent Number: 5,461,523
[45] Date of Patent: Oct. 24, 1995

[54] DISC UNIT HAVING A DRIVE MOTOR AND A CHUCKING ASSEMBLY FOR HOLDING A DISC THEREWITH

[75] Inventor: Akio Hoshi, Chichibu, Japan

[73] Assignee: Canon Denshi Kabushiki Kaisha, Saitama, Japan

[21] Appl. No.: 226,421

[22] Filed: Jan. 21, 1994

Related U.S. Application Data

[63] Continuation of Ser. No. 913,747, Jul. 16, 1982, abandoned, which is a continuation of Ser. No. 392,045, Aug. 10, 1989, abandoned.

[30] Foreign Application Priority Data

| Aug. 12, 1988 | [JP] | Japan | 63-200047 |
| Aug. 24, 1988 | [JP] | Japan | 63-208057 |
| Dec. 15, 1988 | [JP] | Japan | 63-314891 |
| Feb. 17, 1989 | [JP] | Japan | 1-036099 |
| Mar. 18, 1989 | [JP] | Japan | 1-067361 |

[51] Int. Cl.⁶ .................... G11B 17/03; G11B 19/20; G11B 33/12
[52] U.S. Cl. .................... 360/99.12; 360/99.08; 360/99.05; 360/99.04; 369/270; 369/271
[58] Field of Search ............ 360/97.01, 98.07, 360/98.08, 99.01, 99.02, 99.03, 99.04, 99.05, 99.06, 99.07, 99.08, 99.09, 99.11, 99.12; 369/261, 270, 271

[56] References Cited

U.S. PATENT DOCUMENTS

| 3,891,716 | 6/1975 | Takahara et al. | 360/99.05 |
| 4,445,155 | 4/1984 | Takahashi et al. | 360/99 |
| 4,581,667 | 4/1986 | Gerfast | 360/97 |
| 4,654,725 | 3/1987 | Wakaizumi | 360/99.08 |
| 4,654,733 | 3/1987 | Kawakami et al. | 360/99 |
| 4,688,125 | 8/1987 | Nomoto et al. | 360/99.02 |
| 4,788,464 | 11/1988 | Nishikawa et al. | 310/268 |
| 4,805,054 | 2/1989 | Kamoto et al. | 360/99.08 |
| 4,874,976 | 10/1989 | Ohsawa et al. | 360/97.01 |
| 4,899,244 | 2/1990 | Morse | 360/99.12 |
| 4,989,107 | 1/1991 | Tsukahara | 360/99.12 |
| 5,128,818 | 7/1992 | Koizumi et al. | 360/99.04 |

FOREIGN PATENT DOCUMENTS 63-281267 11/1988 Japan .................. 360/99.12

OTHER PUBLICATIONS

Translation of Japanese Kokai Patent Publication No. 63-281267.

Primary Examiner—Robert J. Pascal
Assistant Examiner—Craig A. Renner
Attorney, Agent, or Firm—Spencer, Frank & Schneider

[57] ABSTRACT

A disc unit includes a control circuit board engaged with a base body of the disc unit, and a shield cover for noise shielding. The shield cover is also used for preventing the separation of mounting tabs extending from the circuit board and the base body by pressing them to hold the circuit board on the base body. Furthermore the shield cover is used as reinforcement for preventing the base body from distorting. With such a structure, the control circuit board is held on the base body by pressure of the shield cover so that multiple fixing members such as screws for fixing the control circuit board can be omitted. Further, since the base body is reinforced by the shield cover, the prevention of distortion of the base body is performed without increasing the thickness of the unit. The disc unit also includes a direct drive motor having a rotor yoke which receives the disc, which rotates a spindle shaft that engages the central opening of the disc. The rotor yoke is integrally provided with a chucking mechanism for the disc.

14 Claims, 49 Drawing Sheets

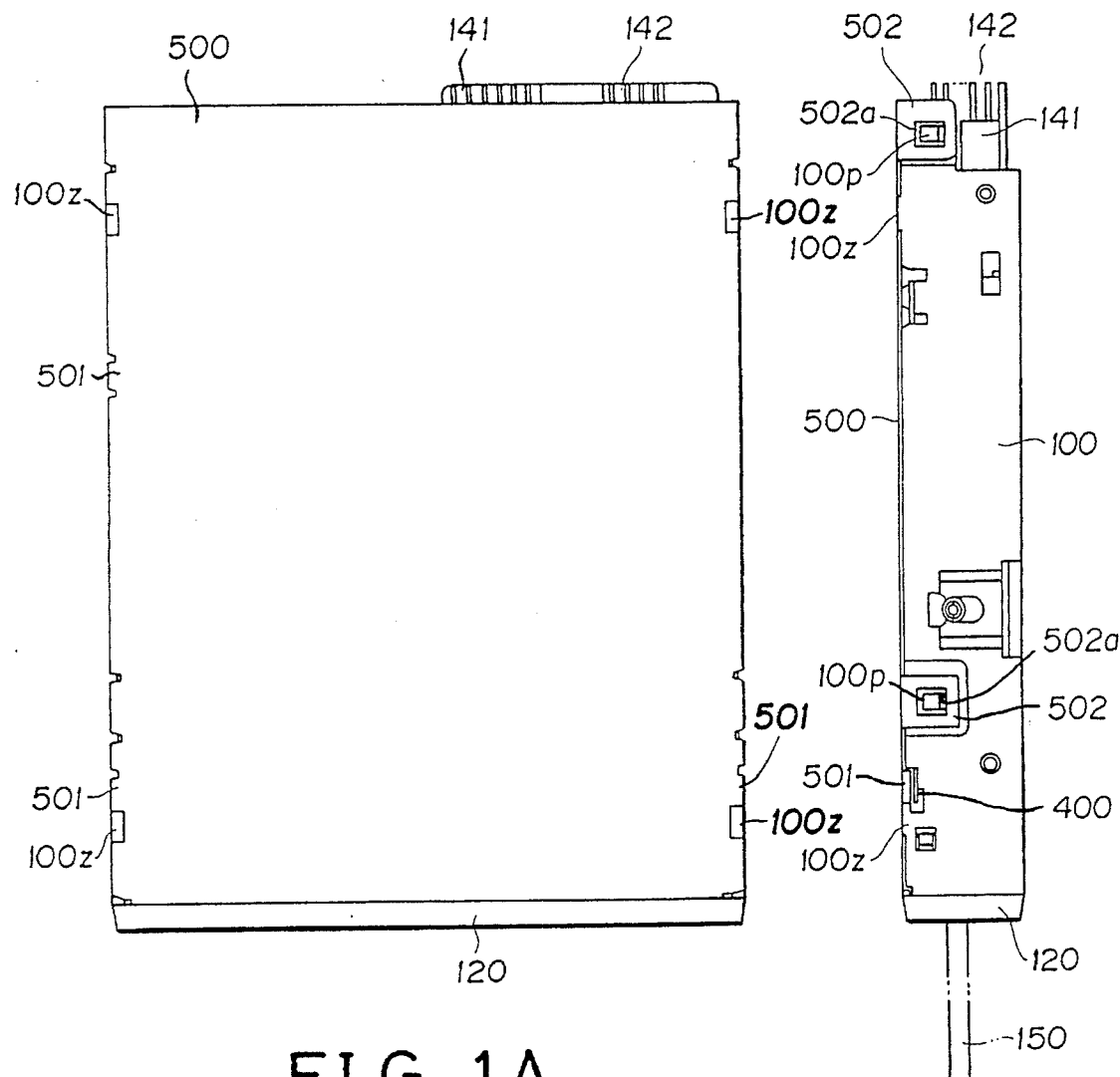
FIG. 1A
FIG. 1B
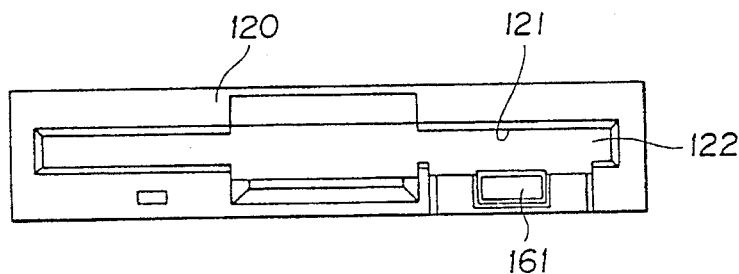
FIG. 1D

DISC UNIT HAVING A DRIVE MOTOR AND A CHUCKING ASSEMBLY FOR HOLDING A DISC THEREWITH

This application is a continuation of application Ser. No. 07/913,747, filed Jul. 16, 1992, now abandoned, which was a continuation of application Ser. No. 07/392,045, filed Aug. 10, 1989, now abandoned.

BACKGROUND OF THE INVENTION

1. Field of the Invention

The present invention relates to a disc unit which drives a motor to rotate a disc used as a recording medium, and records information on the rotating disc and reads out recorded information therefrom.

2. Description of the Prior Art

As a typical disc unit, a floppy disc drive unit (referred to as FDD hereinafter) is known. The FDD records information on a magnetic disc assembly having a flexible disc shaped recording medium, a so-called "floppy disc," and reads recorded information therefrom. The FDD is structured to allow the insertion and ejection of the magnetic disc, to rotate the magnetic disc by means of a motor and to record and read out information by slidingly contacting a magnetic head on the magnetic disc. A typical FDD includes a base or a chassis for supporting constituent members. On the base or chassis are a disc insertion and ejection mechanism used for the insertion and ejection of the magnetic disc, a disc drive mechanism for driving a motor to rotate the magnetic disc, a head seek mechanism for moving a magnetic head to an arbitrary position in a radial direction of the magnetic disc, and a head load mechanism for loading and unloading the magnetic head on the disc. Further, the FDD is provided with a main control circuit board having a control circuit for controlling the overall FDD, a motor control circuit board having a drive control circuit used for the disc drive motor, a connector for interface to a host apparatus, and a connector for a power source or the like.

The FDD as described above is used as an external recording device for a host electronic apparatus such as a personal computer, a word processor or the like. The FDD can be structured as an independent single device, but in most cases it is structured to be incorporated in the main body of a host electronic apparatus. In recent years, progress has been made in making the electronic apparatus incorporating the FDD miniature and portable. In line with such progress, there are strong needs for miniaturization, thinning, and weight reduction of the FDD as well.

Conventionally, the FDD has a base body which is made by die-casting and has a complicated cross section. In contrast, one can consider making the base body from sheeting to provide an FDD which is thin, light, miniature and less expensive, with the cross section of the base body being of simple form, for example, U-shaped in the direction of width thereof.

One can also consider employing a thin shield cover for shielding noises, and using a light weight material which is comparatively inferior in strength, such as aluminum.

However, in the case of the base body as described above, sufficient mechanical strength cannot be obtained. Specifically, when an FDD having such base body is incorporated and mounted in the host electronic apparatus, there is a possibility of a strain therein which is caused by stress. The strain in the base body causes displacement of the constituent members of the FDD. A problem associated with this is that recording or reading out is not performed accurately and excellently, so that reliability suffers.

To eliminate the problem as described above, one might consider using a thick shield cover made from a material such as an iron plate having relatively large strength for mounting the base body for reinforcement. However, it is impossible to make the FDD miniaturized, thin and light in weight in this manner.

In the meantime, naturally, there is a further need for cost reduction which might be realized by reducing the number of components of the FDD, other than the FDD of a miniaturized, thin and light weight type. In the case of the conventional FDD, there is room for improvements including reduction in the number of components of the FDD, because it uses three screws for mounting a main control circuit board on the base body.

By the way, a rotating driving portion for rotating a disc includes a disc drive motor and a chucking mechanism for holding the disc and for transmitting to the disc a rotational driving force from the disc drive motor. In the conventional FDD, a spindle which is an output rotation shaft of a motor such as a direct drive motor (referred to as a DD motor hereinafter) has a top end to which a disc shaped spindle hub is secured. The chucking mechanism is provided in the spindle hub basing on the hub. Recording or reading out is performed in such a manner that while holding the disc on the spindle hub, the DD motor is driven to rotate the disc, and a magnetic head is brought into contact with the disc.

However, as described above, it would be desirable to make the conventional FDD thinner and miniaturized since it may be incorporated into a portable personal computer or a word processor. Since the conventional FDD has a DD motor provided with the spindle hub on its top end and the chucking mechanism is provided on the hub, it is hard to reduce the height of the whole rotating driving portion consisting of the DD motor and the chucking mechanism, which form the main portion of the FDD. This is an obstacle to making the whole FDD thin.

Further, when a belt driving system is applied to the rotating driving portion for rotating the disc, a pulley must be mounted in the rotating driving portion for receiving the motor driving force through a belt. This causes a difficulty in miniaturizing and thinning the rotating driving portion.

Additionally, to reduce electric power consumption, a DD motor having a pair of rotors can be employed when the direct driving system is applied to the driving portion for rotating the disc. It is desired that the rotating driving portion be miniaturized and made thin in this case also.

SUMMARY OFT HE INVENTION

The first object of the present invention is to provide a disc unit which is miniaturized, thin and light in weight and which comprises a limited number of components.

The second object of the present invention is to provide a disc unit having a base body which is adequately protected against distortion, so that high reliability in terms of strength is ensured.

The third object of the present invention is to provide a disc unit having a rotating driving portion whose height is reduced, so that the disc unit can be made thinner.

The fourth object of the present invention is to provide a disc unit having a rotating driving portion which is relatively thin even if a motor having a double rotor is used for the rotating driving portion.

In a first aspect of the present invention, a disc unit for recording information on or reading information from a disc serving as a recording medium which is driven to rotate, comprises:

a base body for supporting constituent members of the unit;

a control circuit board which is provided with a control circuit of the unit and supported by the base body; and a cover member for noise shielding mounted on the base body, the control circuit board being interposed between the cover member and the base body so as to secure the state of support.

Here, the cover member may be used as a reinforcement member for preventing distortion of the base body.

The base body may have a cross section which is open in an upper portion thereof, substantially in the form of a channel. Some constituent members are arranged at the inner side of the bottom of the base body, and the control circuit board is supported between opposing side walls of the base body and covers the constituent members below it. The cover member is mounted at upper portions of the opposing side walls in a manner which presses tabs extending from the control circuit board into notches in the base body.

The cover member may be in the form of a plate having press portions for pressing the tabs into the notched portions. The cover member may also have attachment members for engaging with other attachment members provided on the opposing side walls of the base body, the attachment members being engaged with the other attachment members on the same plane of the cover member in the form of a plate.

The attachment members provided on the side walls may be projecting portions, and the attachment members provided on the cover member may be notched portions with which the projecting portions fit. The projecting portions do not project from an upper plane of the cover member.

In a second aspect of the present invention, a disc unit for recording information on or reading information from a disc serving as a recording medium which is driven to rotate, comprises:

a spindle shaft for fitting into a hole formed in the center of the disc;

a drive member for driving the spindle shaft to rotate; and chucking means for holding the disc and for transmitting rotational driving force to the disc, the chucking means being formed integrally with the drive member.

Here, a driving source for driving the disc to rotate may be a direct drive motor, the drive member being the rotor yoke of the direct drive motor, and the chucking means being mounted on the rotor yoke.

The chucking means may include means for transmitting rotational driving force to the disc, the transmitting means being mounted on the lower surface of the rotor yoke.

The disc may have a hub which provides the hole and may also have a concave portion in which a transmitting member provided on the chucking member fits to transmit the rotational driving force. The chucking member is provided with a drive pin used as the transmitting member and urging means for urging the drive pin into a direction oriented to the concave portion.

The urging means may be provided with a support plate formed of a magnet, the support plate being provided with the drive pin and arranged to allow the drive pin to be urged by utilizing the magnetic attraction of the support plate to the rotor yoke.

The hub may be provided with a portion formed of a magnetic material, the chucking means being provided with a magnet for attracting the hub to the rotor yoke thereof.

The hub may be provided with a portion formed of a magnetic material, the urging means being provided with a supported plate formed of a magnetic material, the drive pin being provided in the support plate, the chucking means having a magnet formed integrally with the rotor yoke, and the hub being attached by the magnet as well as the support plate to allow the drive pin to be urged.

The disc unit may comprise a motor for driving the disc to rotate, the drive member having a pulley to which the driving force of the motor is transmitted through a belt, and the pulley being integrally provided with the chucking means.

In a third aspect of the present invention, a disc unit for recording information on or reading information from a disc serving as a recording medium which is driven to rotate, comprises:

a motor for driving the disc to rotate, the motor having a rotor yoke;

chucking means for holding the disc and for transmitting rotational driving force to the disc, the chucking means having a magnet; and wherein the magnet is provided integrally with the rotor yoke of the motor.

Here, the magnet of the chucking mechanism has the function of attracting and holding the recording medium as well as the function of urging members for transmitting rotational driving force to the medium toward the medium.

In a fourth aspect of the present invention, a disc unit for recording information on or reading information from a disc serving as a recording medium which is driven to rotate, comprises:

a motor for driving the disc to rotate, the motor having a pair of rotors disposed opposite to each other;

an exciting coil; and a holding member for fixedly holding the exciting coil between the pair of rotors, wherein the exciting coil is embedded in the holding member.

Here, a magnet for the motor may be provided in any one of the pair of rotors.

The disc may be provided with a hub having a portion formed of a magnetic material, one of the pair of rotors having a magnetized portion which is used as a holding member for the disc due to magnetic attraction of the hub as well as a magnet of the motor.

The other one of the pair of rotors may be provided with a magnet, the magnet and the magnetized portion being magnetized in such a manner that portions having reverse polarities are disposed opposite to each other.

The disc may include a hub having a portion formed of a magnetic material, any one of the pair of rotors being used to also serve as chucking means for holding the disc, and the chucking means including a magnet for holding the hub, a magnet used as a magnet for the motor, and a holding member for holding the magnets.

In a fifth aspect of the present invention, a disc unit for recording information on or reading information from a disc serving as a recording medium which is driven to rotate, comprises:

a base body for supporting constituent members of the unit;

a control circuit board which is provided with a control circuit for the unit and which is supported by the base body;

a cover member for noise shielding mounted on the base body, the control circuit board being interposed between the cover member and the base body so as to secure the state of support;

a spindle shaft for fitting into a hole formed in the center of the disc;

a drive member for driving the spindle shaft to rotate; and chucking means for holding the disc and for transmitting rotational driving force to the disc, the chucking means being formed integrally with the drive member.

In a sixth aspect of the present invention, a disc unit for recording information on or reading information from a disc serving as a recording medium which is driven to rotate, comprises:

a base body for supporting constituent members of the unit;

a control circuit board which is provided with a control circuit for the unit and which is supported by the base body;

a cover member for noise shielding mounted on the base body, the control circuit board being interposed between the cover member and the base body so as to secure the state of support; and a motor for driving the disc to rotate, the motor having a pair of rotors disposed opposite to each other; an exciting coil assembly; and a holding member for fixedly holding the exciting coil assembly between the pair of rotors, wherein the exciting coil assembly is embedded in the holding member.

In a seventh aspect of the present invention, in a disc unit which drives a recording medium to rotate by means of a drive motor so that recording information or reading information is performed, at least part of a stator yoke for the drive motor is disposed in a hole or a concave portion provided in a chassis of the unit for recording information or reading recorded information, the hole or concave portion providing space corresponding to the thickness of the chassis for mounting the stator yoke.

In an eighth aspect of the present invention, in a disc unit which is mounted on an electronic apparatus by fixing a plurality of portions at the bottom of a base body at corresponding fixing portions of the electronic apparatus, the number of the fixing portions at the bottom of the base body is three, and the fixing portions corresponding to the fixing portions of the electronic apparatus are notched.

In a ninth aspect of the present invention, in a disc unit which drives a disc serving as a recording medium to rotate by means of a motor so that recording information or reading information is performed, the unit comprises a board which is provided with a drive control circuit for a motor, the board having an opening portion which is formed in a region opposite to the rotor of the motor, a coil assembly for the motor being provided in the opening portion.

Here, connection between the drive control circuit of the motor and the coil assembly may be performed directly by a coil terminal.

The above and other objects, effects, features and advantages of the present invention will become more apparent from the following description of embodiments thereof taken in conjunction with the accompanying drawings.

BRIEF DESCRIPTION OF THE DRAWINGS

FIGS. 1A–1D are a plan view, a side view, a bottom view and a front view, respectively, showing the exterior of the whole disc unit in accordance with one embodiment of the present invention;

FIG. 12 and FIGS. 13A–13D are explanatory views showing a damper mechanism;

DETAILED DESCRIPTION OF PREFERRED EMBODIMENTS

The First Embodiment

Figure 1C:
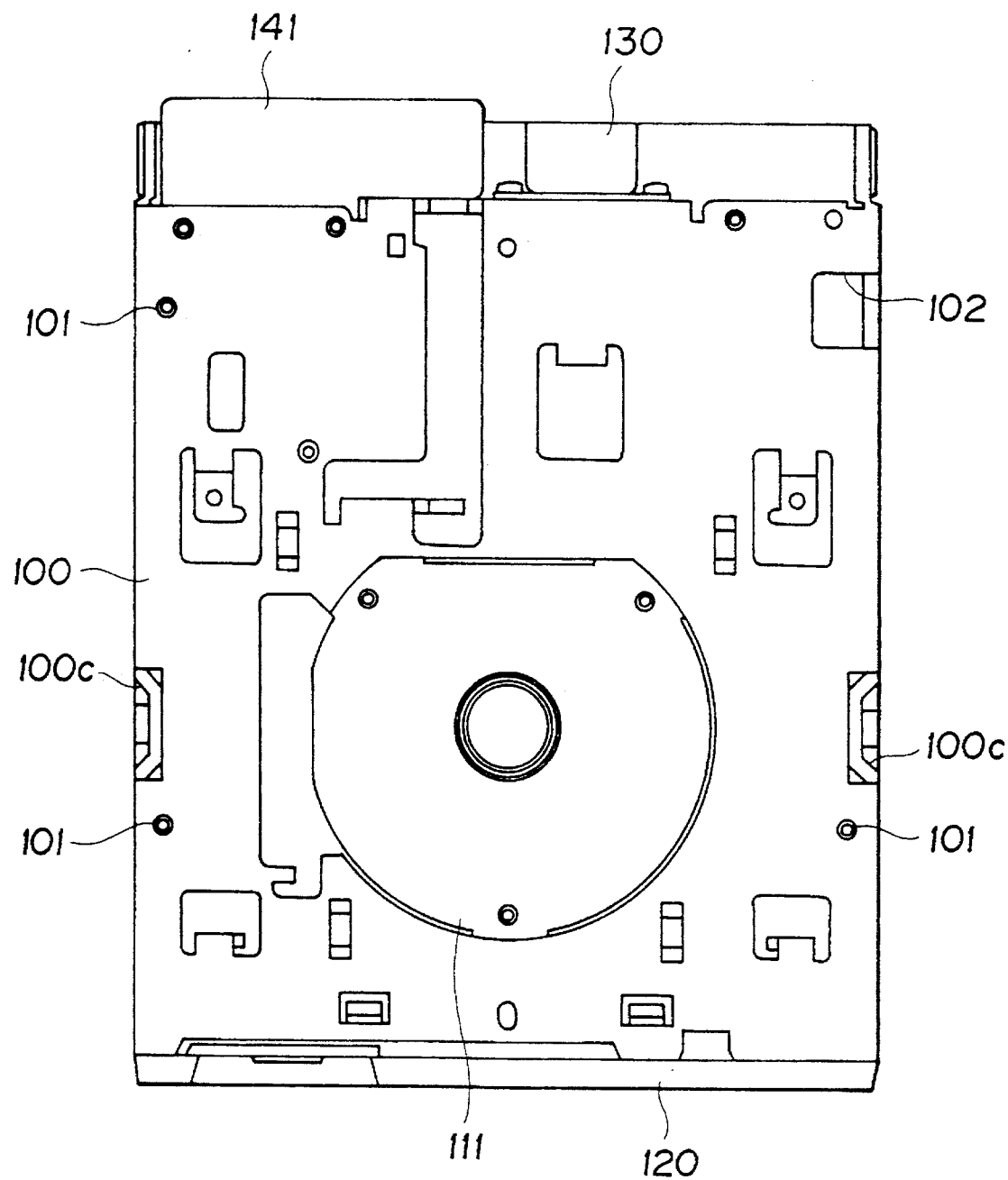

Now, the present embodiment will be described by explaining, by way of example, a floppy disc drive unit (referred to as FDD hereinafter) for recording and reading out information, which is incorporated into an electronic apparatus such as a computer, a word processor or the like for the sake of convenience.

The FDD of the present invention has a box-like structure which is miniaturized and thinned, as shown in FIGS. 1A–1D. Reference numeral 100 in the figure denotes a base body for supporting constituent members of the disc unit. This base body has a substantially U-shaped cross section with an open upper side, and it is made of a metal or the like. In the present embodiment, this base body forms the bottom portion of the FDD, and various constituent members are accommodated between the base body and a shield cover used as a lid which will be described later.

FIG. 1C shows the bottom side of the FDD. The bottom side is rectangular and has bottom mounting portions 101 for being mounted to the host apparatus, such as a computer, a word processor or the like, at three positions. These mounting portions are used as through holes for screws, for example. A notch 102 used for relief of mounting is formed at the rectangular position compensating these three bottom mounting portions. Namely, in the conventional unit, normally, the mounting portions are formed at four positions, but the present invention has only three positions for the mounting portions and the remaining one is used as a mounting relief portion.

The base body 100 has notches or cuts of various shapes for mounting each constituent member of the disc unit. These will be explained later each time when necessary.

The base body 100 has a circular notch nearby the center portion thereof. This circular notch is engaged with a stator yoke 111 made of a magnetic material such as an iron plate provided in the lower side of a motor 110 of the disc drive motor (described later). This stator yoke is fixed on the same level as the base body 100.

Particularly, as shown in FIG. 3B and FIGS. 4A–4D, a PCB (Printed Circuit Board) 300 having the DD motor drive control circuit (not shown) is superposed on the upper side of the base body and the stator yoke is placed on the same as level as the lower side of base body. In the PCB, an opening 300a is provided for reducing the thickness of the FDD at the portion opposed to a rotor 115 of the DD motor 110, so that the DD motor can be seen. As is apparent from the figures, in the opening 300a and in an opposing relationship with the rotor 115 of the DD motor 110, a coil assembly 112 for excitating the DD motor is arranged on the stator yoke 111 and has six portions with the same angular spacing, for example. The coil assembly has internal wiring which is soldered, for example, to patterns 112a. Connection between the coil assembly 112 and the motor drive control circuit on PCB 300 is such that coil terminals are connected directly to PCB 300. Additional lead wires or the like are not required for connecting the coil ends (coil terminals) of the coil assembly 112 directly with the motor drive control circuit on PCB 300, so that cost reduction and space saving are allowed by such direct connection. Further, by utilizing space in the coil assembly 112, Hall elements 113 for detecting the excitation change timing of the coil assembly are mounted compactly. The Hall elements 113 are arranged in the opening 300a. They have terminals connected by soldering to the PCB 300, and detecting portions which project from PCB 300 to positions opposed to a rotor magnet 115a.

The stator yoke 111 is integrally fixed with the base body 100 at the bottom of the DD motor 110. A housing 111b is affixed to stator yoke 111 for accommodating a bearing 111a. A spindle shaft 114 of the DD motor is borne in the center of this bearing. The rotor yoke 115 is fixed to the upper portion of the spindle shaft 114. A magnet 115a is secured to the reverse side of the rotor yoke 115 to be opposed to the coil assembly 112 through an air gap. As shown schematically in FIG. 4D, a pattern 112b for a FG (Frequency Generator) for detecting the number of revolutions of the coil is provided on the upper side of the coil assembly 112. This pattern for the FG is, for example, connected by soldering with PCB 300. A disc chucking mechanism provided in the rotational driving portion for rotating the disc as described above will be explained in detail later.

As shown in the figures, a front panel 120 having an insert and eject portion 121 for a disc cassette 150 is arranged on the front side of the base body 100 to form the front side of the box. The front panel 120 extends between the sides 100a of the substantially U-shaped profile of the base body 100.

Figure 5B:
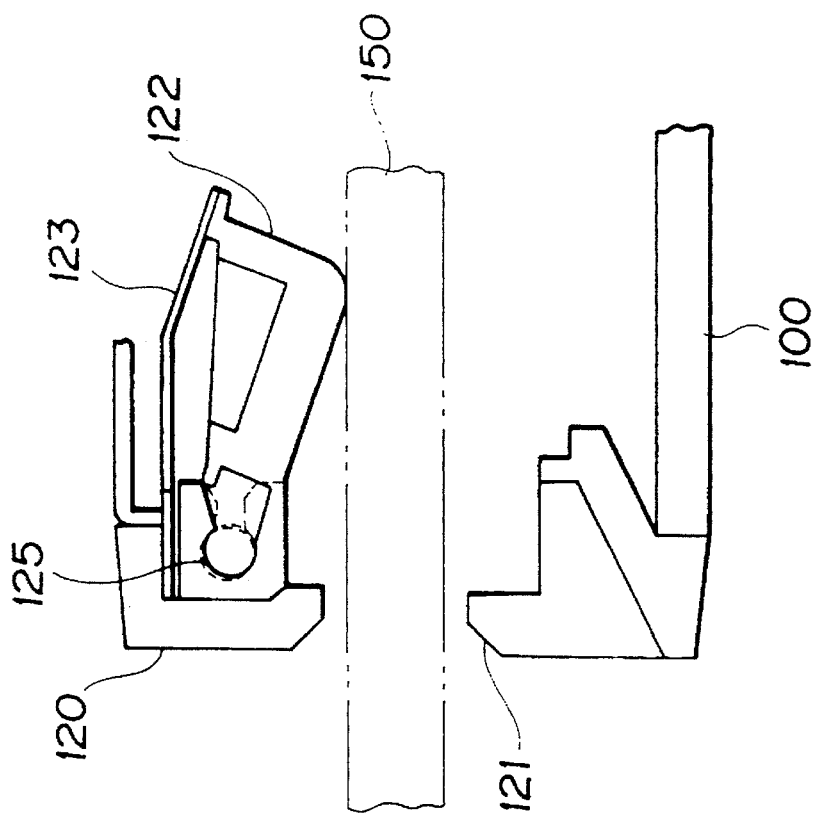
FIGS. 5A and 5B are explanatory views showing the function of a brake spring and a coil spring.
Figure 5A:
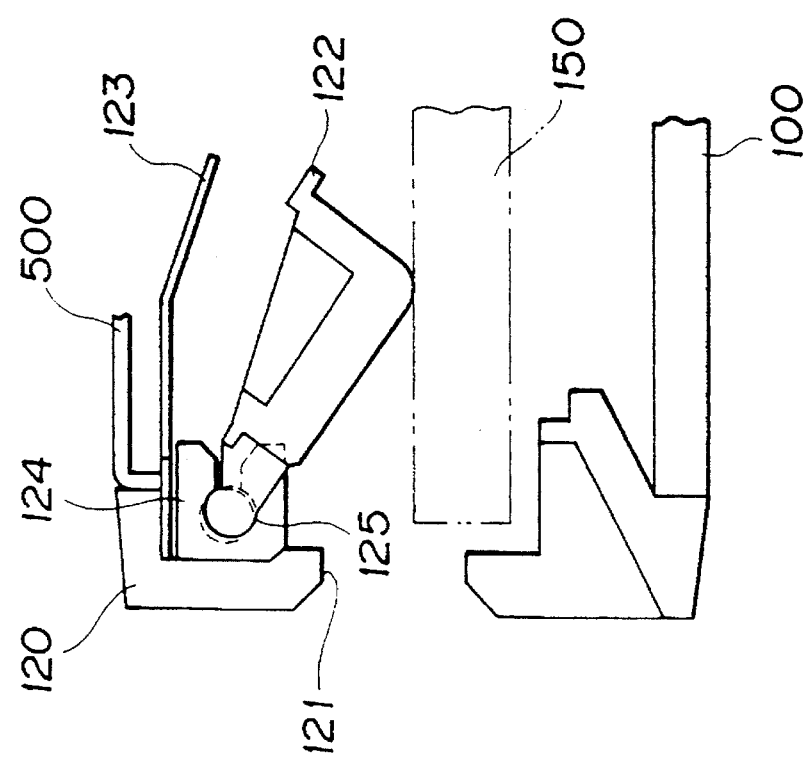
Figure 6:
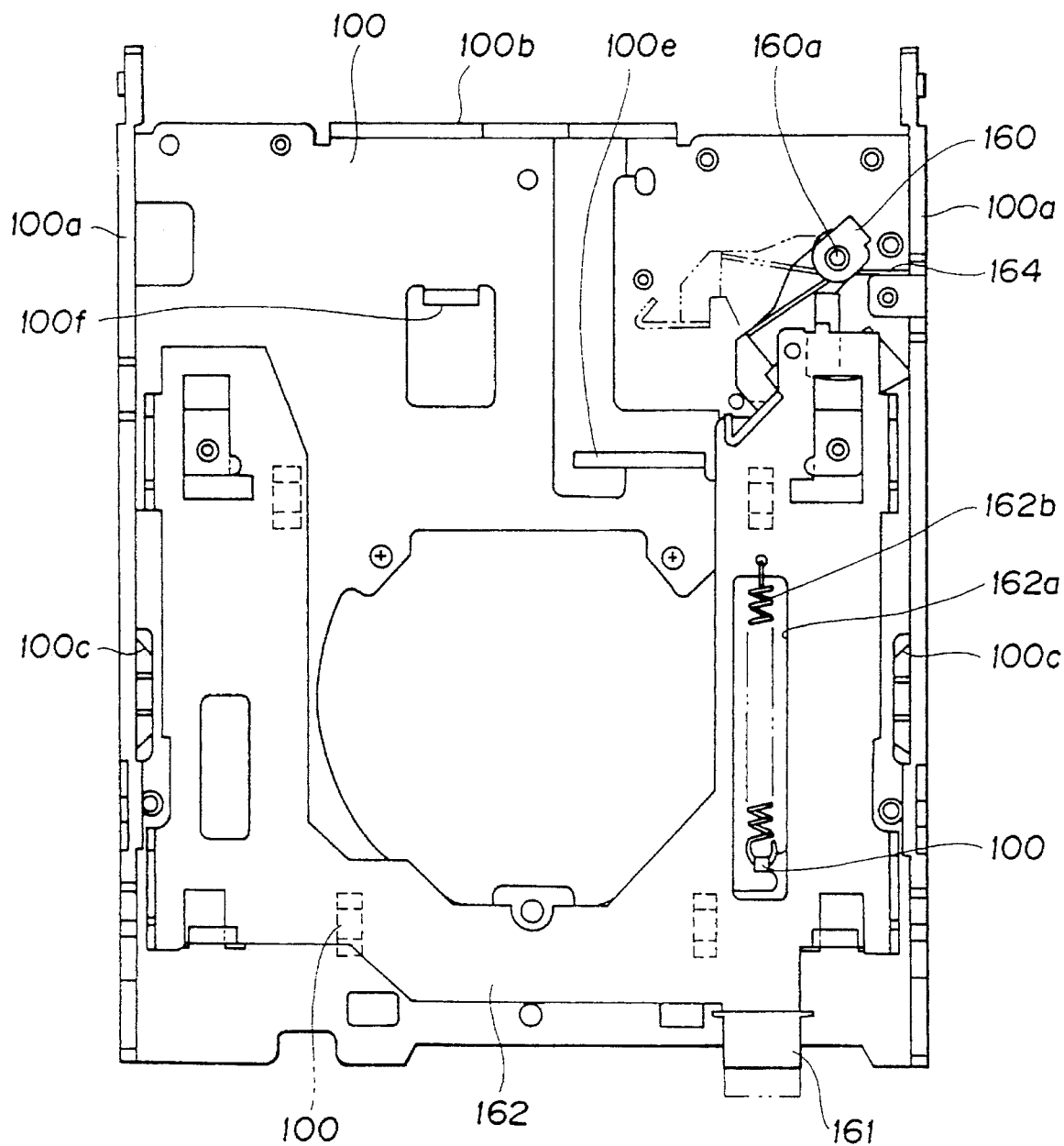
FIG. 6 is a plan view showing the disc unit into which a slide plate and an ejector are incorporated.

Further, as shown in FIGS. 5A and 5B, a shutter 122 is arranged in the inner portion of the front panel 120 so that the cassette inserting and ejecting portion is shut for preventing invasion of foreign substances such as dust when not in use. This shutter is pivotally borne by bearing portions 124 arranged on the upper side of the cassette inserting and ejecting portion 121, and is biased to close the cassette inserting and ejecting portion by a weak coil spring 125 as a first flexible member. Therefore, this shutter hangs down and closes the inserting and ejecting portion 121 when an external force is not added thereto. A brake spring (plate spring) 123 as a second flexible member has one end portion secured to the inside of the front panel 120 near the upper portion of the shutter 122. The brake spring 123 is made of a material having a relatively large elastic coefficient, and is downwardly bent. When the cassette is inserted and a cassette guide (as described later) is pressed downward, the bent end of the brake spring 123 does not reach the shutter 122. This bent end of the brake spring 123 contacts the shutter 122 to close the shutter 122 only when the cassette is inserted or ejected. The brake spring has an elasticity coefficient larger than that of the coil spring 125.

Next, a disc insertion or ejection mechanism and a head load mechanism will be explained with reference to FIGS. 6, FIGS. 7A–7C, and FIGS. 8A and 8B.

In the FDD of the present embodiment, the disc chucking and the magnetic head loading are performed by loading a disc cassette 150. The magnetic head unloading and the disc ejection are performed by pressing an ejection button.

The disc cassette (referred to as a "cassette" hereinafter) 150 is inserted or ejected through the disc cassette inserting and ejecting portion 121 formed in the front panel 120 provided in the front side of the base body 100.

Reference numeral 160 designates an ejector which is provided in the interior of the base body 100 having a substantially U-shaped cross section. A slide plate 162 is arranged slidably in an A-B direction on the base body by being guided with a plurality of bent portions 100m which project at predetermined positions from the base body 100. The slide plate 162 has a notch 162a. A pulling coil spring 162b has one end secured to the base body 100 and the other end attached to the slide plate 162 adjacent the notch 162a. As described below, the slide plate 162 is held at a predetermined position on the base body 100 by the pulling of the pulling coil 162b in a B direction and the abovementioned bent portions 100m provided on the base body, and is able to slide on the basebody 100 in the A direction when an operation button 161 (ejection button) is pushed. Button 161 is integrally mounted at the bottom portion of the slide plate 162 in FIG. 6.

Figure 8A:
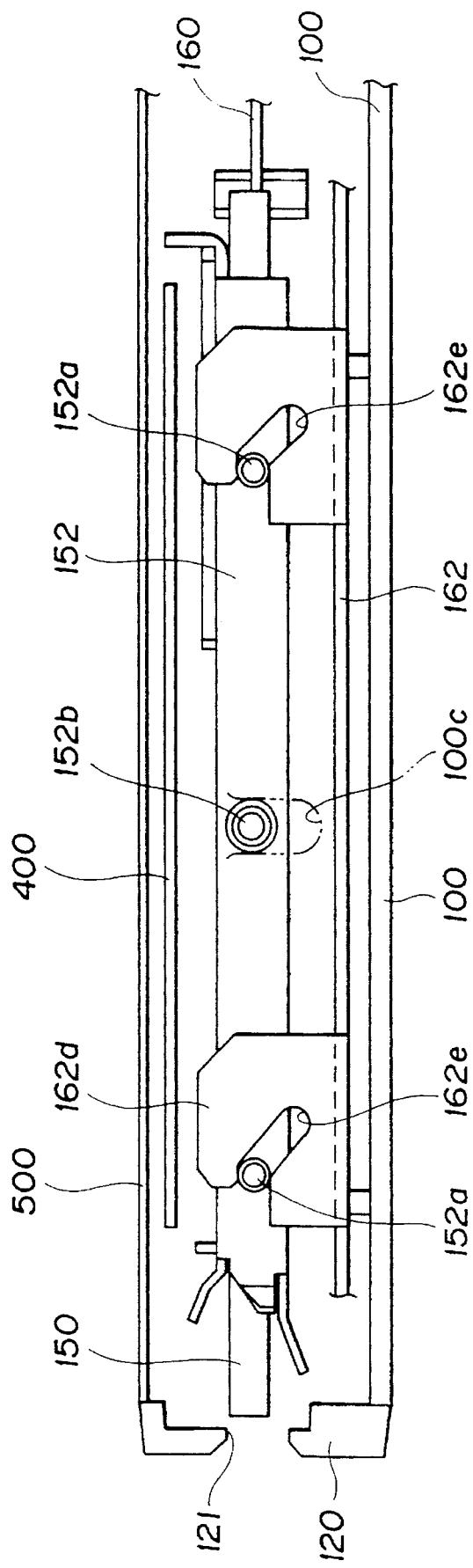
FIGS. 8A and 8B are explanatory views showing the motion of a cassette guide.
Figure 8B:
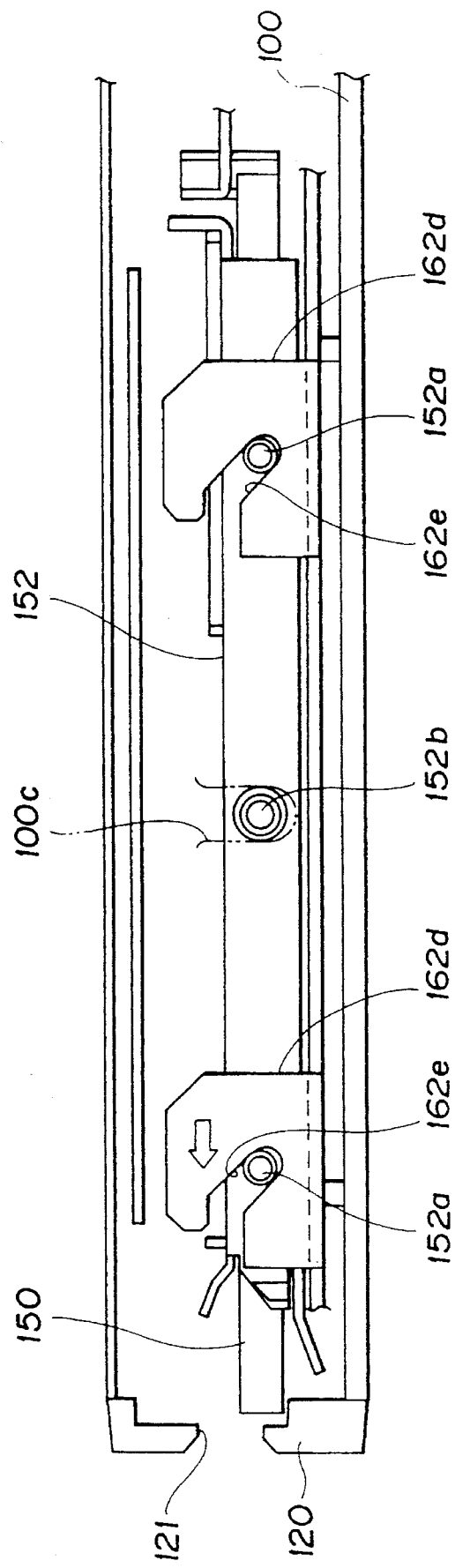

Vertical guide plates 162d which are provided on either side of the slide plate 162 have respective guide grooves 162e, as shown in FIGS. 8A and 8B. As is apparent from these Figures, guide grooves 162e have outer edge portions which are parallel to the base body 100 and inner portions which are inclined.

Figure 3A:
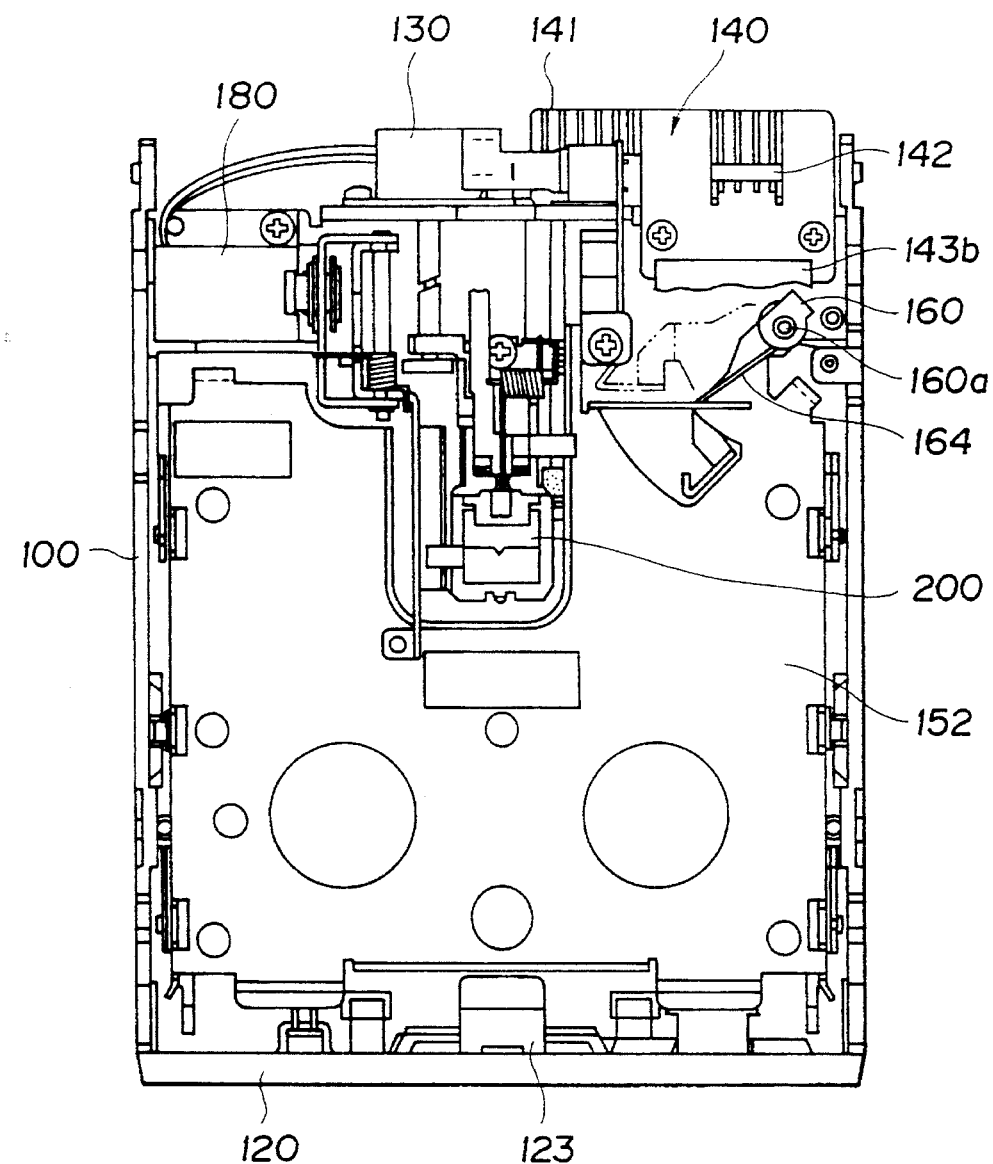
FIG. 3A is a plan view showing the disc unit in which the shield cover and the main control circuit board are taken off.
Figure 3D:
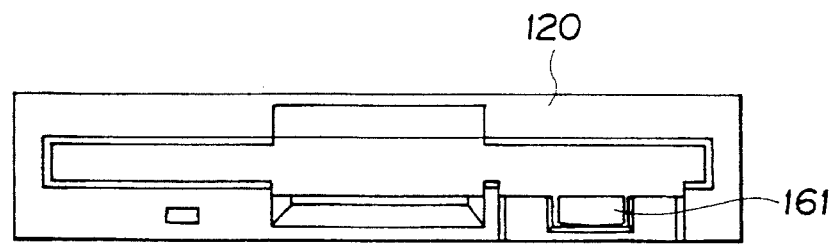
FIGS. 3B–3D are a plan view, a side view and a front view, respectively, showing the disc unit into which a DD motor is incorporated.

One side of a cassette guide 152 is also shown in FIGS. 8A and 8B (also refer to FIG. 3A). The cassette guide 152 accommodates the cassette 150, and is in the form of a thin box which fits in the base body 100. Further, almost all of the lower portion of the cassette guide 152 is notched such that its cross section is substantially U-shaped.

Projections 152a extend outwardly to engage with the guide grooves 162e formed in the guide plates 162d of the slide plate 162 on either side of the cassette guide 152. Further, projections 152b extend from the center on either side of the cassette guide 152 and fit in guide grooves 100c formed on either side 100a (see FIG. 6) of the base body 100.

The ejector 160 is arranged near the back end of the slide plate 162. A shaft 160a supporting the ejector 160 projects near the end opposite the front panel 120 side of the base body 100. This shaft 160a also mounts an ejector spring 164 so that the ejector 160 is biased to rotate about the shaft 160a. One end of the ejector spring 164 is associated with the ejector 160, and the other end is accommodated in a spring receiving portion formed on the side 100a of the base body 100. As is apparent from in FIGS. 7A and 7B, the ejector 160 includes an arcuate base 160b and an arm 160c. The arm 160c is in turn provided with an arm 160d for releasing or pushing the shutter of the cassette. The base 160b has an edge portion which cooperates with the base side 100a to control a stand-by position of the ejector.

The slide plate 162 is provided with a latch 162c in the form of a projecting piece. The latch 162c hooks the base 160b of the ejector 160 in the stand-by position, as shown in FIG. A, and keeps the slide plate 162 in a latched state against the pulling force in the B direction of the spring 162b. When the ejector 160 is moved to an operating position by the cassette 150 as shown in FIG. 7B, the slide plate 162 slides in the B direction due to coil spring 162b.

Figure 9:
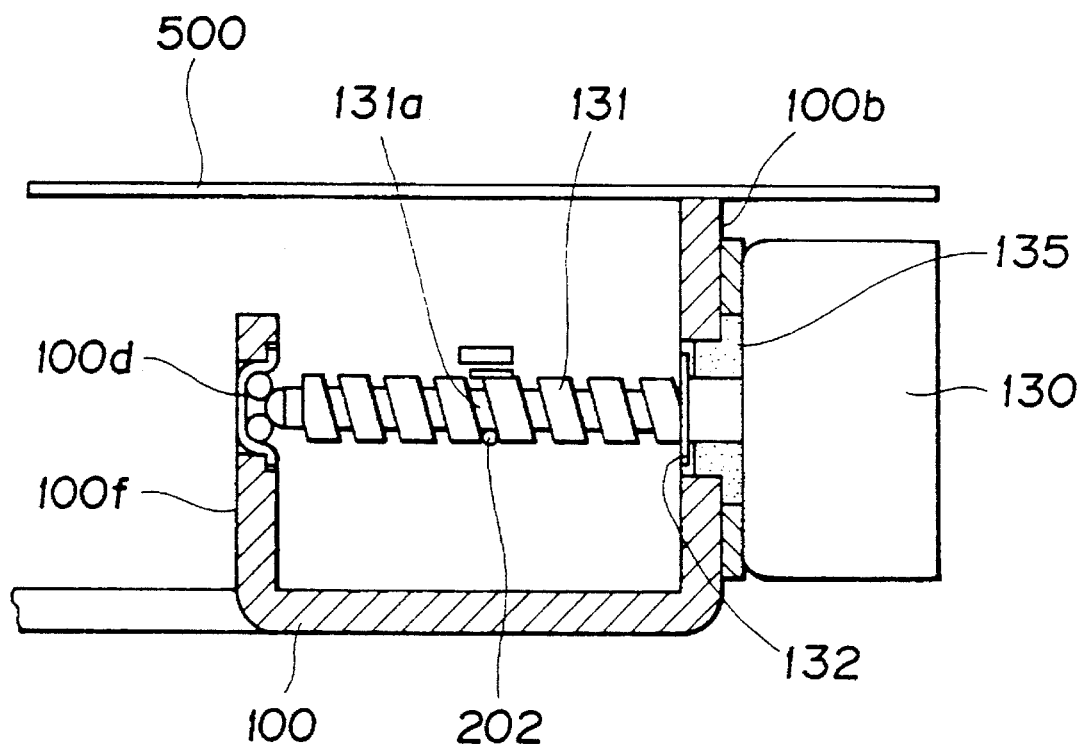
FIG. 9 is an explanatory view showing a stepping motor for head seeking.
Figure 10:
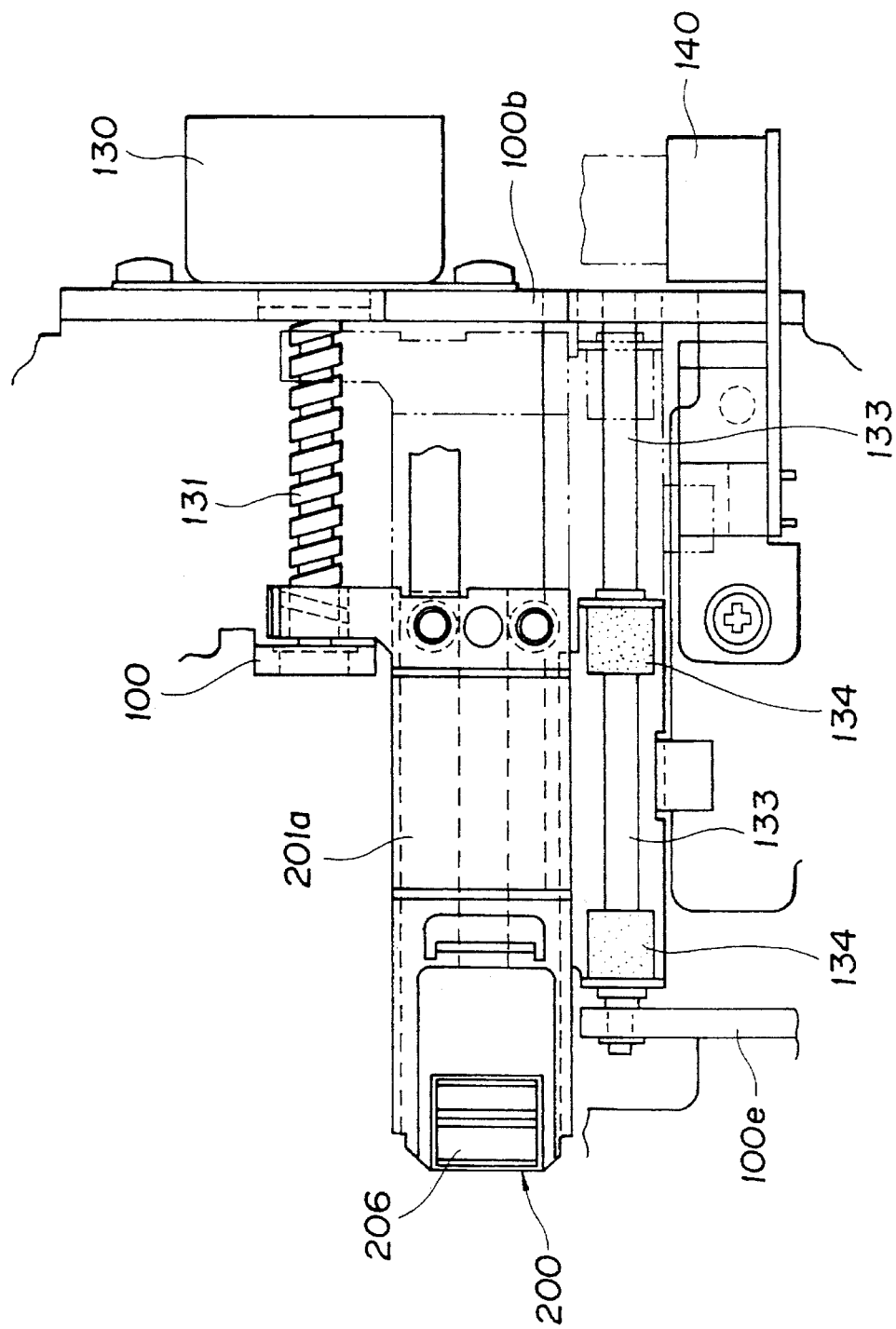
FIG. 10 is an explanatory view showing a head assembly.

Now, a head seeking mechanism will be explained. As shown in FIGS. 9 and 10, the back wall 100b is integrally formed and rises vertically from the bottom of the base body 100 on the side opposite to the front panel 120. A screw shaft 131 which is directly connected with an output shaft of a stepping motor 130 penetrates through a hole formed in the back wall 100b. The screw shaft 131 is rotatably supported by a slide bearing 135 at the end of the screw shaft adjacent the motor 130. The stepping motor 130 drives the head assembly 200 for recording and reading out. The outer end of the screw shaft 131 is rotatably supported in a pivot shaft bearing 100d provided on a support plate 100f which rises at a predetermined distance from the back wall 100b of the base body. As shown in FIG. 9, the screw shaft 131 of the stepping motor is provided with a spiral screw groove 131a, and a needle pin 202 extending from the head assembly 200 is engaged with the screw groove 131a. Further, a washer 132 for preventing foreign substances such as lubricating oil from migrating from the screw shaft 131 is attached to the screw shaft 131 at a position quite near the bearing 135.

Figure 11:
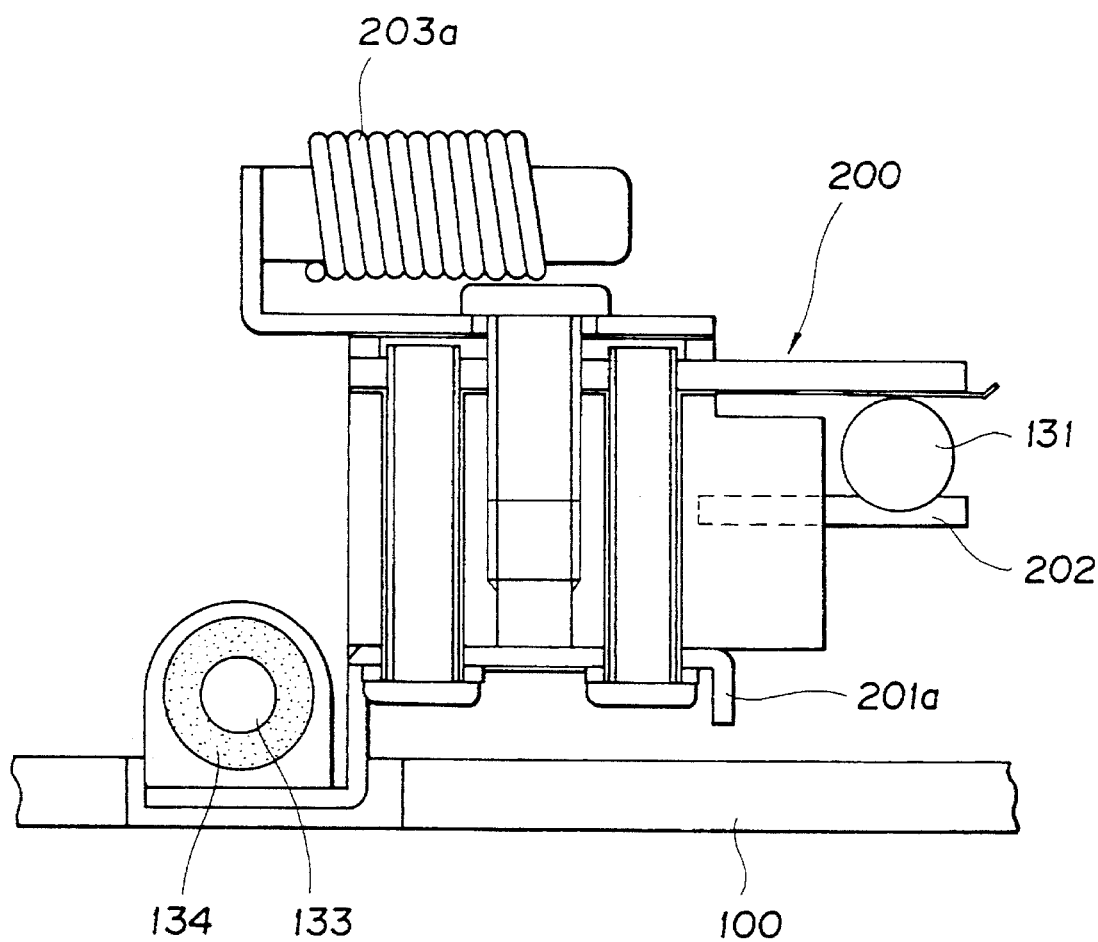
FIG. 11 is a view showing the structure of the head assembly.
Figure 12:
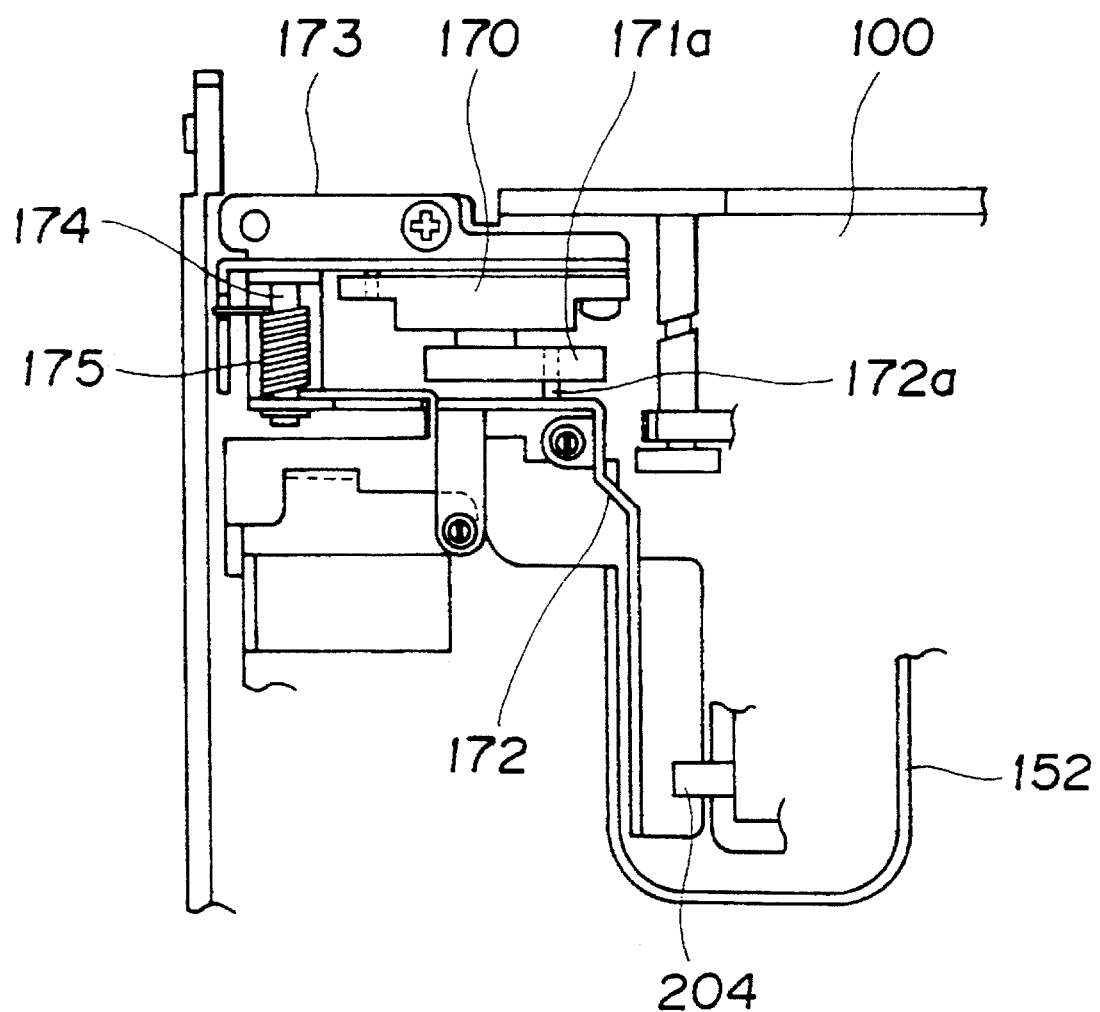
Figure 13A:
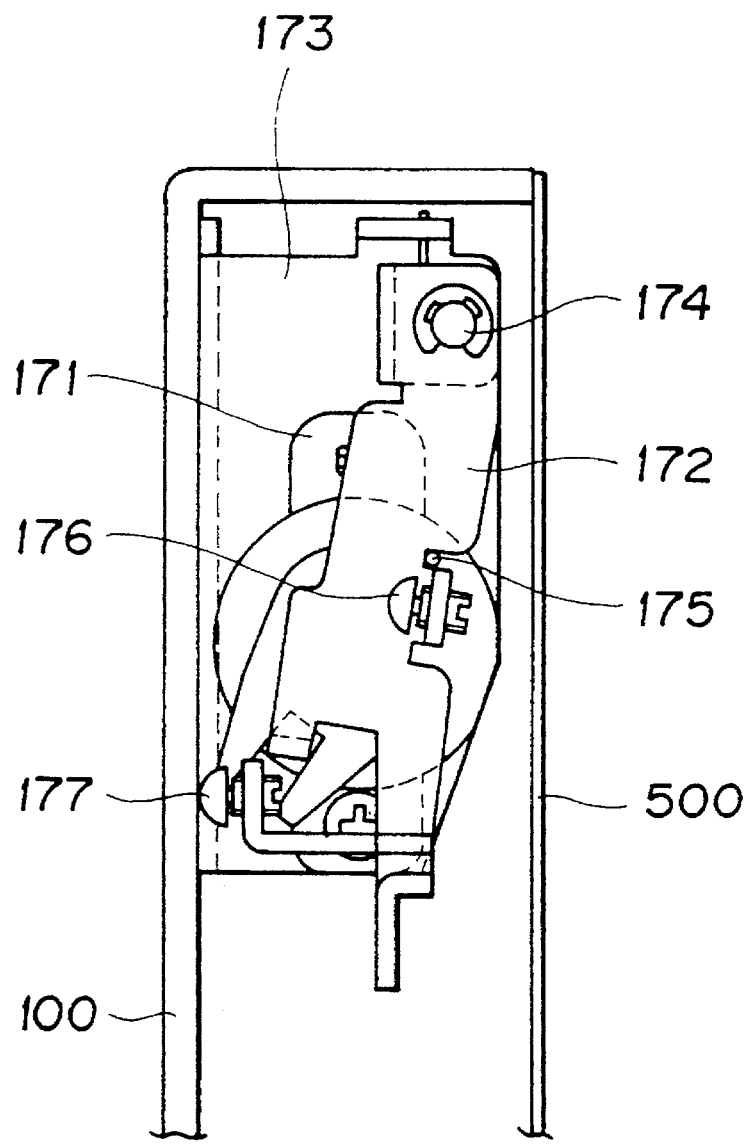
Figure 13B:
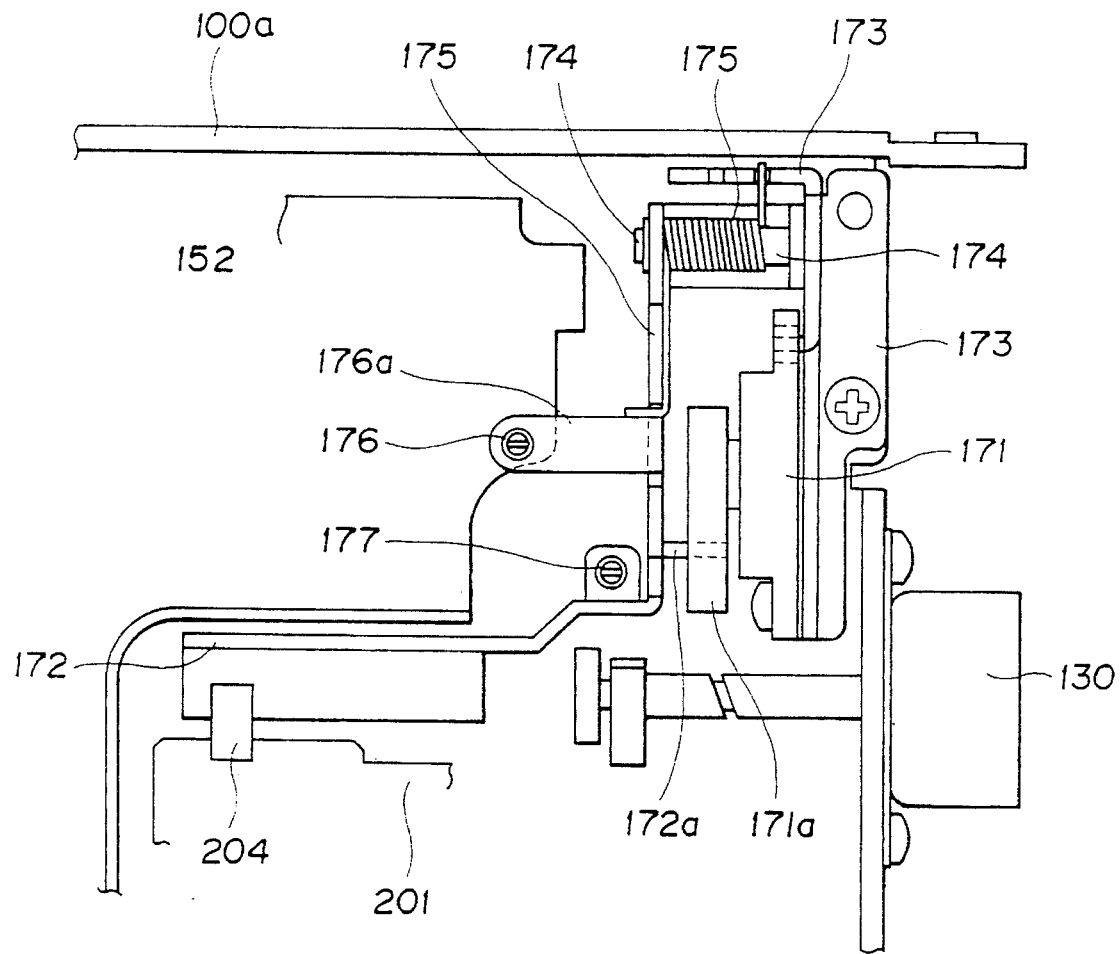
Figure 13C:
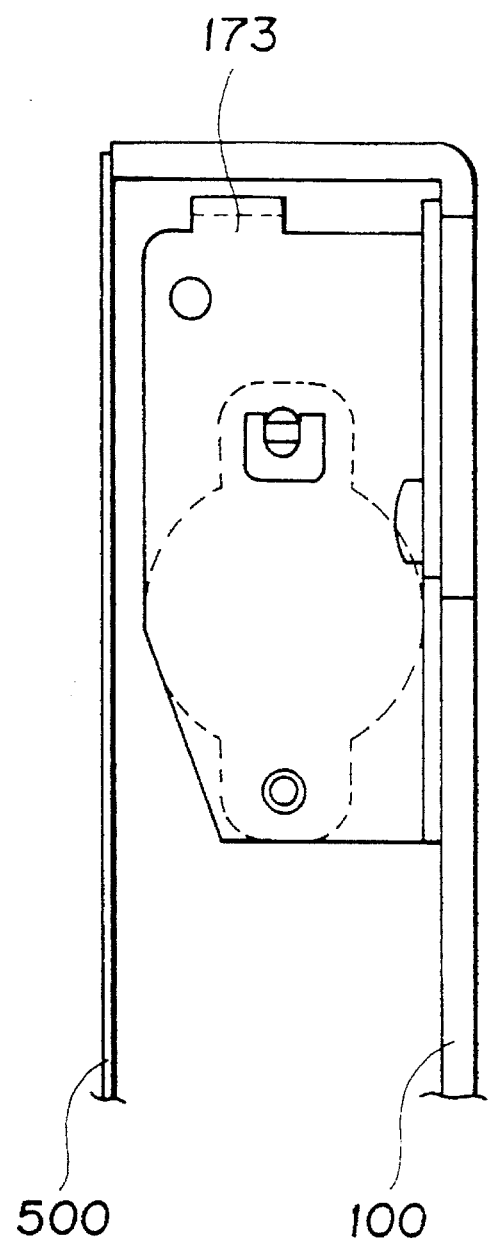

As shown in FIGS. 10 and 11, the head assembly 200 is mounted for reciprocation on a guide bar 133 provided between the back wall 100b of the base body 100 and a support plate 100e, which rises from the base body 100. Guide bar 133 extends through slide bearings 134 attached to head carriage 201a having a head arm 201 (see, for example, FIG. 14A). The head carriage 201a has one side where the slide bearing 134 is provided, and the needle pin 202 is provided on the other side. This needle pin 202 engages with the screw groove 131a of the screw shaft 131 of the stepping motor 130. With such a structure, the screw shaft 131 is rotated by the stepping motor 130, and the needle pin 202 engages the screw groove 131a to cause the head assembly 200 to reciprocate. A magnetic head 206 for a zero surface is secured at the lower side of the head carriage 201a. A magnetic head 205 for a first surface is supported by the head arm 201 on the upper side of the head 206 for the zero surface, in a manner similar to that shown in FIGS. 16A–16C. The head arm 201 having the head for the first surface is capable of approaching and receding from the disc. The head 205 for the first surface performs soft-landing to record information on the disc or to read recorded information therefrom by means of a damper mechanism or solenoid mechanism which will be set forth in the following paragraphs.

FIG. 12, FIGS. 13A–13C, and FIGS. 14A and 14B are shown to explain a damper mechanism 170.

Figure 14A:
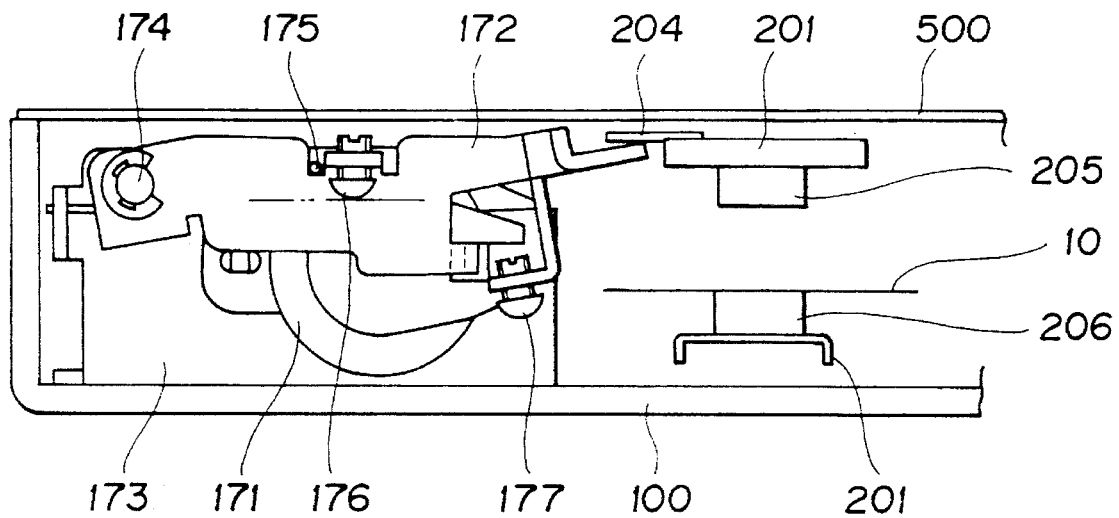
FIGS. 14A and 14B are explanatory views showing the motion of a damper.
Figure 14B:
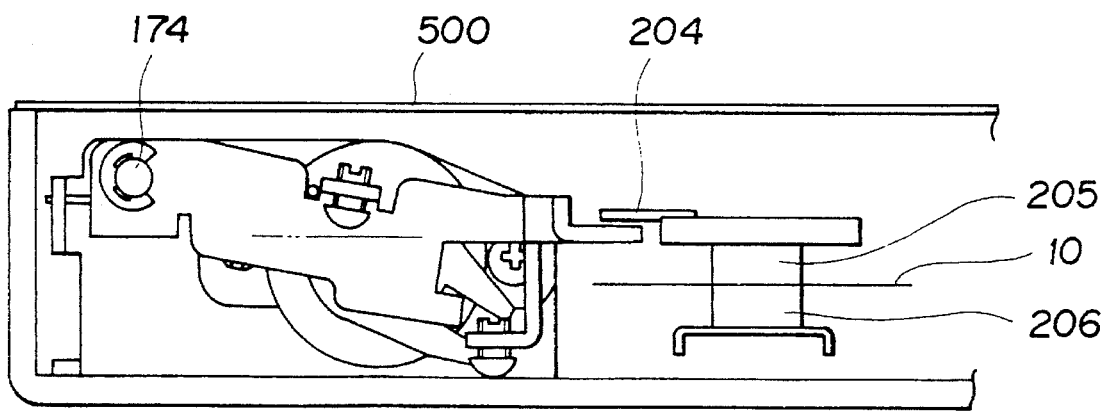
Figure 15:
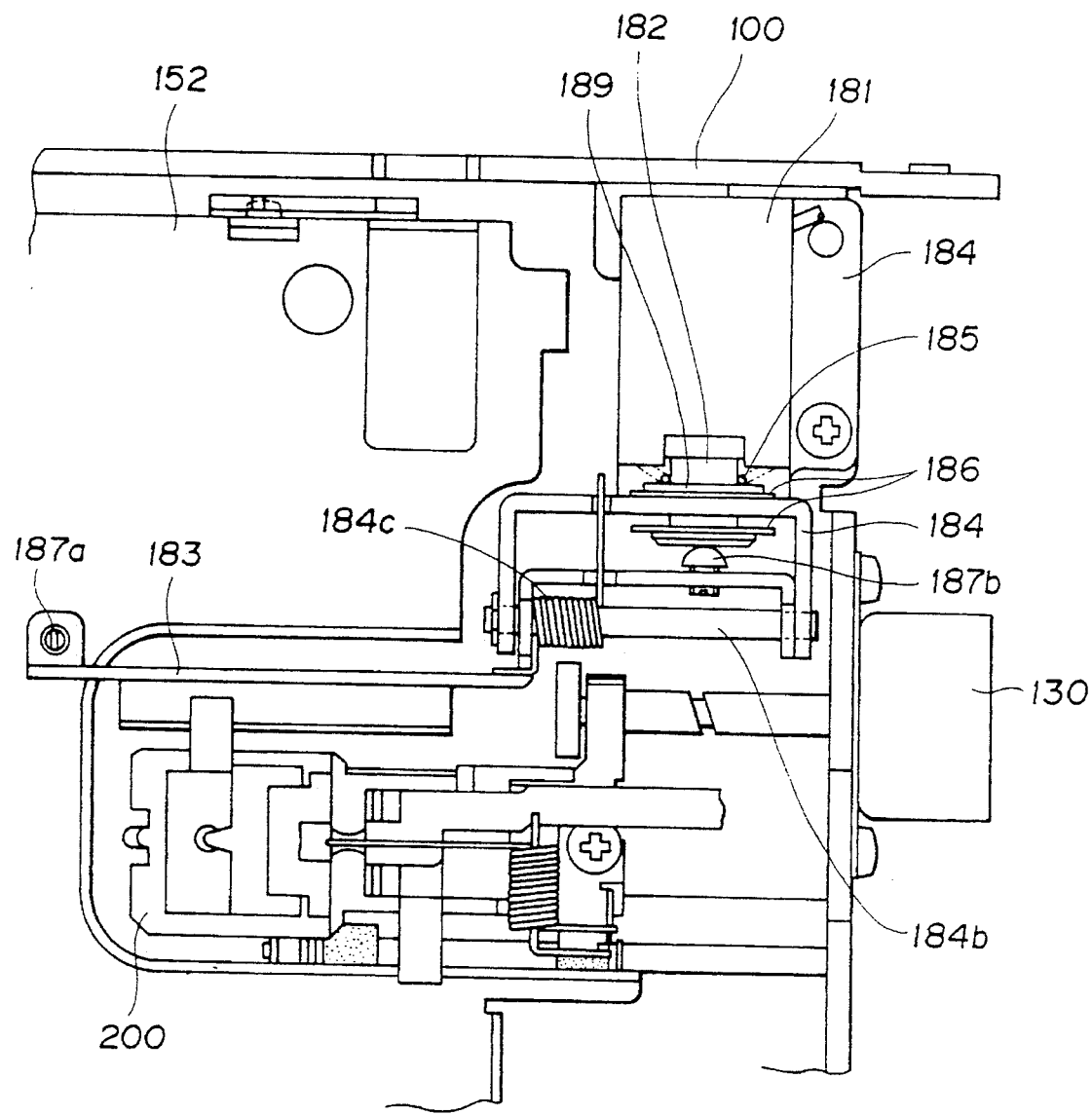
FIG. 15 is a view showing a solenoid mechanism for head loading.

The damper mechanism 170 includes a damper 171 and a damper arm 172, and is mounted on the base body 100 through a damper mounting plate 173. The damper mounting plate 173 is bent in the form of a hook and is screwed to the lower surface of the base body 100. A support shaft 174 projects from the damper mounting plate 173 in parallel with the side wall 100a of the base body 100. The damper arm 172 is rotatably borned by the support shaft 174. Further, the support shaft 174 is wound with a coil spring 175 having one end portion supported by the damper mounting plate 173, and the other end portion is supported by the damper arm 172 in such a manner that the damper arm 172 is biased to rotate toward the bottom of the base body 100. A bent portion 172a projecting from the damper arm 172 engages with a notch formed in a rotating plate 171a of the damper 171 so that the damper arm 172 is interlocked with the damper 171. Further, a first probe 176 and a second probe 177 are provided on the damper arm 172. The first probe 176 extends downwardly from an arm 176a projecting from the center of the damper arm 172 in the direction of the disc. The second probe 177 is oriented toward the base body 100 and extends from the damper arm 172. The first probe 176 is provided to transmit an upward movement of the cassette guide 152 to the damper arm 172. The second probe 177 contacts the bottom of the base body 100 and serves as a stopper for the damper arm. When the cassette is not inserted in the disc unit, the first probe 176 contacts the upper surface of the cassette guide 152 as shown in FIG. 14A. When the cassette is inserted, the second probe 177 contacts the bottom of the base body 100 as shown in FIG. 14B and the first probe 176 is spaced apart from the upper surface of the cassette guide 152 by a narrow gap. The gap is provided to ensure that the damper arm 172 is sure to separate from the head arm 201 without receiving any external force and that motion of the head arm is not interrupted, when the cassette is inserted and the head contacts the disc.

FIG. 15 and FIGS. 16A–16C show a solenoid assembly which can be used in place of the above damper assembly. Whether the damper mechanism or the solenoid mechanism should be chosen depends on the host apparatus in which the FDD is included. Generally, the damper mechanism should be used if the magnetic head is loaded on the disc when the cassette is inserted, and the disc rotates only when read-writing is performed. The solenoid mechanism should be used if the disc rotates whenever the electric power is switched on, and the magnetic head is loaded on the disc by the solenoid only when read-writing is performed.

A solenoid mechanism 180 includes a solenoid 181, a plunger 182 drawn by the excitation of the solenoid and a head load arm 183, and is screwed to the base body 100 via a solenoid mounting plate 184. The solenoid mounting plate 184 is provided with a substantially U-shaped supporting portion 184a, and a support shaft 184b is supported by the supporting portion 184a. A head load arm 183 is rotatably supported by the support shaft 184b. Further, the support shaft 184b is wound with a coil spring 184c. The coil spring 184c has one end which engages the substantially U-shaped supporting portion 184a, and the other end engages the head load arm 183, so that the head load arm 183 is biased to rotate in a clockwise direction (with respect to FIGS. 16A–16C). The plunger 182 has one side which projects toward the head assembly via a through hole (not shown) formed in the solenoid mounting plate 184. This side of the plunger is opposite to the main body of the solenoid 181. The distance that the plunger 182 projects from the solenoid body 181 is controlled by providing an E ring 189 inside of the solenoid mounting plate 184 for the plunger 182. Further, a plunger returning spring 185 is elastically provided between the E ring 189 and the solenoid so that the plunger is urged in the direction of the head assembly. The plunger 182 is provided with rubber members 186 on either side of plate 184 for eliminating noise and reducing shock caused by plunger movement.

Figure 16A:
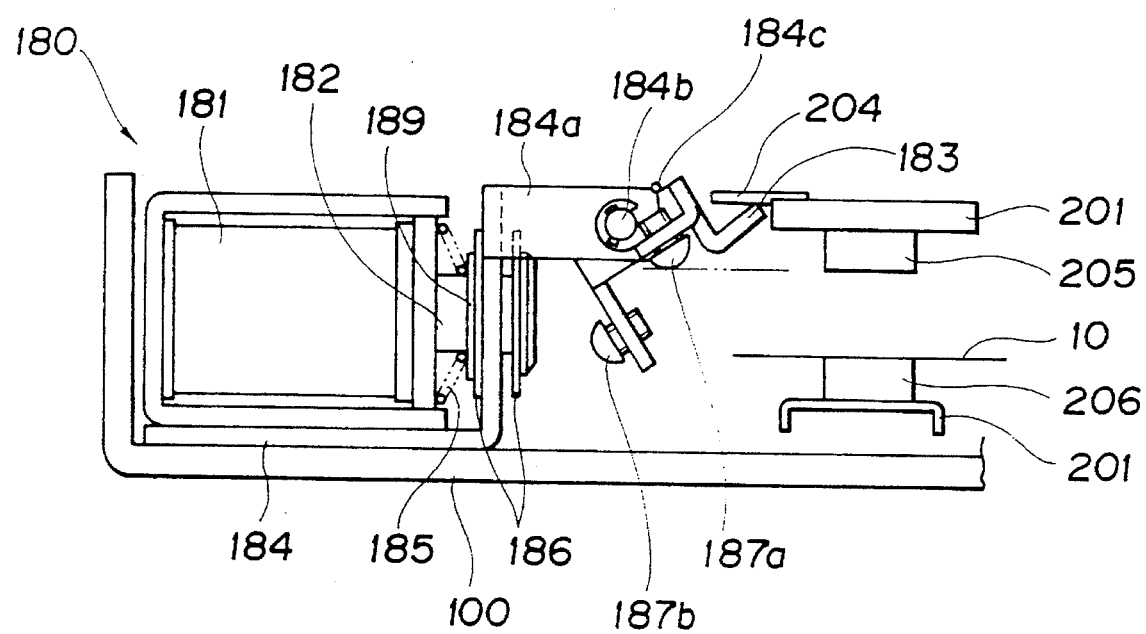
FIGS. 16A–16C are explanatory views showing the motion of the solenoid.

At the end of a head load arm 183 is provided a first probe 187a. When the disc cassette is not inserted in the FDD, the head load arm 183 is pushed up to the position shown in FIG. 16A since the probe 187a contacts the upper surface of the cassette guide 152, thereby resisting the urge imparted by spring 184c. At this time, a lifter 204 mounted on the first surface head arm 201 of the head carriage is supported by the head load arm 183, and the first surface head arm 201 is supported at a not-in-use position as shown in FIG. 16A.

Figure 16B:
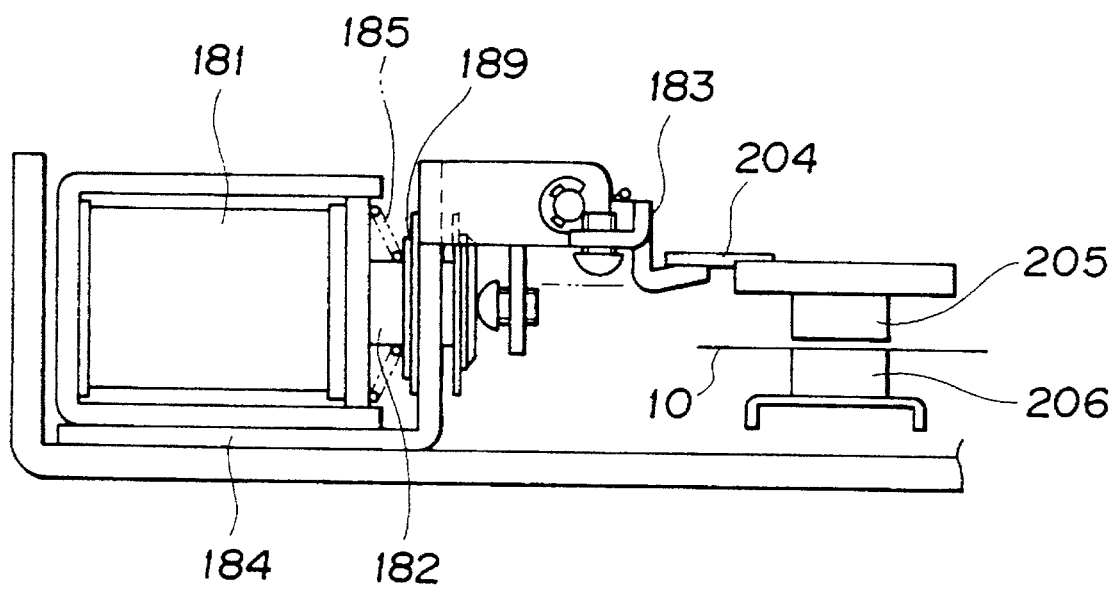

A second probe 187b is provided at a portion where the head load arm 183 contacts the plunger 182. When the disc cassette is inserted in the FDD, the cassette guide 152 is lowered by the above cassette mounting mechanism and the first probe 187a is released from the upper surface of the cassette guide, so that the head load arm 183 is rotated in a clockwise direction as shown in FIG. 16B by the urge of the coil spring 184c. At this time, the second probe 187b contacts the outer end of the plunger 182 so that the head load arm 183 is held at the position shown in FIG. 16B. When the second probe 187b contacts the plunger, the first probe 187a is placed at a position where it does not contact the cassette guide. Therefore, at this position, the lifter 204 of the head arm 201 is supported by the head load arm 183 so that the magnetic head 205 is held at a stand-by position, spaced apart by a predetermined distance from the disc 10.

Figure 16C:
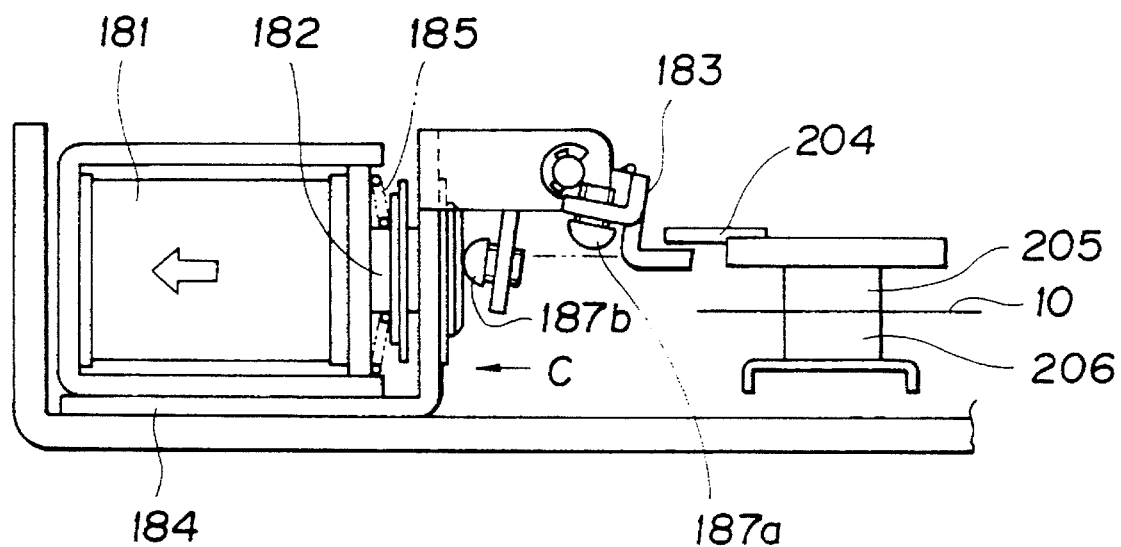
Figure 17A:
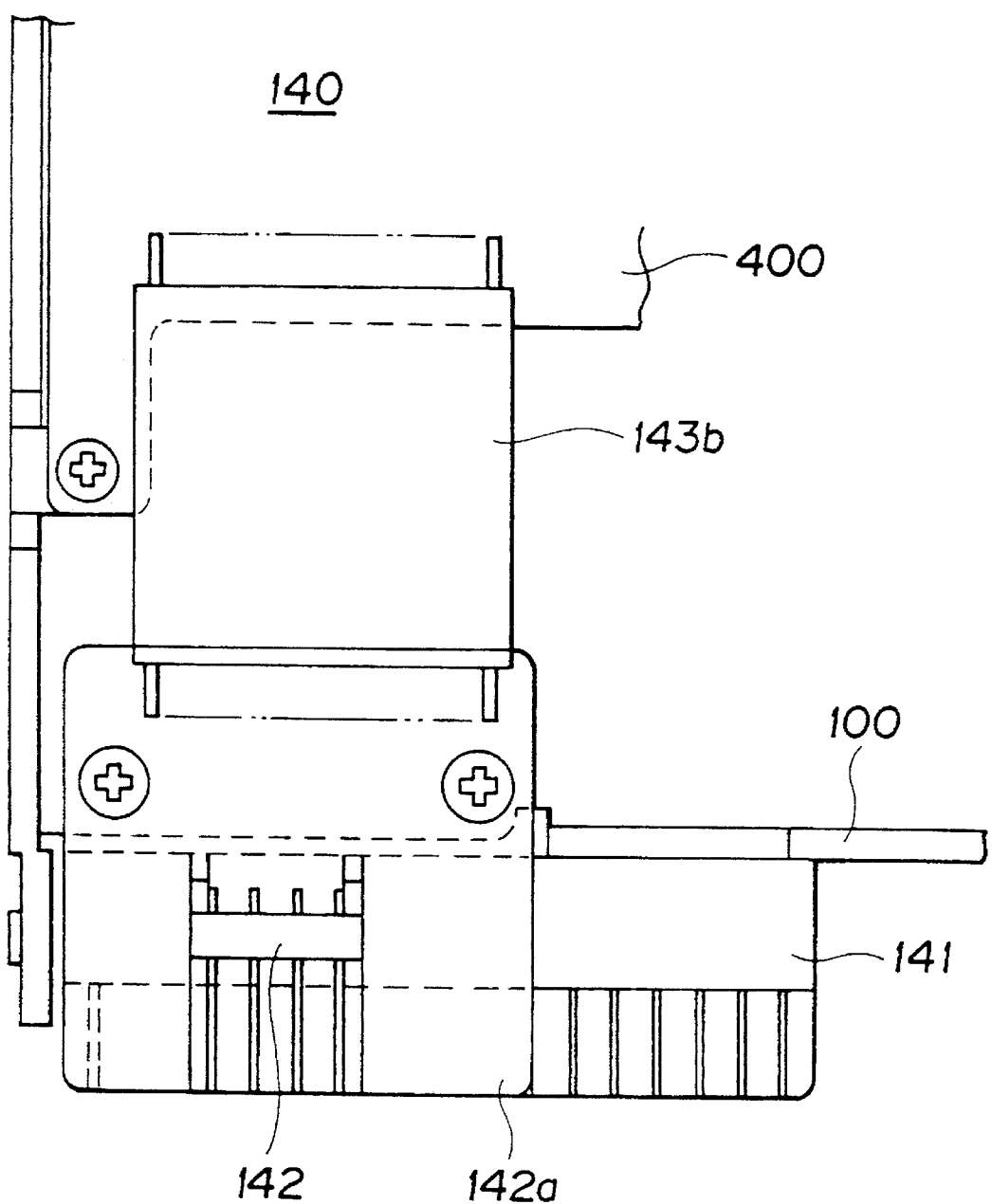
FIGS. 17A–17C are explanatory views showing the arrangement of connectors for the disc unit.
Figure 17B:
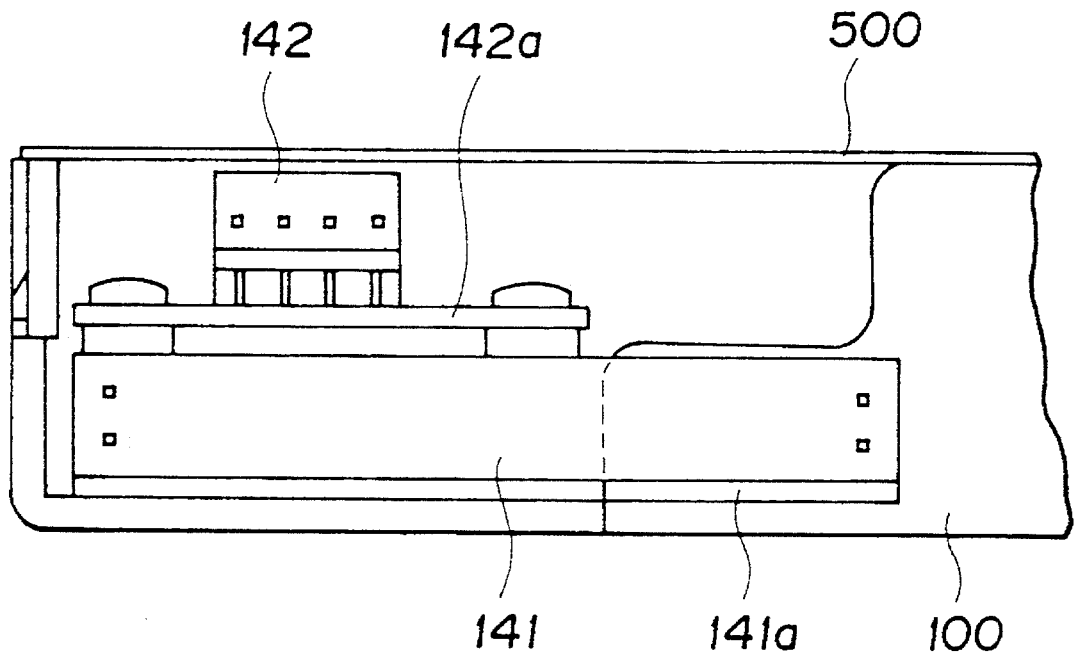
Figure 17C:
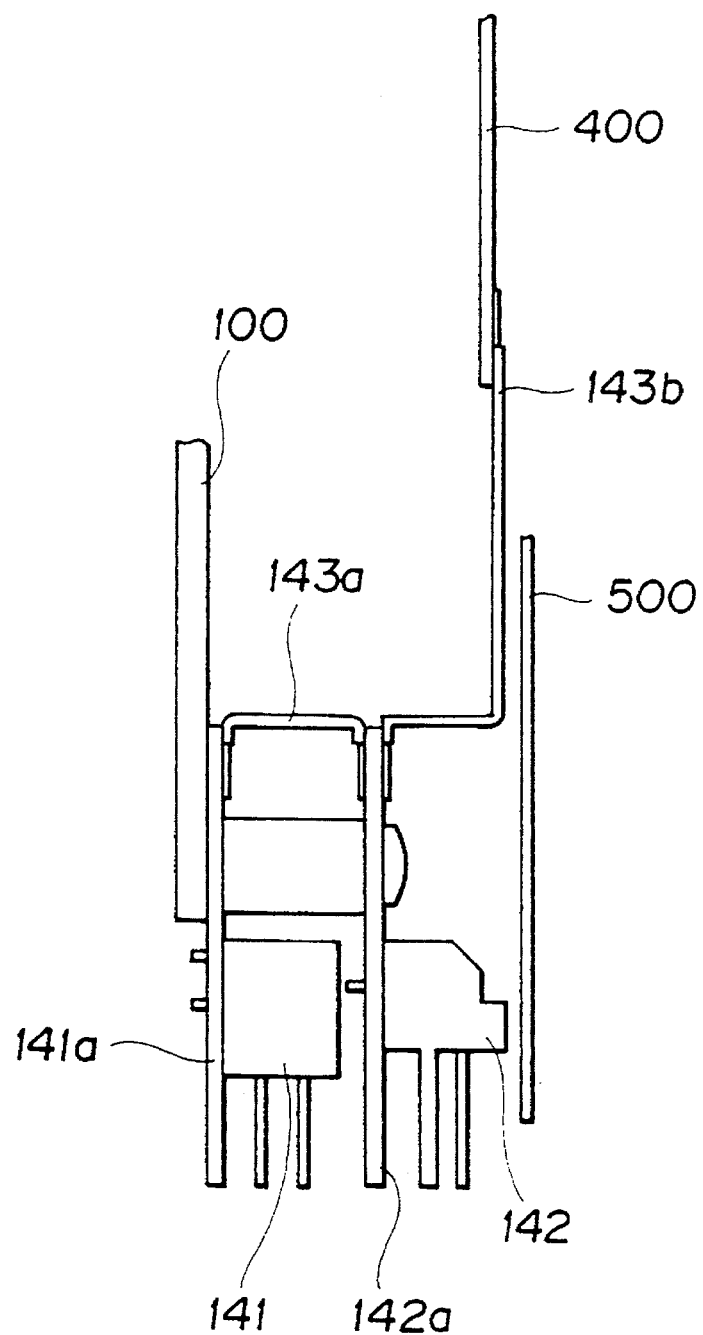

When the solenoid 181 is actuated and the plunger is pulled in direction C in FIG. 16C, the head load arm 183 is further rotated in the clockwise direction by the urge of the coil spring 184c, and occupies the position as shown in FIG. 16C. Then, the head load arm 183 separates from the lifter 204 on the head arm 201, and the first surface head 205 provided on the head arm 201 contacts the disc 10.

Figure 2A:
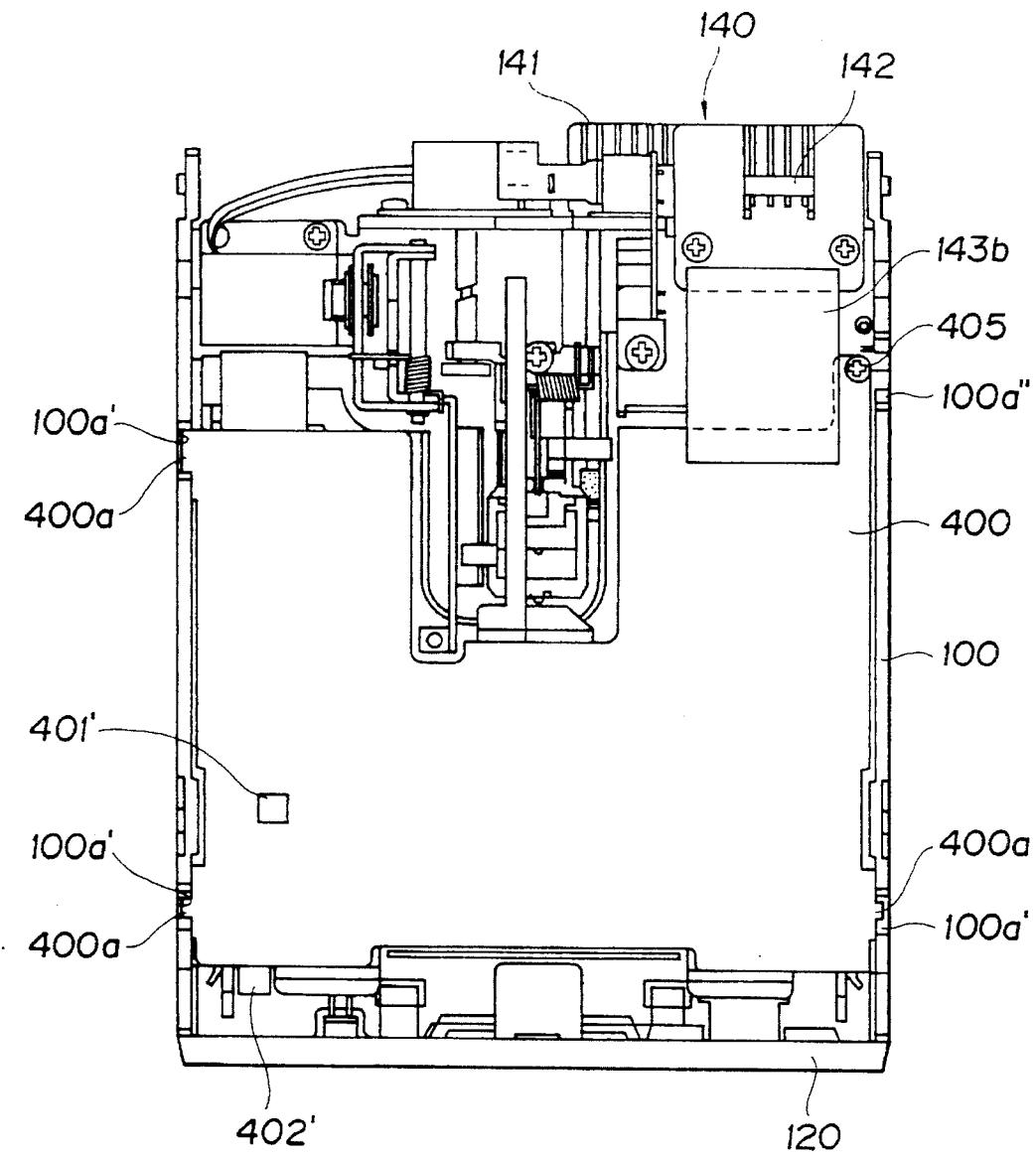
FIGS. 2A and 2B are plan views of the disc unit as shown in FIGS. 1A–1F when the shield cover is taken off.
Figure 2B:
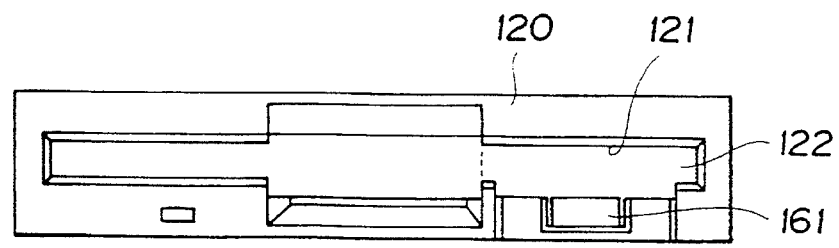

Now, a circuit board will be explained below. As shown in FIGS. 2A and 2B, a PCB 400, i.e. the main control circuit board, is mounted on the cassette guide 152 to cover various constituent members. As was already explained in the foregoing paragraphs with reference to FIGS. 3A to 3D and FIGS. 4A to 4D, the PCB 300 for the DD motor is provided on the upper surface of the base body 100. In the conventional FDD, the main PCB is arranged on the lower surface of the base body in line with the PCB for the DD motor in most cases. However, the main PCB of the present invention is arranged to be opposite to the PCB 300 for the DD motor across various constituent members.

Figures 1E, 1F:
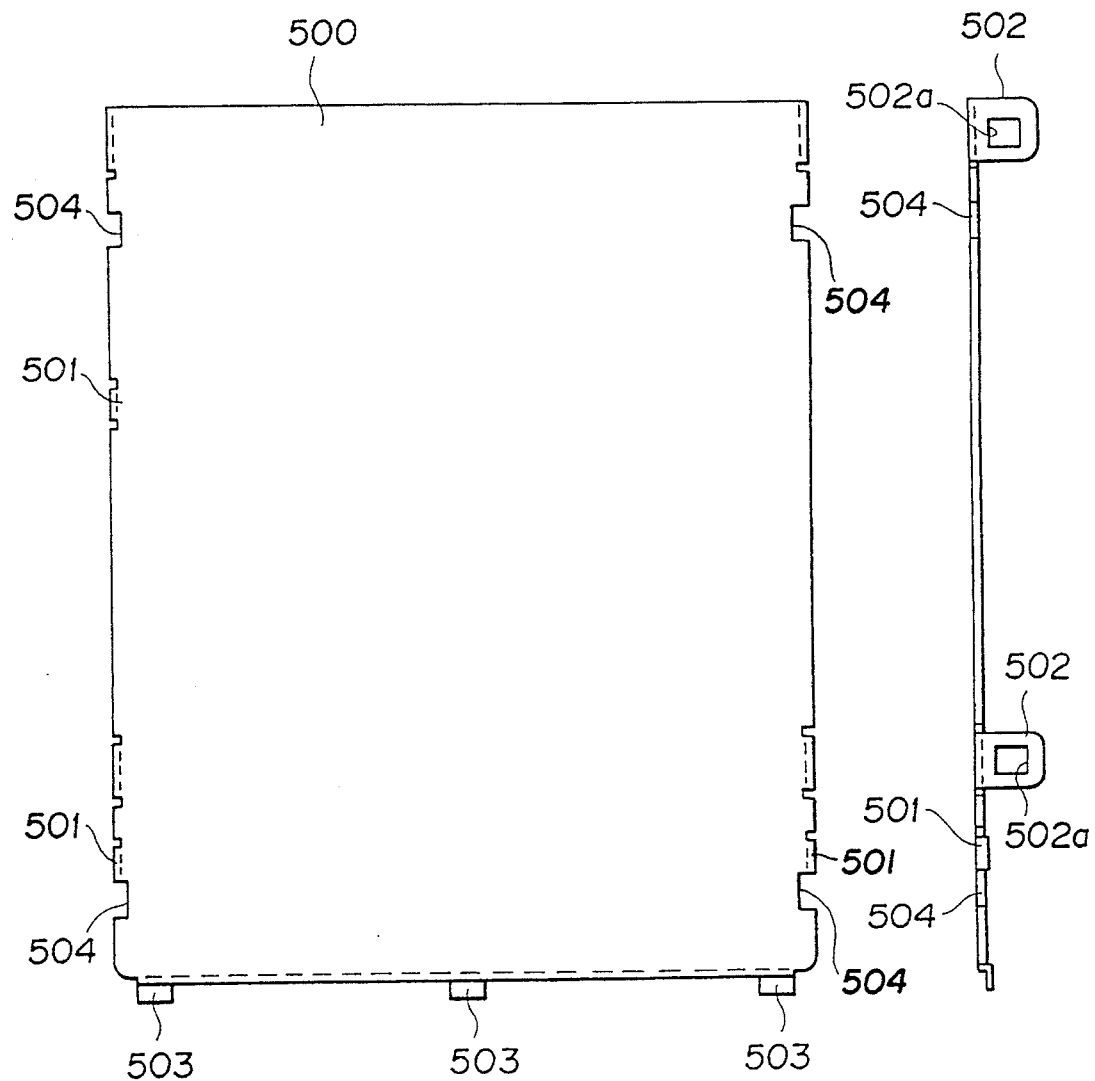
FIGS. 1E and 1F are a plan view and a front view, respectively, showing the shield cover of the disc unit in accordance with the embodiment of FIGS. 1A–1D.

Notches 100a' for supporting the main PCB 400 are formed at two positions on one side wall 100a of the base body 100 as shown FIG. 2A. A notch 100a' for supporting the PCB 400 is formed at one position on the other side wall of the base body. Further, a supporting portion 100a" for screwing the PCB 400 in extends from that side wall and is formed, for example, by cutting. Projecting tabs 400a for engagement are formed at respective positions which correspond to the notches 100a' formed on the side walls of the base body of the PCB 400. At the position which corresponds to the supporting portion 100a", a through hole for a screw 405 is formed, for example. With this structure, when the PCB 400 is incorporated into the FDD, the projecting portions 400a are engaged with the notches 100a' in the side walls of the base body and the supporting portion 100a" in the side wall of the base body receives the screw 405 via a through hole. The portion which is screwed in is only one portion. A shield cover 500 for shielding noise is mounted to cover the entire FDD, as shown in FIGS. 1A and 1B. This shield cover is a rectangular plate as shown in FIGS. 1E and 1F. This shield cover is mounted on the base body in such a manner that projecting sides 502 formed on both sides of the shield cover are superposed on the outer side of the side walls 100a of the base body 100, convex portions 100p formed in the side wall 100a are engaged with holes 502a in the projecting sides 502, and engagement portions 503 are engaged with the front panel 120. Further, tabs 400a formed in the PCB 400 are pressed by PCB pressers 501 formed at positions which correspond to the notches 100a' in the shield cover 500.

Figures 3B, 3C:
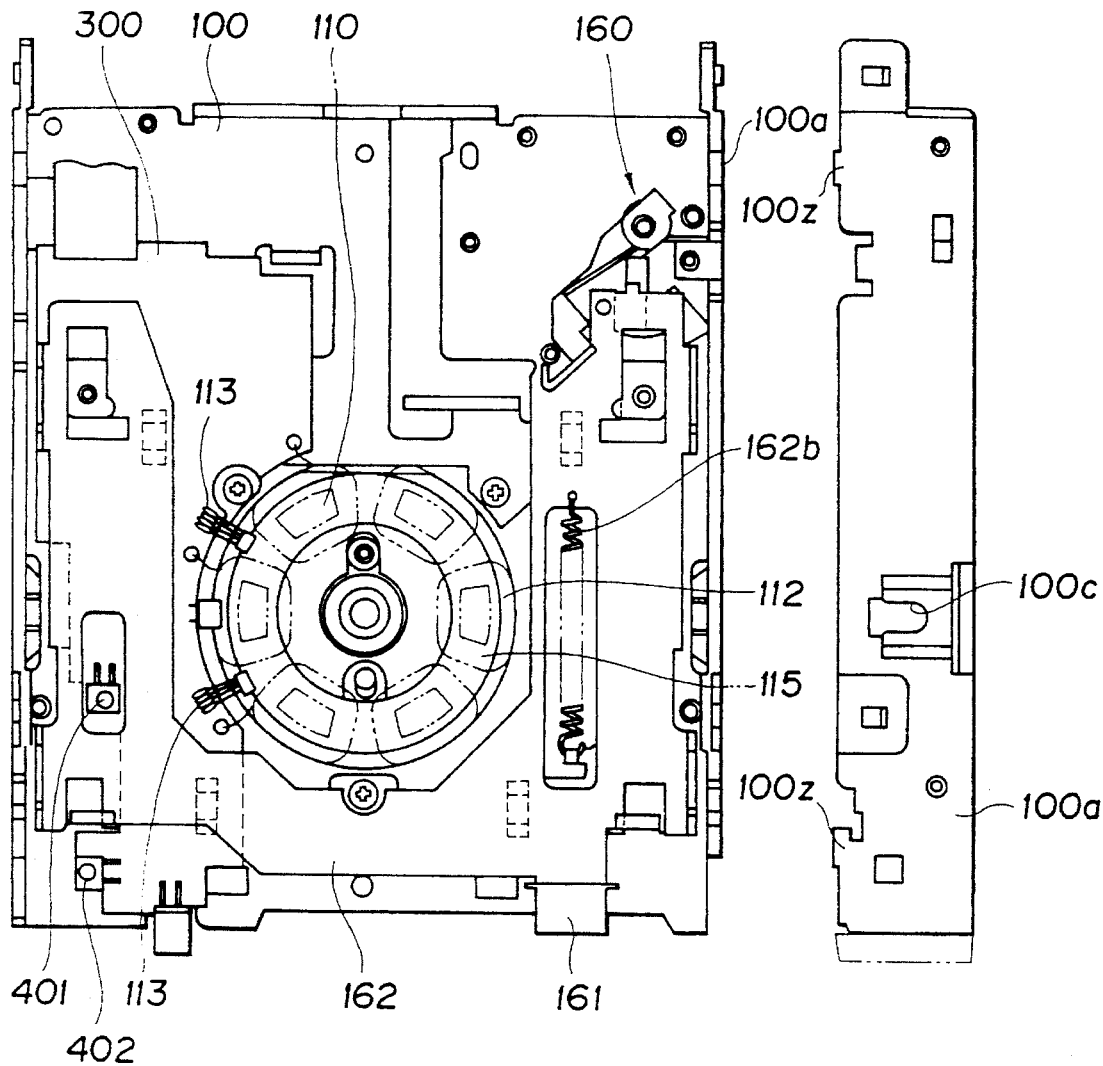

As shown in FIGS. 1E and 1F, on both sides of the shield cover 500, U-shaped notches (engaging portions) 504 are formed at four positions near the front end portion and nearby the rear end portion, respectively. As shown in FIG. 1A and FIG. 3C, projecting portions 100z are formed on the upper portions of the side walls 100a of the base body 100 at positions opposite to the notches 504.

When the shield cover 500 is mounted, the notches 504 are engaged with the projecting portions 100z without any gap or with an extremely small gap on the same plane as the shield cover.

In the state as described above, the main body of the FDD is in the form of a rectangular block consisting of the base body 100 and the shield cover 500, and the base body 100 is reinforced by the shield cover 500.

The above engagement may be loose and may be secured at the portions mentioned above by means of an adhesive agent, a screw or the like.

As described above, the PCB 400, which is the main control circuit board, is engagingly contained inside the side walls of the base body 100, and the shield cover 500 presses them so that the PCB 400 is held on the base body. By mounting the shield cover on the base body as described above, the shield cover serves as a reinforcing member for preventing distortion of the base body.

As was already discussed above, the PCB 300 for the DD motor and the PCB 400, i.e. the main control circuit board, are arranged to be opposed to each other on the same side with respect to the base body in accordance with the present embodiment. Further, both circuit boards have at least one pair of elements for emitting or receiving light which form transmission type optical sensors, the elements being positioned in such a manner that they are opposed to each other. For example, as shown in FIG. 3B, the circuit board 300 for the DD motor has either a light emitting element or a light receiving element 401 which provides half of a sensor for detecting a cassette, as well as a light emitting element or a light receiving element 402 which provides half of a sensor for detecting write protect. Further, as shown in FIG. 2A, the main control circuit board 400 has either a light receiving or a light emitting element 401' which provides the other half of the sensor for detecting a cassette, as well as a light receiving or a light emitting element 402' which provides the other half of the sensor for detecting write protect. Element 401' is disposed so as to be opposed to the element 401 for detecting the cassette and element 402' is disposed so as to be opposed to the element 402 for detecting write protect.

Further, as shown in FIG. 2A, FIG. 3A and FIGS. 17A–17C, a connector 140 is arranged at the end opposite the front panel 120 of the FDD. The connector 140 is used for interfacing the host apparatus, and consists of an I/O connector 141 connected to the main control circuit and a power connector 142 for the power source. Both connectors 141 and 142 are separated from the main control circuit board 400 in accordance with the present embodiment, and are superposed in tiers in the direction of the FDD thickness. In this case, the I/O connector 141 is mounted on a PCB 141a which is placed in a lower tier and the power connector 142 is mounted on the PCB 142a which is placed in an upper tier. However, this positional relationship can be reversed. The PCB 141a is connected to the PCB 142a through a flexible printed board (cable) 143a. Similarly, the PCB 142a is connected to the main control circuit board 400 through a flexible printed board 143b. The I/O connector 141 has many ground terminals. Since these ground terminals are connected to form one common lead wire pattern for connection, the number of the cables included in the flexible printed board 143b is reduced for saving space.

When the FDD having the structure as described above is mounted on an electronic apparatus such as computer, a word processor or the like, it is attached to the electronic apparatus by using screws, for example, through bottom mounting portions 101 provided at three positions on the reverse side of the FDD base body as shown in FIG. 1C. The FDD has four mounting portions in the form of a rectangle and one of these four portions is notched (102) as a relief portion. Therefore, the FDD is supported by the electronic apparatus on three supporting points. As a result, even if a portion of the electronic apparatus to which the FDD is secured is measured in error or a difference in height exists, stress which distorts the base body 100 is not applied to the base body 100.

Operation of the FDD in accordance with the present embodiment will be explained in the following paragraphs. The electric source for the electronic apparatus having the FDD mounted is switched on and then the disc cassette 150 is inserted into the cassette guide 152 of the FDD through the cassette inserting and ejecting portion 121 provided in the front panel 120 of the FDD (see FIGS. 5A and 5B).

At this moment, the cassette 150 is resisted by the shutter 122 urged by the coil spring 125 and the brake spring 123. However, since the cassette 150 is strongly pushed by hand, the resistance is no problem.

When the cassette 150 is inserted into the FDD, the sensor elements 401 and 401' for detecting the cassette and/or the sensor elements 402 and 402' for detecting the write protect of the cassette (disposed on the motor drive control board 300 and the main signal control board 400) start operating to input a signal indicating whether or not the cassette is inserted and/or the cassette is write protected to the host apparatus.

Figure 7A:
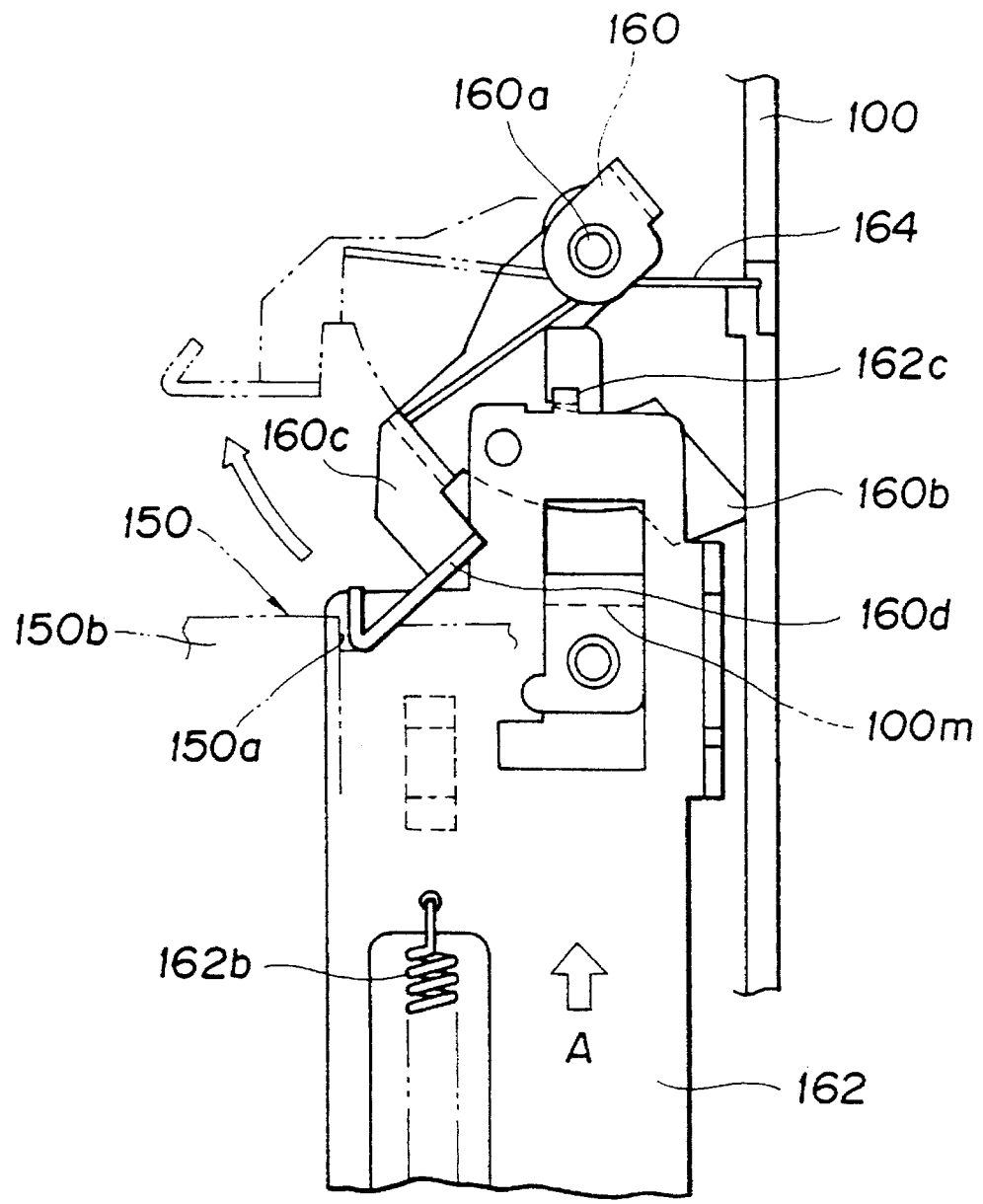
FIGS. 7A–7C are explanatory views showing the motion of the ejector.
Figure 7B:
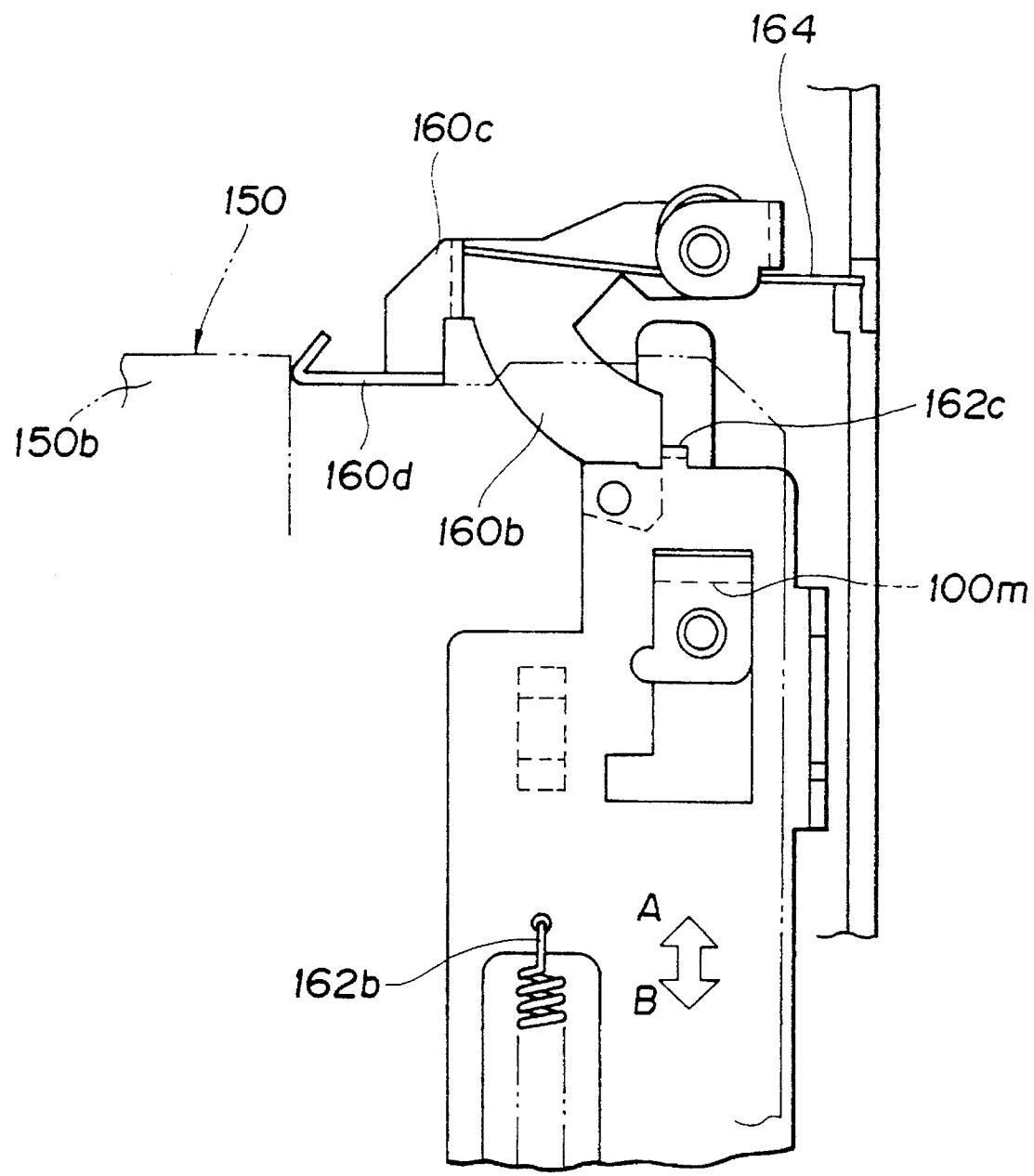

When the cassette 150 is inserted in the A direction as shown in FIG. 7A, the notch 150a formed in the front end edge of the cassette 150 contacts the cassette shutter releasing and pushing arm 160d extending from the arm portion 160c of the ejector 160. Then, the cassette shutter releasing and pushing arm 160d is pushed upwardly and rotates in the anticlockwise direction as shown in FIG. 7B against the urge of the ejector spring 164. At this moment, the shutter 150b of the cassette is pushed to the left as shown in FIG. 7B by the cassette shutter releasing and pushing arm 160d, so that the disc is exposed. When the cassette shutter 150b reaches the position shown in FIG. 7B, and the cassette shutter releasing and pushing arm 160d of the ejector 160 reaches a position parallel to the front end of the cassette shutter, the arcuate base 160b of the ejector 160 disengages latch portion 162c of the slide plate 162. Then, the slide plate 162 slides in the B direction as shown in FIG. 7B by the pulling of coil spring 162b.

The cassette guide 152 accommodating the cassette 150 has the projections 152a which extend on both sides thereof in engagement with the guide grooves 162e of the guide plates 162d on both sides of the slid plate 162 (see FIGS. 8A and 8B), so that when the slide plate 162 is pulled in the B direction as shown in FIG. 7B, force is exerted on the cassette guide 152. However, the cassette guide 152 does not move in the A-B direction. This is because projections 152b provided in the center portions on both sides of the cassette guide are engaged with guide grooves 100c formed on both sides 100a of the base body 100. Further, since the guide grooves 162e are long grooves which incline downwardly, the slide plate is forcibly moved downwardly by guide grooves 162e to a fixed position when the slide plate 162 is pulled by spring 162b.

Now, the following paragraphs concern the case where the FDD is provided with a damper mechanism (see FIGS. 12–14B) as the head assembly buffer mechanism.

As was discussed above, the damper 171 is provided with a damper arm 172. The damper arm 172 is biased to rotate downward by the coil spring 175 wound around the support shaft 174. Since the first probe 176 (extending downwardly at the end of the damper arm 172) is supported on the upper surface of the cassette guide 152, the downward movement when the cassette is not inserted is limited. When the slide plate 162 is moved by the insertion of the cassette, and then, the cassette guide 152 is also moved toward the base body 100, the damper arm 172 supported on the upper surface of the cassette guide 152 is moved downwardly by the urge of the coil spring 175. However, oil is enclosed in the damper, and the damper arm 172 slowly descends due to resistance of the oil. Then, the head arm 201 of the head assembly 200 slowly descends while the lifter 204 on head arm 201 is supported by the damper arm 172. The first surface head 205 softly lands onto the disc 10 and the disc 10 is sandwiched between the zero surface head 206 and the first surface head 205.

The disc 10 rotates in the state described above, while reading or writing is performed.

Further, as described above, the damper is provided with the second probe 177. When the damper arm 172 descends, the second probe 177 contacts the upper surface of the base body 100, so that the downward movement of the damper arm 172 is limited. In such a state, as shown in FIG. 14B, a predetermined gap exists between the lifter 204 of the head arm 201 and the damper arm 172.

Next, the following paragraphs concerns the case where the FDD is provided with a solenoid mechanism (see FIGS. 15–16C) as the head assembly buffer mechanism.

When the latch portion 162c of the slide plate 162 disengages from the ejector 160 due to insertion of the cassette 150, the slide plate 162 is pulled toward the front panel side by the spring 162b. As a result, the cassette guide 152 is moved downwardly by the guide plates 162d of the slide plate 162 and the projections (see FIGS. 8A and 8B). Then, though the downward movement of the head load arm 183 is limited due to the existence of the probe 187a which engages the upper surface of the cassette guide 152, the head load arm is rotated by the coil spring 184c in a clockwise direction as shown FIG. 16A. Then, the second probe 187b contacts the outer end of the plunger 182 so that the rotation of the head load arm 183 is limited, whereby the head load arm 183 is kept at a stand-by position as shown in FIG. 16B. At this position, the first probe 187a occupies a position at a predetermined distance from the upper surface of the cassette guide 152. The first surface head 205 also stands by at a predetermined distance from the disc 10. When the solenoid 181 is used, normally, the disc starts rotating immediately when the switch of the host apparatus to which the FDD is attached is turned on.

Subsequently, electric current is supplied to the solenoid 181. As shown in FIG. 16c, the plunger 182 is pulled against the urge of the plunger returning spring 185, so that the head load arm 183 is further rotated in the clockwise direction by the coil spring 184c. Then, the head arm 201 is released from the head load arm 183, descends by the urge of a coil spring 203a (see FIG. 11) having an effect on the head arm 201, and then, the first surface head 205 contacts the disc 10. Reading or writing information is desirably performed in this state.

When the power supply to the solenoid 181 is interrupted, the plunger 182 is returned to the standby position shown in FIG. 16B by the plunger returning spring 185, and the first surface head 205 is spaced from the disc 10.

As was described above with reference to FIGS. 9–11, the head assembly 200 is slidably guided by a guide bar 133 (supported by the base body 100) by means of slide bearings 134 attached to the head carriage 201a. The needle pin 202 is provided on the head assembly and engages with a screw groove 131a of the screw shaft 131 of the stepping motor 130, so that the head assembly 200 is moved by the stepping motor 130.

Explanations regarding control of the positioning of the magnetic heads 205 and 206 by the movement of the head assembly 200 are omitted herein, because it is performed in accordance with a well known system.

Figure 7C:
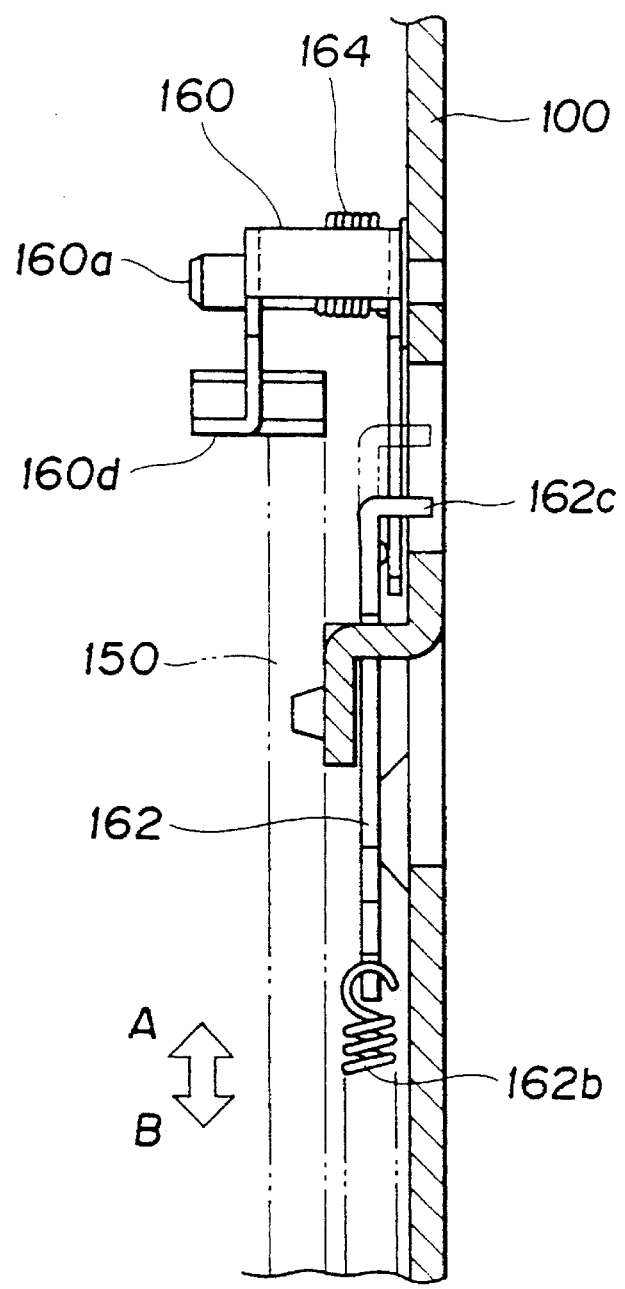

As was described above, when the reading of information from the disc and writing of information thereon have been completed, the ejection button 161 (see FIGS. 3B and 3D) provided at the front of the FDD is pushed and then, the slide plate 162 slides from the position shown in FIGS. 7B and 7C in the A direction against the urge of the coil spring 162b. As a result, the latch 162c on the slide plate 162 is displaced from the end of the arcuate base 160b of the ejector 160. Then the arm 160c of the ejector 160 is rotated in the anticlockwise direction by the ejector spring 164, and moves to an ejecting position as shown in FIG. 7A. The cassette 150 is pushed out toward the front panel 120 by the anticlockwise rotation of the cassette pushing and shutter releasing arm 160d. While the cassette pushing and shutter releasing arm 160d of the arm 160c of the ejector 160 is rotated, the shutter 150b of the cassette 150 is gradually released from the arm 160d and closed by a spring mechanism (not shown), so that the cassette 150 is ejected from the FDD with its shutter 150b closed.

The transfer of the cassette 150 is securely braked by a strong damping force exerted by the shutter 122, which is urged by the brake spring 123 and the coil spring 125 in the inner side of the front panel 120 of the FDD as shown in FIGS. 5A and 5B. This prevents damage to the cassette by keeping it from jumping out and dropping. When the cassette 150 is first inserted, only the coil spring 125 has an effect on the shutter 122, and thus, the load imposed on the cassette 150 is not large.

In accordance with the structure as described above, the disc unit records information on a rotating disc which serves as a recording medium and reads information therefrom. The base body 100 of the disc unit is engaged with the control circuit board 400, and the noise shielding cover 50 presses the tabes 400a against the base body to prevent disengagement thereof so that the circuit board is maintained on the base body. Further, in accordance with this structure, the shield cover 500 serves as a reinforcement member to prevent distortion of the base body, so that by maintaining the control circuit board 400 on the base body with the press of the shield cover, fixing members such as multiple screws for fixing the control circuit board can be omitted. This permits cost reduction by reducing the number of components. Further, the present invention can employ a base body which is configured so that the disc unit can be miniaturized, thinned, and lightened without reducing reliability. Distortion of the base body is prevented by reinforcing the base body with the shield cover 500. The shield cover is mounted in engagement with the base body 100 at a plurality of portions on the same plane. Thus, by using the shield cover 500, which is a thin plate made of a light-weight but not very strong material such as aluminum or the like, the base body 100 can be reinforced to prevent distortion. As a result, the base body 100 allows a miniature, thin, and light-weight disc unit to be made without reducing reliability.

Figure 4A:
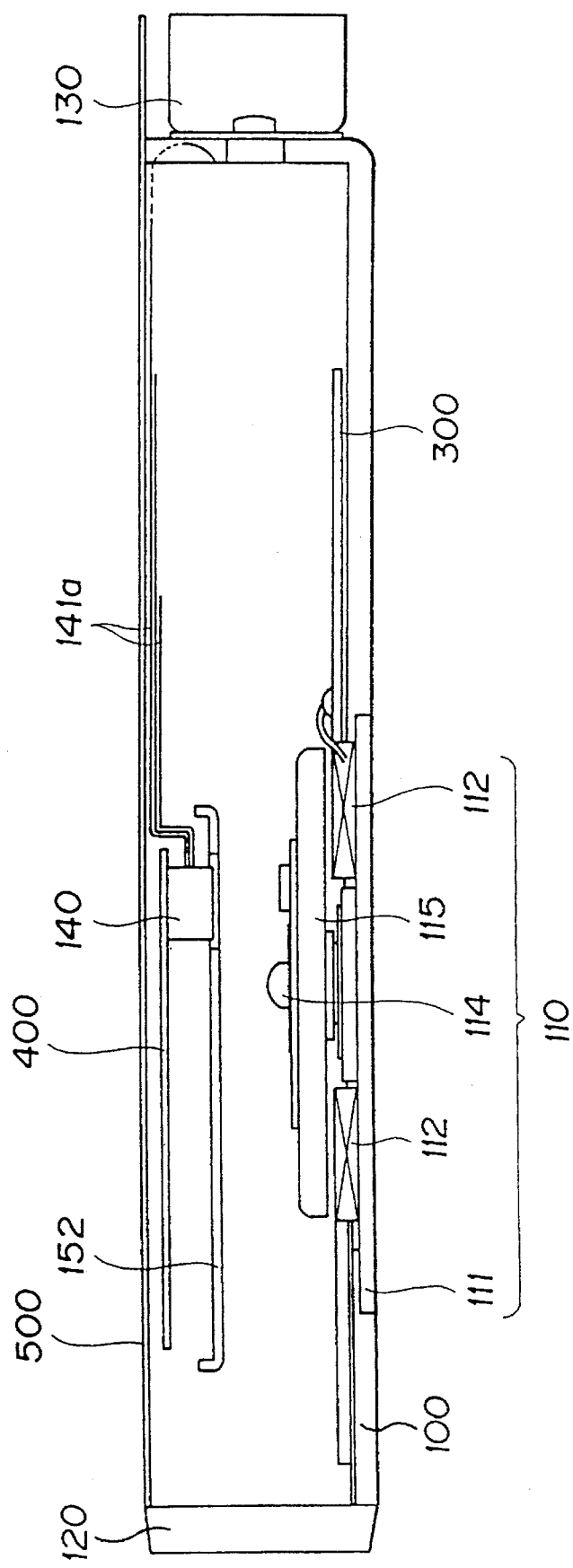
FIG. 4A is a cross sectional side view showing the disc unit into which the DD motor is incorporated.
Figure 4B:
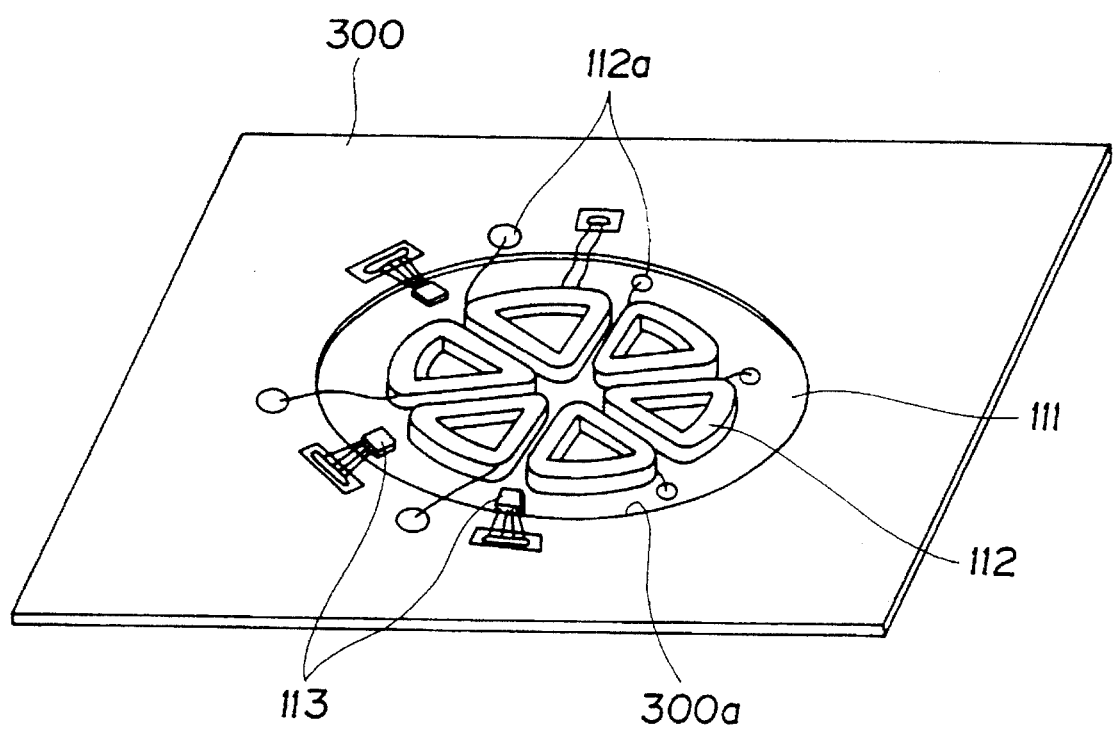
FIG. 4B is a partially cutaway perspective view showing the arrangement of a coil assembly and Hall elements of the DD motor.
Figure 4C:
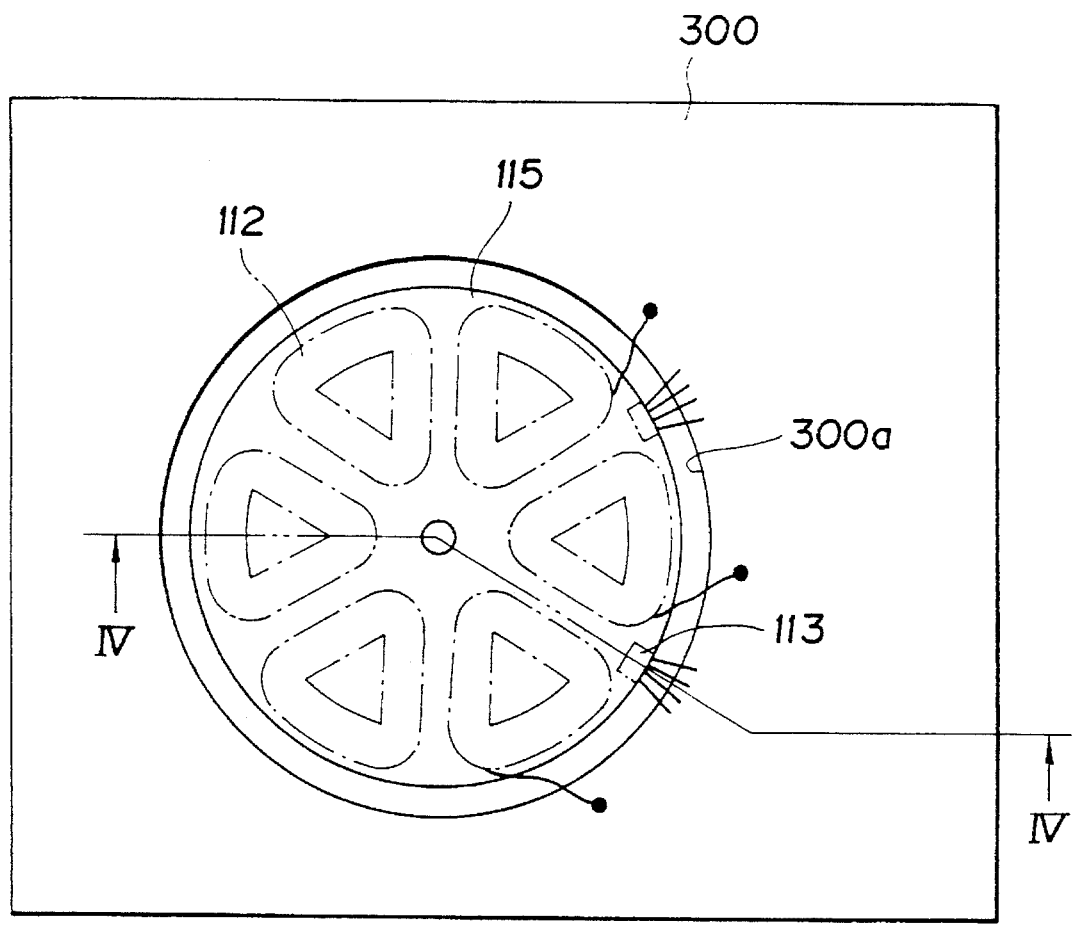
FIG. 4C is a plan view showing the DD motor.
Figure 4D:
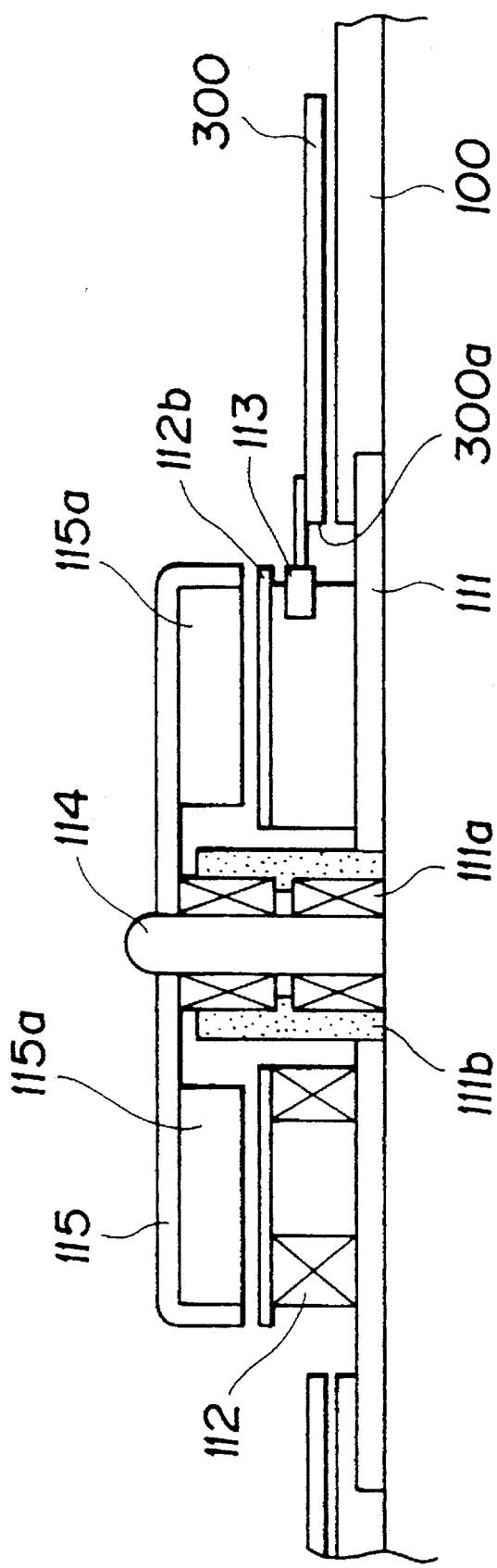
FIG. 4D is a cross sectional view taken on line IV—IV in FIG. 4C.

The structure as described above is effectively applicable to various kinds of disc units. That is, if the base body, the shield cover and the control circuit are selected to be structured and arranged as described above, a disc unit having that is thin, light-weight, and less expensive than conventional disc units can be provided. However, if other mechanisms mounted in the disc unit are also considered, the effects as described above will be reduced. In the embodiments described below, appropriate modifications are added to the rotating driving portion for rotating the disc. More specifically, the portion for rotating the disc as shown in FIG. 4D can be replaced with these modifications.

The Second Embodiment

Figure 18:
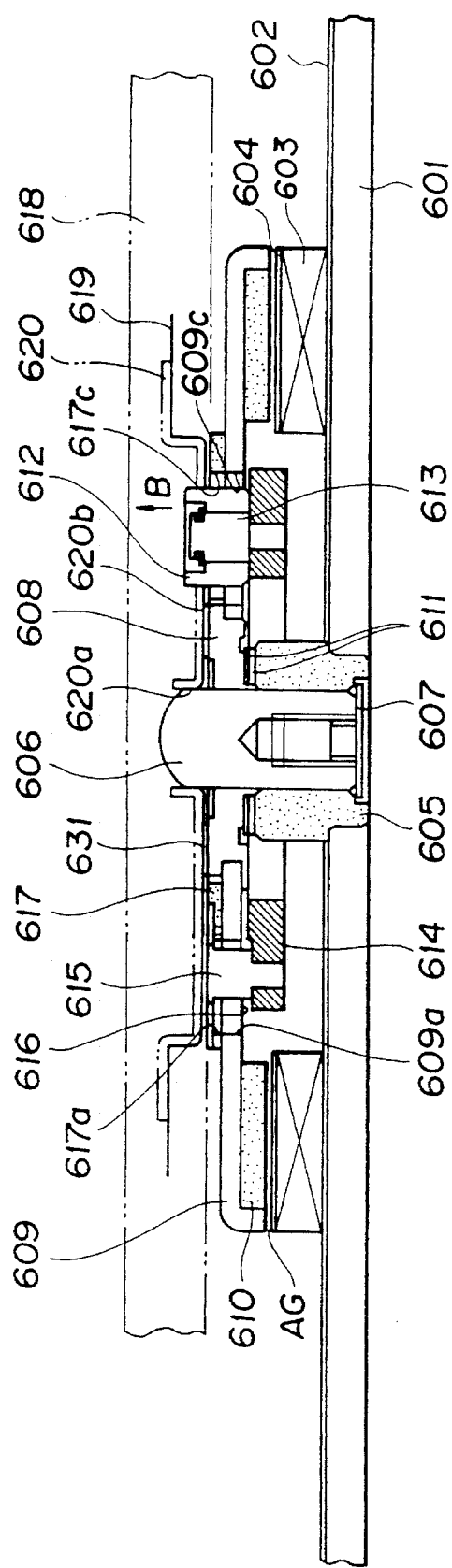
FIG. 18 is a longitudinal cross sectional view showing the structure of the rotating driving portion for rotating the disc in the disc unit in accordance with the second embodiment of the present invention.
Figure 19:
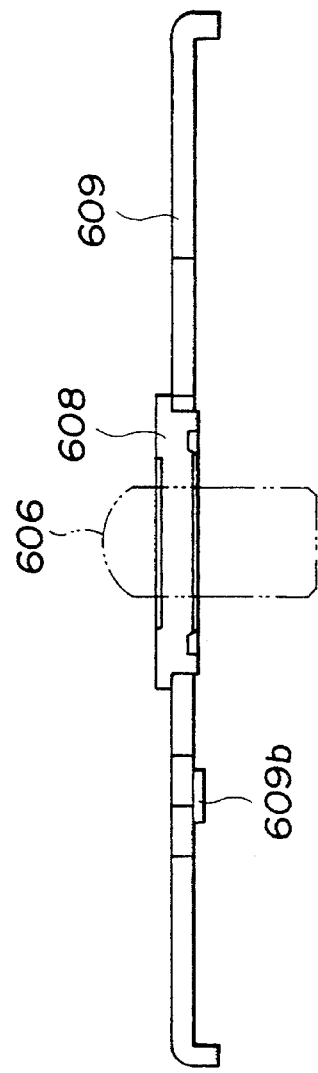
FIG. 19 is a longitudinal cross sectional view showing a rotor yoke portion as shown in FIG. 18.

FIGS. 18 and 19 are explanatory views showing the structure of a rotating driving portion for rotating a disc. The rotating driving portion includes a DD motor and a chucking mechanism which are applicable to the structure as shown in FIGS. 4A–4D or can be a substitute structure of the disc unit.

FIG. 18 shows a longitudinal cross section of the whole rotating driving portion. In this figure, reference numeral 618 is a disc cassette for a floppy disc, and is the same as the cassette 150 as described above. A disc 619 made from a circular magnetic sheet is rotatably accommodated in the cassette 618. A hub 620 made from an iron plate or the like is secured to a central portion of the disc 619. The hub 620 has a hole 620a for engaging with a spindle 606 as described later. Reference numeral 601 is a base or chassis for supporting each constituent member of the FDD. According to the present embodiment, this chassis per se is made of a magnetic material such as iron plate and also serves as a stator yoke. As shown in FIG. 4D, different materials may be used both for the base body and the stator yoke. According to the present embodiment, the DD motor comprises the chassis 601 and the following members as designated by reference numerals 602 to 611.

A FPC (Flexible Printed Circuit) 602 having the DD motor drive control circuit (not shown) corresponds to the PCB 300 and is fixedly mounted on the chassis 601. A thin glass epoxy resin may be used in addition the FPC. A coil 603 assembly, which may have the same structure as shown in FIG. 4B, is fixedly provided on the FPC 602. Provided on the coil 603 is a pattern 604 forming a frequency generator for generating a pulse signal whose frequency corresponds to the rotational speed of the DD motor. Pattern 604 is like the pattern 112b for Fg as described above.

A slip bearing or slide shaft receiver 605 is fixed into the chassis 601 by pressing or the like at the central portion where the DD motor is provided. The spindle 606, which is the output rotational shaft of the DD motor, slides and is rotatably engaged with the slid shaft receiver 605. At the end of the spindle 606 on the side of the chassis 601, a screw 607 for loose stopping is provided to prevent the loosening of the spindle 606 toward the side where the disc cassette 618 is attached, i.e. in an upward direction in the figure.

Figure 20:
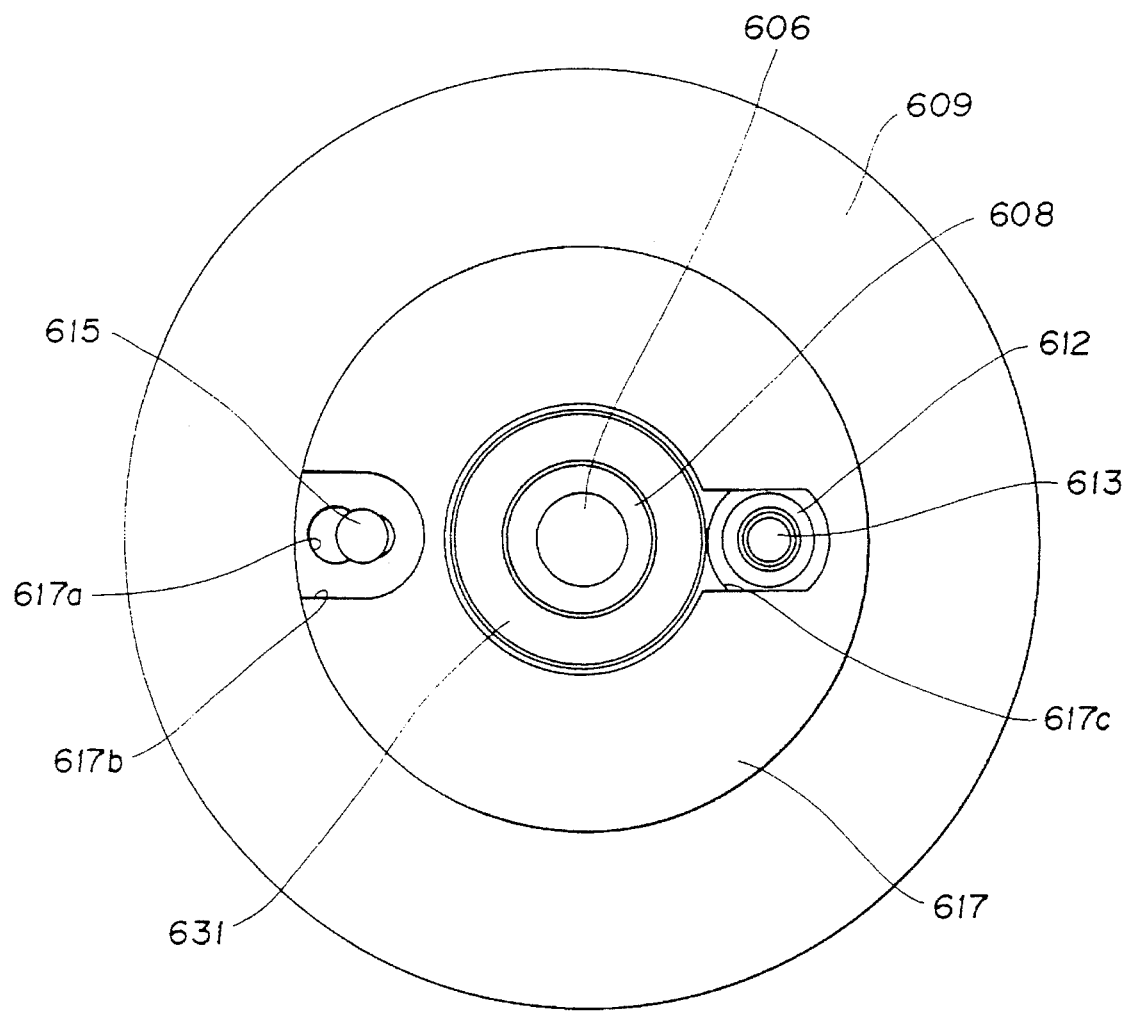
FIGS. 20 and 21 are a top view and a bottom view, respectively, showing the rotor yoke portion as shown in FIG. 18.

A disc shaped bushing 608 is provided on the upper portion of the spindle 606. A cylindrical rotor yoke 609 made of an iron plate is fixed on the outer periphery of the bushing 608 as shown in FIG. 20, which illustrates the upper surface of the rotor yoke. The bushing may be integrally formed with the rotor yoke 609. A magnet 610 is fixedly provided on the bottom side of the rotor yoke 609 to be opposed to the coil 603 assembly through an air gap AG. FIG. 19 is a longitudinal cross sectional view showing only the rotor yoke 609.

In the DD motor comprising the members described above, as shown in FIG. 18, a thrust load is imposed downwardly on the spindle 606 by the mass of the spindle 606, by the members supported by the spindle 606, and by the magnetic force which exerts between the magnet 610 and the chassis 601. The thrust load is held on the upper surface of the bearing 605. In order to decrease the rotation load on the DD motor due to the thrust load, a thrust washer 611 made of a fluoro-carbon resin or the like, which has a small coefficient of friction, is interposed between the upper surface of the bearing 605 and the lower surface of the bushing 608 provided opposite the bearing 605.

In the DD motor as structure above, when current is supplied to the coil assembly 603 in a predetermined timing pattern, the rotor yoke 609 is rotated together with the bushing 608 and the spindle 606 by the magnetic force acting between the coil assembly 603 and the magnet 610. The hub 620 of the disc 619 in the disc cassette 618 is also rotated.

Now, the following paragraphs concern the structure of the chucking mechanism for holding the hub 620 of the disc 619 on the DD motor and for transmitting the rotational driving force of the DD motor.

The chucking mechanism has the following constituent members denoted by reference numerals 612 to 617 and 631 as shown in FIG. 18. These members are mounted on the lower surface and the upper surface of the rotor yoke 609 of the DD motor.

Reference numeral 612 is a driving pin which engages the hub 620 to transmit the rotational driving force of the DD motor. This driving pin is provided at one end of a shaft 613 which is mounted on a support plate 614.

The support plate 614 is formed of a plastic magnet, i.e. a magnet made of plastic filled with a magnetized magnetic powder. Support plate 614 is shaped as a disc, with one side of it being notched in a substantially triangular form as shown in FIG. 21 (showing the bottom side of the rotor yoke 609).

A shaft 615 is used for mounting the support plate 614 of the rotor yoke 609. Shaft 615 is positioned at the end opposite to the driving pin 612 of the support plate 614. A hole 609a in rotor yoke 609 has a shape which is a combination of two circles, where each of these circles has a different diameter. The shaft 615 is inserted through the hole 609a as well as through a hole 617a (having the same shape as that of the hole 609a) in an absorption or attraction magnet 617 which will be described later. A flange provided on the upper end of the shaft 615 is engaged with the edges of the narrow portion of the hole 617a.

Figure 21:
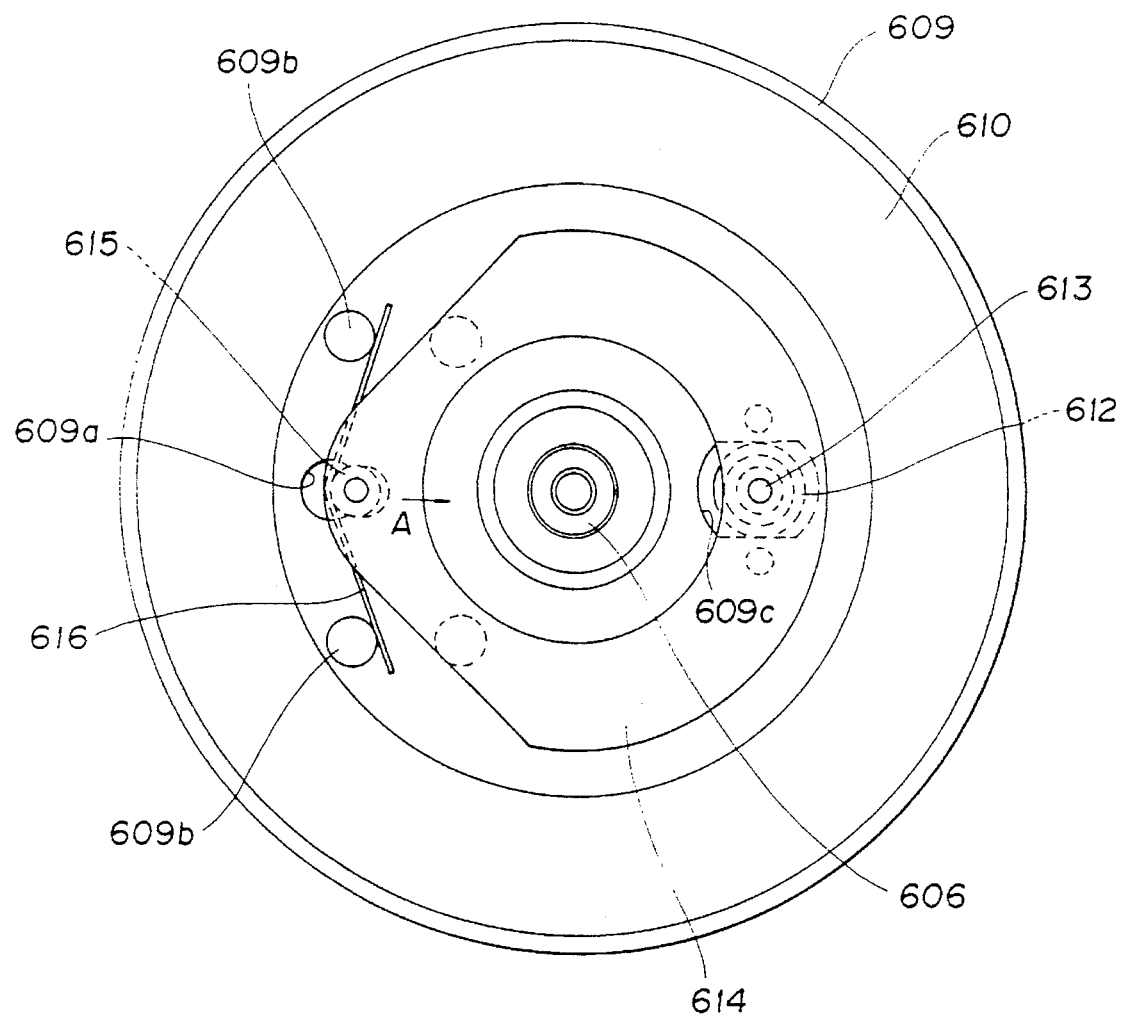

The shaft 615 is biased by a wire spring 616 extending between bosses 609b and 609b formed on the lower surface of rotor yoke 609 at either side of the hole 609a as shown in FIG. 21. Accordingly, the shaft 615 is urged in the direction A in FIG. 21, i.e., in the direction toward the driving pin 612. By this urge, the shaft 615 is displaced to the narrower portions of the holes 609a and 617a, and the flange disposed at the upper end of the shaft 615 is engaged with the edges of the hole 617a, whereby the shaft 615 is mounted on the rotor yoke 609 and the support plate 614 is rotatably disposed at the rotor yoke 609 and movably supported in the upper and lower direction of FIG. 18 relative to the rotor yoke 609.

Further, the support plate 614, being made of a plastic magnet, has its own magnetic force attracting the rotor yoke 609, which is made of magnetic material. The support plate 614 is urged by its own magnetic force in the upper direction with respect to FIG. 18. Also, the driving pin 612 is urged to project from the rotor yoke 609, through a hole 609c formed in the rotor yoke 609 and a hole 617c formed in the absorption magnet 617, in the direction B shown in FIG. 18.

The attraction magnet 617 is provided for attracting and holding the hub 620 of the disc 619 with a magnetic force. It is mounted on the upper surface of the rotor yoke 609. The magnet 617 is made of a plastic magnet in the form of a circular ring plate as shown in FIG. 20, and is arranged to surround the bushing 608 at the central portion of the rotor yoke 609. The magnet 617 has holes 617a and 617c for allowing the shaft 615 and the driving pin 612 as described above to penetrate, respectively. The hole 617a has a concave portion 617b in its periphery, and is formed not to project the upper end of the shaft 615 on the upper surface where the magnet 617 attracts the hub 620. The magnet 617 is integrally fixed at the rotor yoke 609 by an adhesive or the like.

A circular ring shaped washer 631 is made of a fluorocarbon resin or the like and has a small coefficient of friction. Washer 613 is provided on the bushing 608, which is disposed inward of the magnet 617, for facilitating the interaction of the rotor yoke 609 and the hub 620 at the beginning of chucking as will be described later.

Now, the chucking operation of the chucking mechanism will be explained. In chucking, by means of the cassette load mechanism as described above, the disc cassette 618 is loaded onto the rotor yoke 609, the central hole 620a of the hub 620 is engaged by the spindle 606, and subsequently, the hub 620 is attracted and held on the washer 618 by the magnetic force of the magnet 617. The driving pin 612 is pushed down by the attracted hub 620 in the direction opposite arrow B in FIG. 18, and assumes a position lower than that indicated in the figure.

In the meantime, the DD motor is driven when a current is supplied to the coil assembly 603, and the rotor yoke 609 rotates along with the bushing 608 and the spindle 606. The driving pin 612 idles along with the rotor yoke 609 with respect to the lower surface of the hub 620. When the driving pin 612 comes to a position where an engaging opening or hole 620b for engagement of the hub 620 is located, the driving pin 612 engages the hole 620b by moving in the B direction due to the urge of the above support plate 614. Then, the driving pin 612 engages with the edge of the hub 620b by the urge in the A direction due to the wire spring 616 as shown in FIG. 21. Namely, the driving pin 612 engages with the hub 620, the rotational driving force of the DD motor is transmitted to the hub 620 through the driving pin 612, and the disc 619 is also rotated. Subsequently, the magnetic head (not shown in FIGS. 18–21) slidably contacts the rotating disc 619 so that recording or reading can be performed.

As described above, according to the present embodiment, the absorption magnet 617 is integrally mounted on the upper surface of the rotor yoke 609 of the DD motor of the FDD, the support plate 614 of the driving pin 612 for transmitting the rotational driving force is mounted on the lower side of the rotor yoke 609, and the chucking mechanism is based on the rotor yoke 609 and integrally formed with the DD motor. Thus, the height of a rotating driving portion comprising the DD motor and the chucking mechanism can be significantly reduced, as compared with conventional units in which a spindle hub is provided on the upper portion of the DD motor and the chucking mechanism is based thereon. As a result, the FDD as a whole may be made thinner by combining the above technique with the effects produced in accordance with the embodiments as described earlier.

Further, according to the present embodiment, the spindle 606 is supported by the slide bearing 605. It is easy to reduce the height as compared with the case in which a ball bearing is used, because a short bearing is used in this case. By reducing the height of the slide bearing, the DD motor can be made thinner as a whole. The FDD as a whole can be thinned in this manner, too.

Further, according to the present embodiment, the spindle hub conventionally used is excluded, so that constituent members which correspond to the spindle hub are unnecessary. Thus, the cost of the FDD can be reduced.

The structure as described above is such that the urge of the driving pin 612 in the B direction is performed by the magnetic force of the support plate 614. However, the urging system is not limited to a system employing a magnetic force, but other systems employing a spring or the like can also be used. In short, the FDD as a whole can be made thinner when the chucking mechanism is mounted on the rotor yoke of the DD motor, and is based on the rotor yoke integrally with the DD motor regardless of which system is used in the chucking mechanism.

The Third Embodiment

Figure 22:
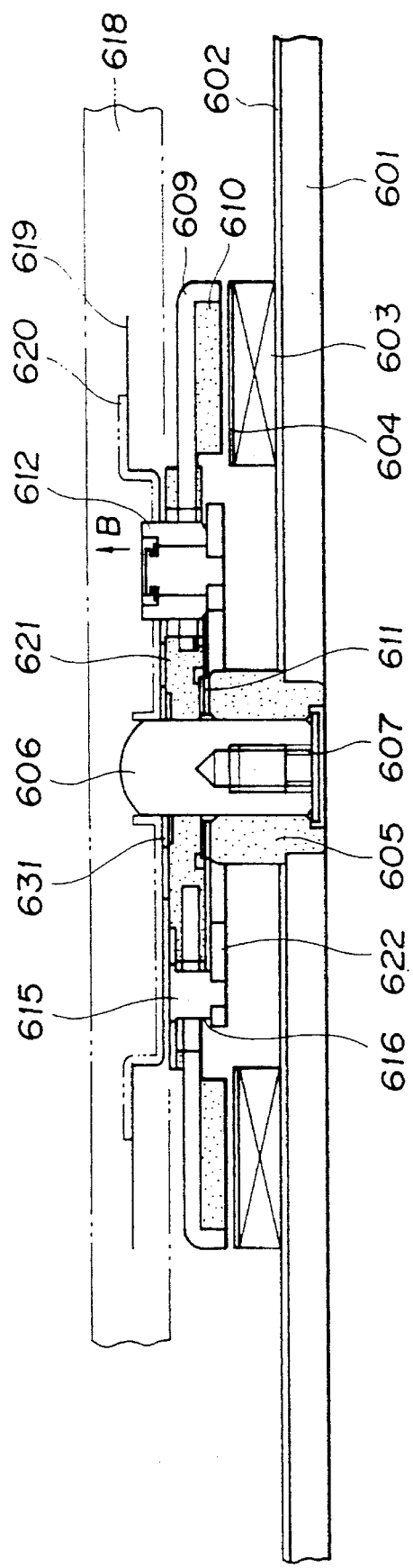
FIGS. 22 is a longitudinal sectional view showing the rotating driving portion for rotating the disc in the disc unit in accordance with the third embodiment of the present invention.
Figure 23:
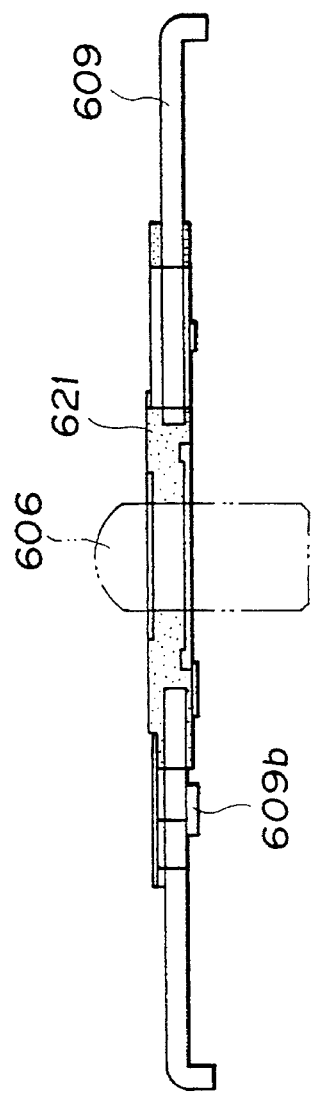
FIG. 23 is a longitudinal cross sectional view showing the rotor yoke portion as shown in FIG. 22.
Figure 24:
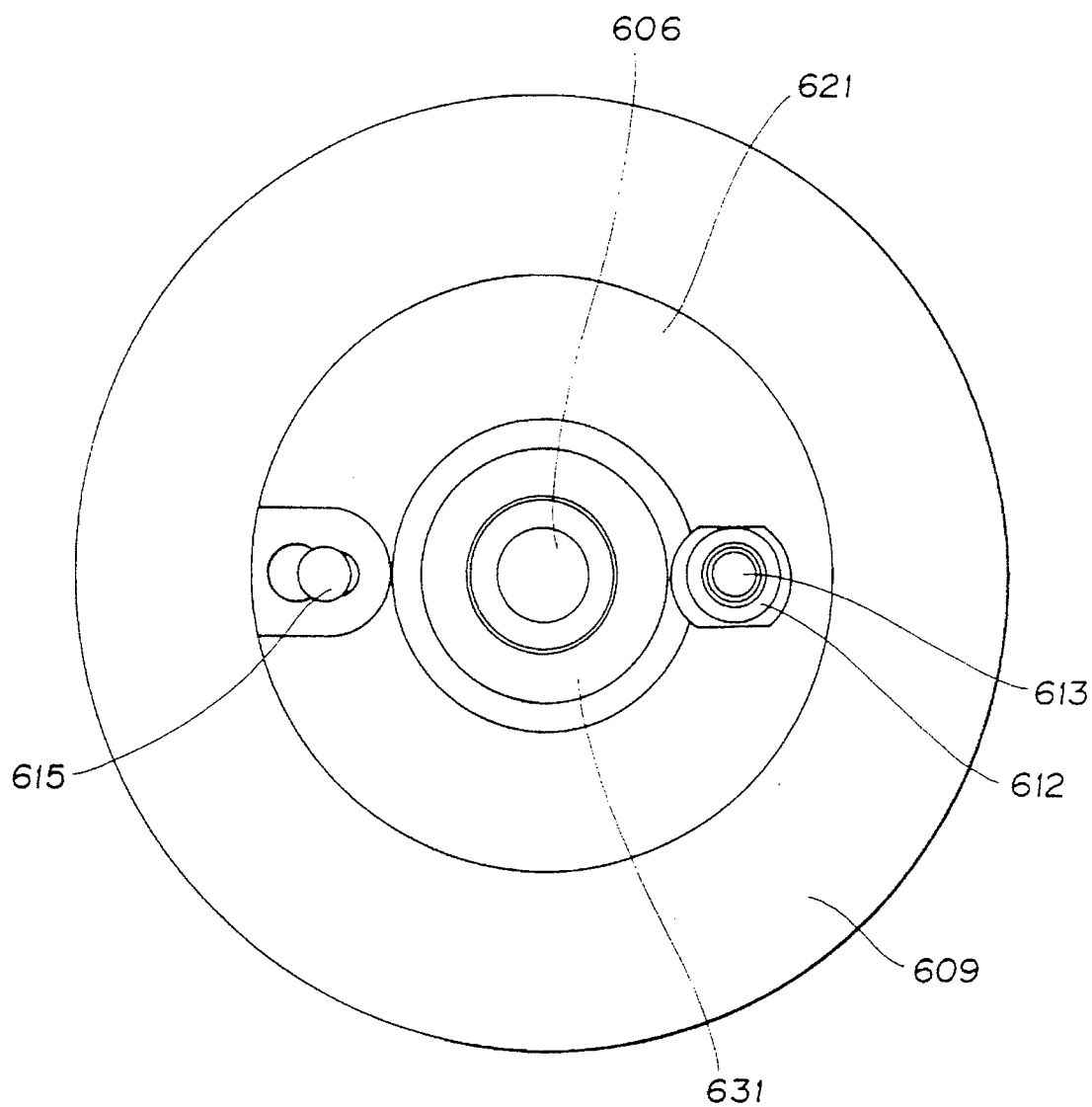
FIG. 24 is a top view showing the rotor yoke portion as shown in FIG. 22.

FIGS. 22, 23 and 24 are shown to explain the structure of the driving rotating portion of the FDD in accordance with the third embodiment of the present invention. In these figures, the same members as those shown in FIGS. 18 through 21, are denoted by the same reference numerals. Explanations of these members will be omitted.

A difference between the embodiment shown in FIGS. 22 through 24 and the embodiment shown in FIGS. 18 through 21 resides in that a magnet indicated by reference numeral 621 is provided integrally with the rotor yoke 609 and embedded in the central portion of the rotor yoke 609. The magnet 621 is made of a plastic magnet in the form of a disc. The spindle 606 penetrates the central portion of the magnet 621 and is fixed therein. The magnet 621 is formed integrally with the rotor yoke 609, for example, by inserting molding. The spindle 606 may be molded together with the magnet 621 by insert molding. A system using an adhesive or caulking or the like other than insert molding can also be used for attaching magnet 621.

In the present embodiment, a support plate 622 for supporting the driving pin 612 is not formed of a magnet, but instead a magnetic material such as an iron plate or the like which is not magnetized is employed.

In the present embodiment, the hub 620 of the disc 619 is absorbed and held by the magnet 621 on chucking, and the support plate 622 is absorbed by the magnet 621 to urge the driving pin 612 in the B direction.

With the above structure, the FDD may be formed thinly as well as in accordance with the embodiments as shown in FIGS. 18 through 21. Further, the absorption of the hub 620 and the urging of the driving pin 612 for chucking can be performed by only one magnet 621. Thus, since the structure is simplified, and the magnet 621 also serves as the bushing 608, the number of constituent members may be further reduced. This permits cost reduction.

The Fourth Embodiment

Figure 25:
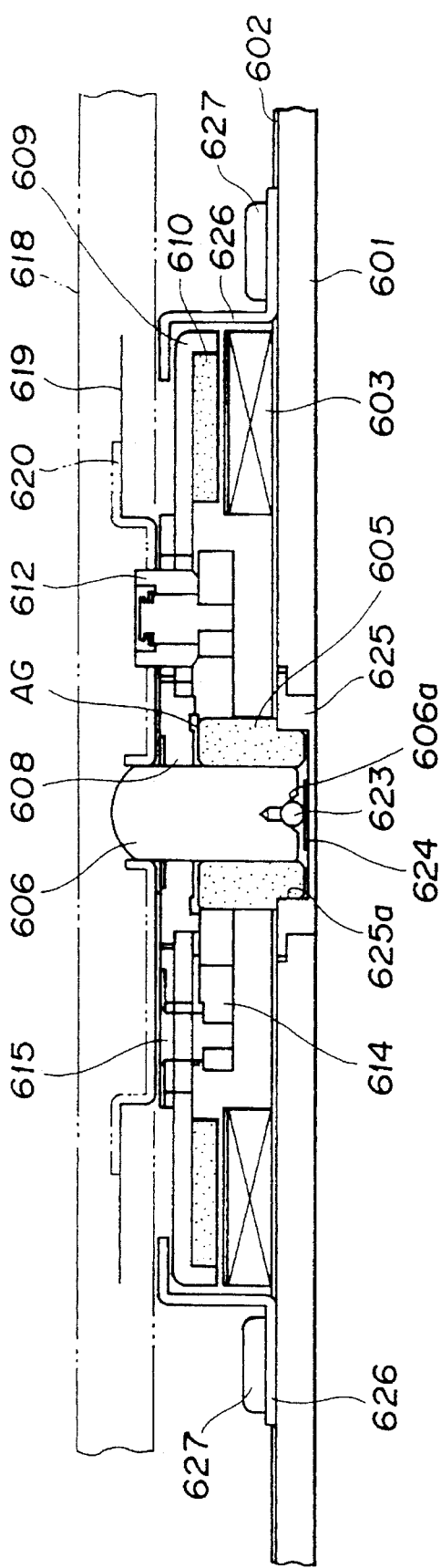
FIG. 25 is a longitudinal cross sectional view showing the rotating driving portion for rotating the disc in the disc unit in accordance with the fourth embodiment of the present invention.
Figure 26:
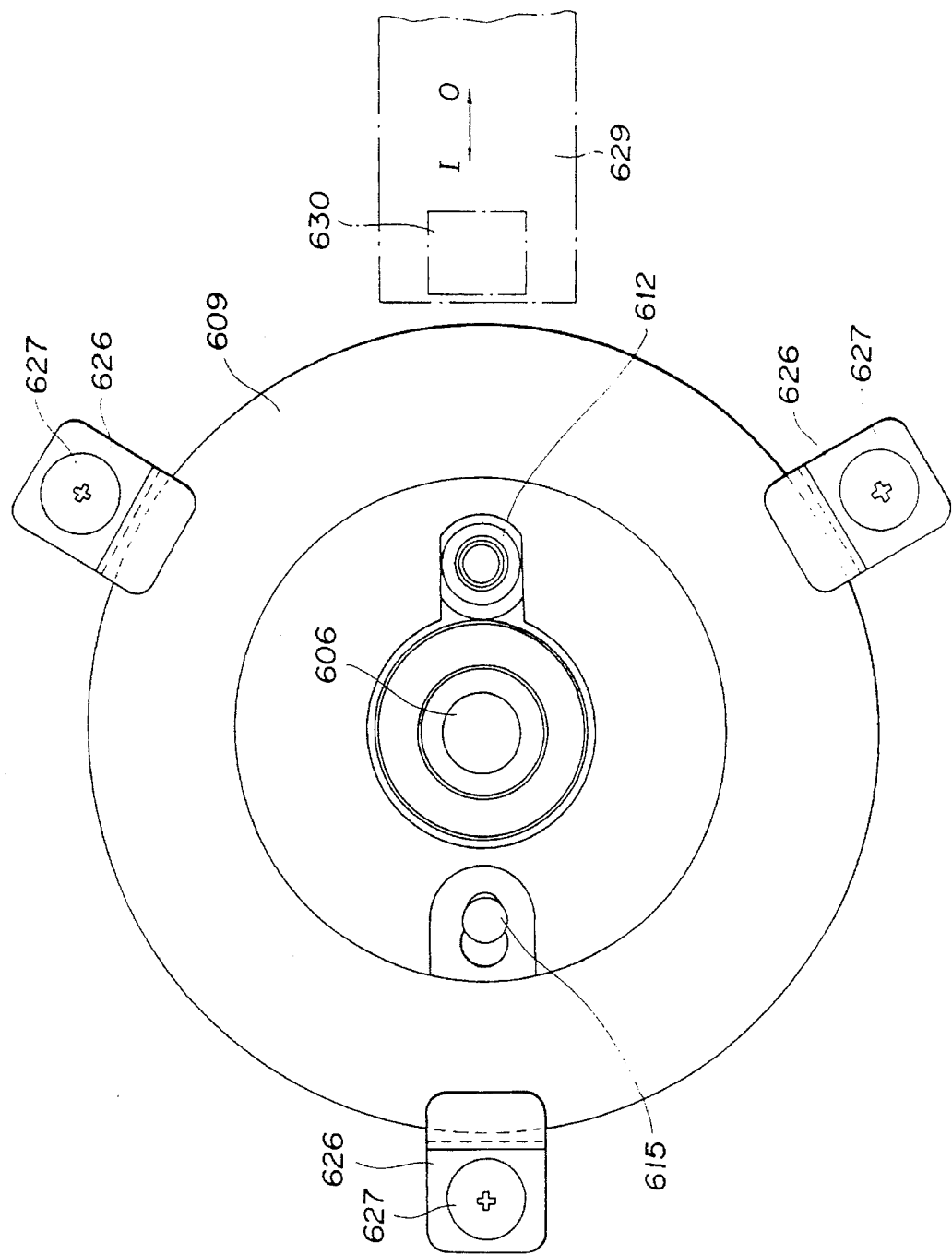
FIG. 26 is a top view showing the layout of a stopper arrangement in FIG. 25.

FIG. 25 and 26 show the structure of the rotating driving portion of the FDD in accordance with the fourth embodiment of the present invention.

This embodiment differs from the second and the third embodiments as follows.

In this embodiment, there are a receiving structure for receiving the thrust load imposed downwardly on the spindle 606, and a slip-out prevention structure for preventing the spindle 606 from slipping out of the slide bearing 605 in the upper direction with regard to FIG. 25.

That is, according to the present embodiment, for receiving the thrust load, a disc shaped receiving member 625 having a hole or concave portion 625a is fitted into the chassis 601 by press fitting or the like, as shown in FIG. 25. The concave portion formed in the receiving member 625 may be provided by a hole in the chassis 601 instead. The slip bearing 605 is engaged with the concave portion 625a of the receiving member 625, and is fixed by press fitting or the like. A disc shaped thrust washer 624 is made of fluorocarbon resin or the like and has a small coefficient of friction. The thrust washer 624 is provided at the central portion of the bottom surface of the receiving member 625. Further, a substantially cone shaped concave portion 606a is formed at the lower end of the spindle 606.

A ball 623 is engaged in the concave portion 606a and contacts the thrust washer 624 to allow the receiving member 625 to receive the downward thrust load imposed on the spindle 606 through the thrust washer 624.

The thrust washer 611 provided between the slide bearing 605 and the bushing 608 in the first and second embodiments is not employed in this embodiment, and the slide bearing 605 is spaced apart from the bushing 608 by an air gap AG.

Further, for preventing the spindle 606 from shipping out, slip-out stoppers denoted by reference numeral 626 are provided. Slip-out stoppers are bent in the form of a crank. Each slip-out stopper 626 is fixed by a screw 627 on the chassis 601 and overlaps the upper surface of the rotor yoke 609 with a slight gap there between.

The slip-out stoppers 626 may be disposed, for example, as shown in FIG. 26, in which these stoppers 626 are disposed at three positions which substantially equally divide the circumference of the rotor yoke 609 and which avoid interfering with the movement of a carriage 629 for transferring a magnetic head 630 in the directions "1" and "0". These positions of course, are not limited to the three positions mentioned above.

Even if the spindle 606 is displaced to the upper side by a shock or the like, then the rotor yoke 609 comes in contact with the top end portions of the slip-out stoppers 626 to prevent the spindle 606 from slipping out. Namely, upward movement of the spindle 606 is restricted by the slip-out stoppers 626 within a predetermined range so that stabilized rotation may be obtained. Slipping out can be restricted by disposing the slip-out stoppers as shown in FIG. 26.

According to the structure of the present embodiment, since the thrust washer 624 has a receiving face which is allowed to receive a thrust load imposed downwardly on the spindle 606 through single-point contact, the rotation load on the DD motor due to the thrust load can be significantly reduced as compared with the second and third embodiments, in which a thrust load is received through surface contact. Therefore, the disc 619 can be rotated smoothly and also electric power consumption of the DD motor may be reduced.

Figure 27:
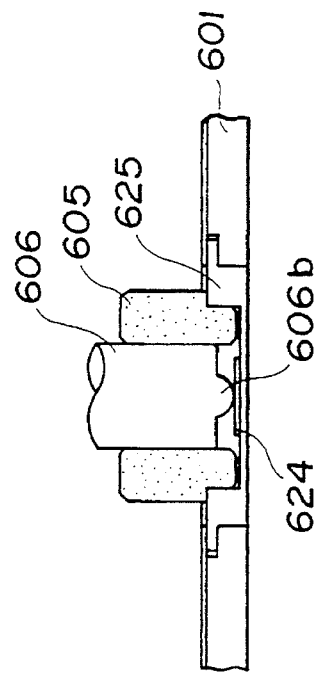
FIG. 27 is a longitudinal cross sectional view of the lower portion of a spindle, and shows other thrust receiving structure.

Further, the spindle 606 can receive the thrust load through single-point contact as shown in FIG. 27. In FIG. 27, a hemisphere-shaped convex portion 606b is formed on the lower end of the spindle 606 and rests in pointed contact with the thrust washer 624 to receive the thrust load. The same effect as in case of FIG. 25 can be obtained with this structure.

Figure 28:
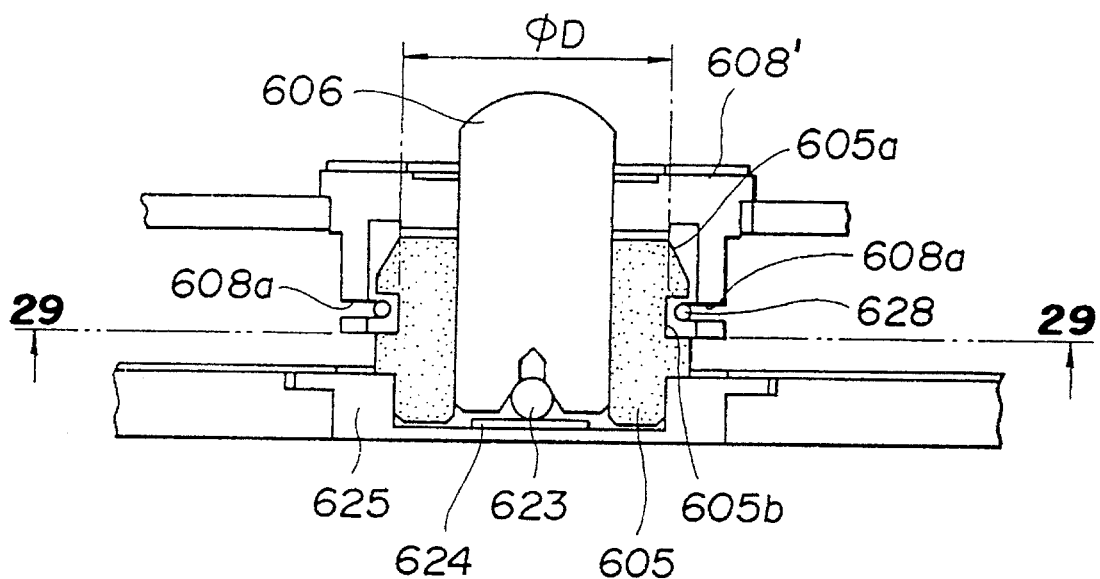
FIG. 28 is a longitudinal cross sectional view of the periphery of the spindle, and shows another stopper arrangement.
Figures 29, 30:
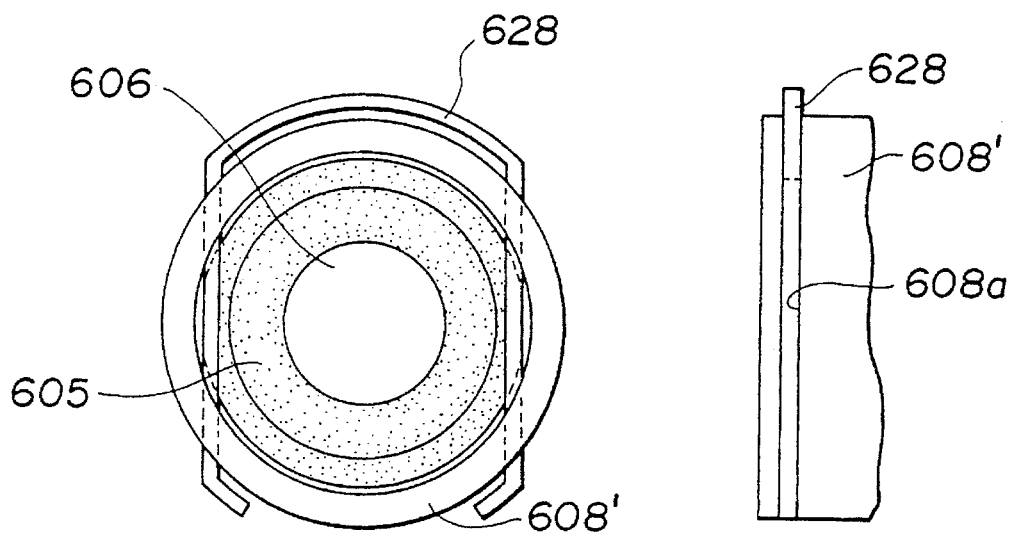
FIG. 29 is a cross sectional view taken on line of A—A in FIG. 28.
FIG. 30 is a side view showing a bushing and a wire spring.

Further, to prevent slip out of the spindle 606, the structures shown in FIGS. 28 through 30 may be used as well as the structures as shown in FIGS. 25 and 26.

In FIGS. 28 through 30, a wire spring 628 which is bent in a substantially U-shaped configuration is used for slip-out stopping. To this end, a bushing 608' secured to the spindle 606 has a cylindrical shape and covers the upper portion of the slide bearing 605. Rectilinear grooves 608a and 608a are formed on the external circumference of the lower portion of bushing 608'. The wire spring 628 is fitted into these grooves 608a and 608a.

Further, the external circumference of the upper end of the slide bearing 605 is provided with an inclined taper portion 605a, and a groove 605b is formed at a portion opposite to the groove 608a of the bushing 608 on the external circumference of the slide bearing 605. Since the wire spring 628 rotates with the bushing 608', the groove 605b is formed on the whole external circumference of the slide bearing 605. The width of the groove 605b is larger than the width of grooves 608a for the wire spring 628.

In accordance with such structure, the spindle 606 is engaged with the slide bearing 605 and the wire spring 628 is engaged with the grooves 608a of the bushing 608'. Subsequently, the bushing 608' is inserted downwardly onto the slide bearing 605 and the wire spring 628 is expanded as it goes down by the taper portion 605a of the slide bearing 605. When the bushing 608' is fitted into the groove 605b, the wire spring 628 is restored to its original shape. Namely, as shown in FIG. 28, the wire spring 628 is engaged with the groove 605b with a clearance space in the vertical and inner directions. Further, the distance between opposite sides of the wire spring 628 is restricted by the grooves 608a of the bushing 608, and the diameter D of the groove 605b of the slide bearing 605 is set smaller than the above distance.

When the spindle 606 is displaced upwardly, the wire spring 628 also is displaced upwardly following such action and contacts the upper surface of the groove 605. This prevents further upward displacement of the spindle 606.

As described above, the second through fourth embodiments comprise the drive motor for driving the recording medium or disc to rotate, and the chucking mechanism for holding the medium and for transmitting the rotational driving force of the drive motor to the medium. Since the chucking mechanism is mounted on the rotor yoke of the drive motor, the chucking mechanism is provided integrally with the drive motor, so that the height of the whole rotating driving portion including the drive motor and the chucking mechanism can be significantly reduced compared with the conventional one. Therefore, a thinner disc unit can be provided by combining this with the effect of the first embodiment. Furthermore, cost reduction is allowed by decreasing the number of constituent members.

The Fifth Embodiment

The first through fourth embodiments as described above are such that a DD motor is provided as the main component of the rotating driving portion of the disc. More specifically, in the second through fourth embodiments, the chucking mechanism is mounted on the rotor yoke of the DD motor in the rotating driving portion of the FDD to make the unit thinner. A belt driving system may be employed as the rotating driving portion of a disc unit instead of a direct driving system using a DD motor. The present embodiment is provided to make the rotating driving portion miniature and thinner by using such belt driving system.

Figure 31:
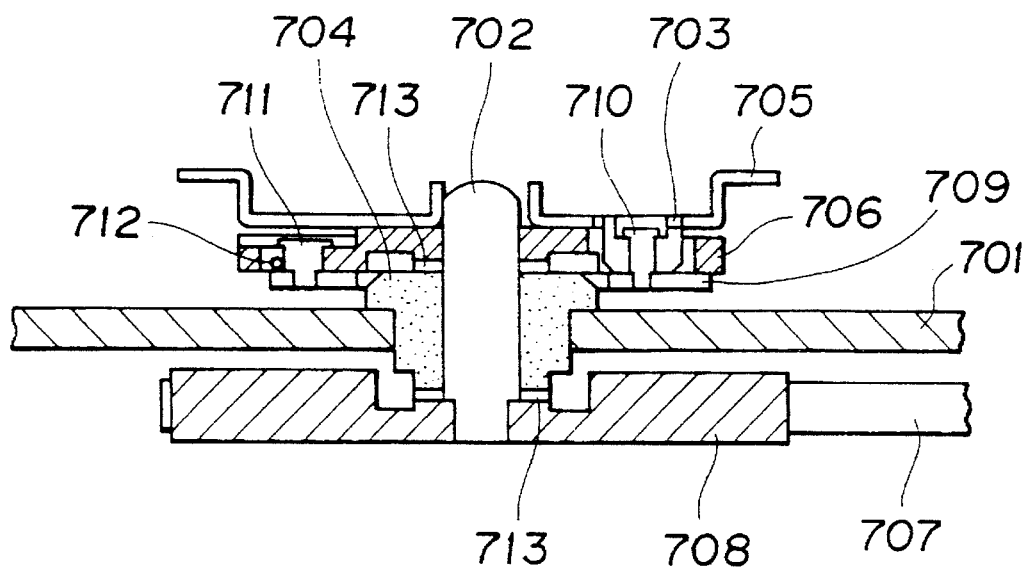
FIG. 31 is a cross sectional view showing the conventional rotating driving portion for rotating the disc, in which a belt driving system is used.

A conventional rotating driving portion using a belt drive system is shown in FIG. 31.

In FIG. 31, reference numeral 701 denotes a chassis for the magnetic disc unit; 702 denotes a center shaft; 703 denotes a driving pin; 704 denotes a bearing for supporting the center shaft 702; 705 denotes the hub of the magnetic disc, 706 denotes a flange for positioning the hub 705 of the magnetic disc at a predetermined height; 707 denotes a belt for transmitting the rotation of a spindle motor (not shown); 708 denotes a spindle pulley which for winding the belt 707; 709 denotes a driving pin base plate; 710 denotes a shaft for supporting the driving pin 703; 711 denotes a guide shaft for holding the driving pin base plate 709 to the flange 706; and 712 denotes a wire spring for urging the driving pin 703 in an outer peripheral direction.

In the structure as described above, the bearing 704 is secured to the chassis 701 by means of chalking or the like. The flange 706 is a constituent member of a chucking system and is fixed to shaft 702 by means of press fitting or insert molding or the like. The guide shaft 711 and the shaft 710 are secured to the driving pin base plate 709 by chalking. Further, the driving pin 703 is supported by the shaft 710. The driving pin base plate 709 is mounted on the flange 706 from the reverse side (the lower side in the figure) thereof in the state described above. The flange 706 is made of a magnetic plastic and the reverse side thereof is magnetized. Since the driving pin base plate 709 is made of an iron plate, it is attracted by and held horizontally to the flange 706 in an attracted state. On the outer side of the guide shaft 711, the wire spring 712 continuously urges the driving pin 703 in the outer peripheral direction.

The center shaft 702 is inserted from the upper side in the figure into the bearing 704. The spindle pulley 708 is secured by pressingly fitting, adhesion or the like. In such a state, the center shaft 702, the flange 706 and the spindle pulley 708 are integral with the interposed bearing 704. They are rotatably supported by the bearing 704. Further, thrust washers 713 are provided at the top and a bottom of the bearing 704 to smooth the rotation. The spindle pulley 708 is wound with the belt 707, and the driving force is transmitted to the driving pin 703 by a spindle motor (not shown).

Figure 32:
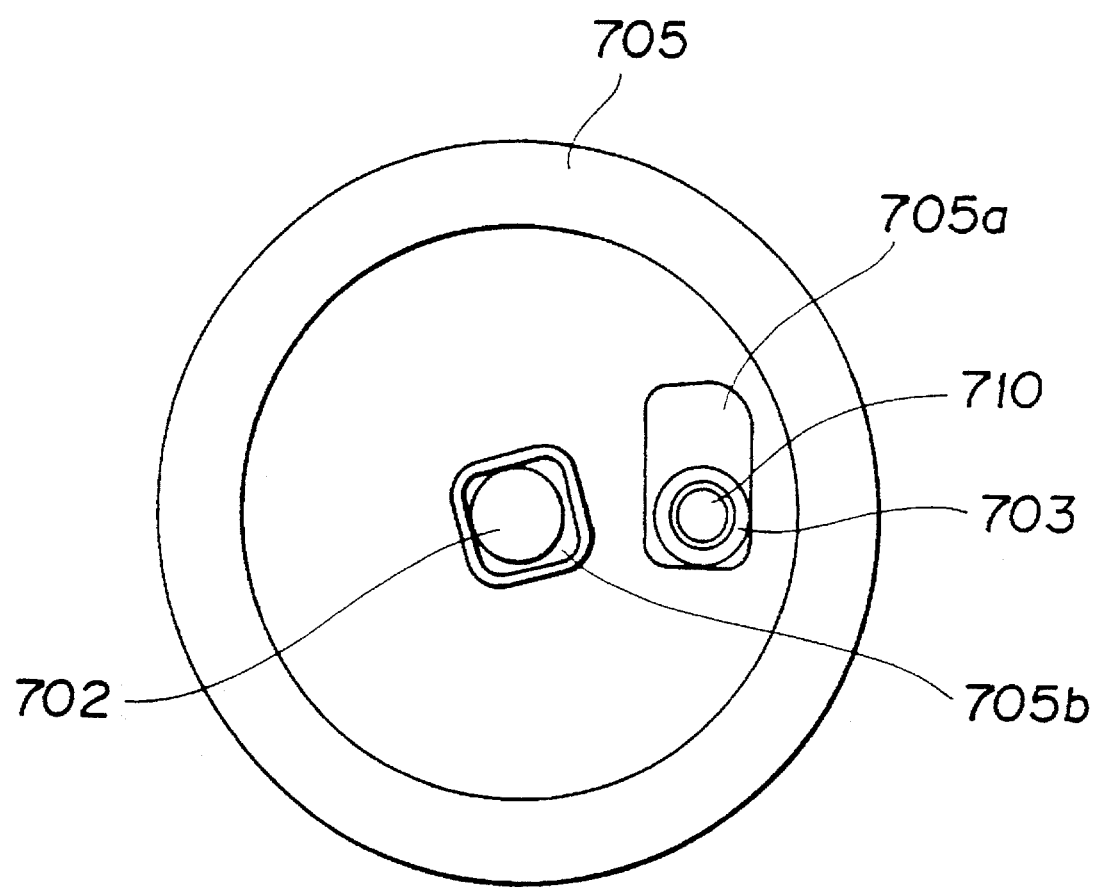
FIG. 32 is an explanatory view showing the aligning of the hub of the magnetic disc.

Now, a centering system for the hub 705 of the magnetic disc will be explained briefly. FIG. 32 is an explanatory view. A rectangular center hole 705b is provided at the central portion of the hub 705, with which the center shaft 702 is engaged. A rectangular drive hole 705a is provided at a position which is spaced at a predetermined distance apart from the center of the hub 705. The drive hole 705a is engaged with the driving pin 703 for supplying rotation force to the hub 705. Since the driving pin 703 is urged in an outer peripheral direction by the wire spring 712 as described above, the center hole 705b of the hub 705 contacts the center shaft 702 so as to perform centering.

As described above, in the conventional magnetic disc unit, a flange and a spindle pulley are structured of different members. Additionally, they are arranged at opposite positions with a chassis therebetween. Therefore, the conventional disc unit has the defect that the whole unit becomes thick.

Accordingly, in accordance with the present embodiment, a thinned magnetic disc unit is provided in which the flange and the pulley are provided by the same component.

The present embodiment provides a chucking system in which both a flange a pulley portion and corresponding to a spindle pulley are formed integrally as a single component.

According to the present embodiment, a pulley portion corresponding to a spindle pulley and a flange are integrally structure of the same material and serve as a part of a chucking system disposed adjacent the disc, so that the disc unit can be made thin.

Figure 33:
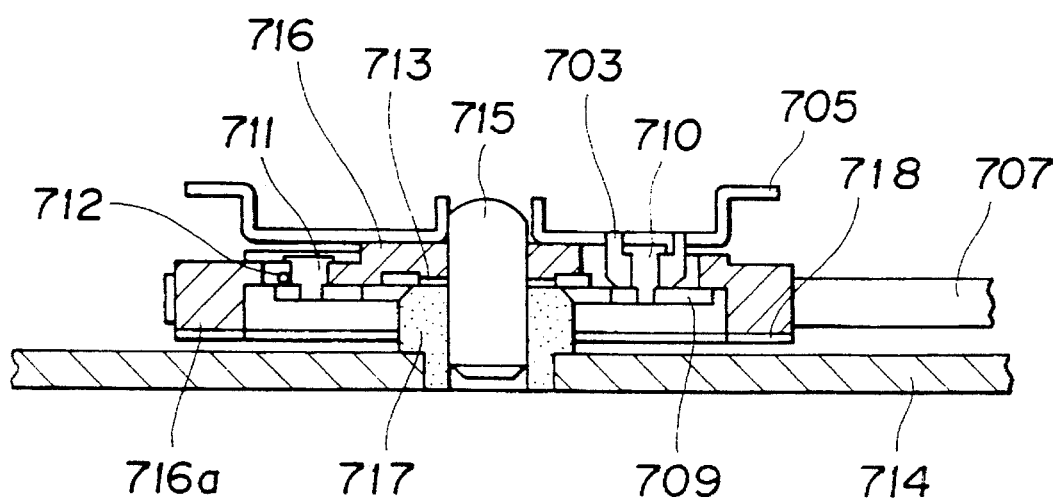
FIG. 33 is a cross sectional view showing the rotating driving portion for rotating the disc using a belt driving system in the disc unit in accordance with the fifth embodiment of the present invention.

FIG. 33 is a cross sectional view showing the main portions of the present embodiment. In FIG. 33, the same constituent members as those of the conventional unit are denoted by the same referent numerals. Therefore, no reference to such members is made.

Reference numeral 714 denotes a chassis for the magnetic disc unit; 715 denotes a center shaft or spindle; 716 denotes a flange and 716a denotes a pulley portion serving as a spindle pulley; 717 denotes a bearing; and 718 denotes a magnet.

In the structure as described above, the pulley portion 716a serves as the spindle pulley and is structured integrally with the flange 716, to serve as the chucking member of the magnetic disc as well. The center shaft 715 is fitted into the center of the flange 716 by press fitting or insert molding or the like. A driving pin base plate 709 is mounted on the reverse side (the lower side in the figure) of the flange 716, like the conventional example as shown in FIG. 31.

The bearing 717 is fixed to the chassis 714 by means of press fitting or adhesive or the like. The center shaft 715 is inserted and rotatably supported by the bearing 717. A thrust washer 713 is interposed between the bearing 717 and the flange 716 to make the rotation smooth.

The magnet 718 is mounted on the chassis side of the pulley portion 716a and is spaced apart from the chassis 714 with a certain fixed gap therebetween. The chassis 714 is made of iron. The absorption force of the magnet 718 always maintains the flange 716 at a position in a manner to keep the above gap on the side of the chassis 714. The belt 707 is wound around the pulley portion 716a.

According to the structure as described above, the rotation of a spindle motor (not shown) is transmitted to the flange 716 through the pulley portion 716a by means of the belt 707 so that a driving force may be supplied to the driving pin 703.

Thus, in accordance with the above structure of the embodiment, the same effect as in the conventional example shown in FIG. 31 can be produced. Further, this permits the whole unit to be thin.

Namely, the magnetic disc unit of the present embodiment is such that the flange and the spindle pulley are formed of the same component. Further, the spindle pulley portion is arranged on the magnetic disc side with respect to the chassis to form part of the chucking system for the magnetic disc. The belt is directly wound around this spindle pulley portion of the flange so that the thickness of the overall disc unit can be reduced.

The Sixth Embodiment

According to the first through the fourth embodiments as described above, the disc unit uses a single rotor for the DD motor of the rotating driving portion. Using a double rotor would increase the thickness of the rotating driving portion and even if the structures of the first to fourth embodiments were applied, the advantages thereof would be lessened. The following is an embodiment wherein the increase in thickness of the rotating driving portion is moderate even though a double rotor is used.

In the first through fifth embodiments, the disc units used 3.5 inch micro floppy discs. However, the present invention is also applicable to other kinds of disc units, for example, to magneto-optical disc units. In each of the following embodiments, a magneto-optical disc unit is illustrated.

Figure 34:
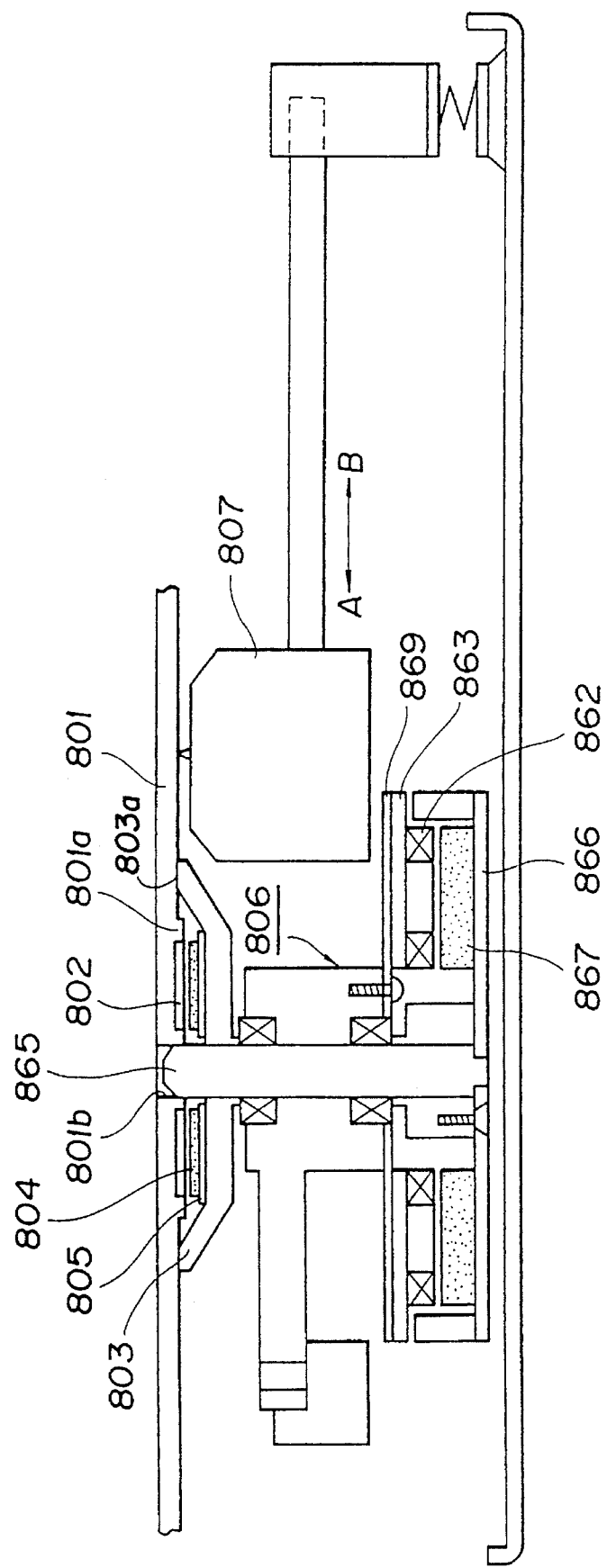
FIG. 34 is a cross sectional side view showing a conventional disc unit having a double rotor type motor.

A conventional magneto-optical disc unit is shown in FIG. 34.

In FIG. 34, reference numeral 801 denotes an optical disc serving as a recording medium. Optical disc 801 has a central portion formed thickly to provide a hub 801a, and a hole 801b (see FIG. 36) is located in the center thereof. A magnetic plate 802 made of an iron plate or the like is fixed to the lower side of hub 801a.

The optical disc 801 is driven to rotate by a motor 806. A turn table 803 for holding the optical disc 801 is fixed on the upper end of a spindle 865 of the motor 806. The turn table 803 is shaped as a disc having a concave upper surface. A plate-shaped magnet 804 is fixed to the concave upper surface through a yoke 805.

The optical disc 801 is loaded on the turn table 803 by means of a loading mechanism (not shown). The spindle 865 engages the center hole 801b. Subsequently, the optical disc is put on a flange portion 803a at the upper portion of the periphery of the turning table 803. The magnetic plate 802 is attracted by the magnetic force of the magnetic 804, so that optical disc 801 is held on the turn table 803, i.e. chucked.

Then, the optical disc 801 is rotated by the motor 806, and an optical head 807 moves the radial direction of the optical disc 801 to carry out recording on an arbitrary recording track or reading out therefrom by means of a magneto-optical recording system.

Here, the motor 806 is a single rotor type motor having a stator yoke 869 (referred to as the "stator" hereinafter) to which a coil assembly 862 is fixed via a motor PCB 863, and having a rotatable rotor yoke 866 (referred to as the "rotor" hereinafter) to which a magnet 867 is fixed. When an electrical current flows through coil assembly 862, the rotor 866 is rotated by the magnetic force acting between the coil assembly 862 and the magnet 867. Then, the spindle 865 fixed to the rotor 866 is rotated and the turn table 803 is driven to rotate.

Figure 35:
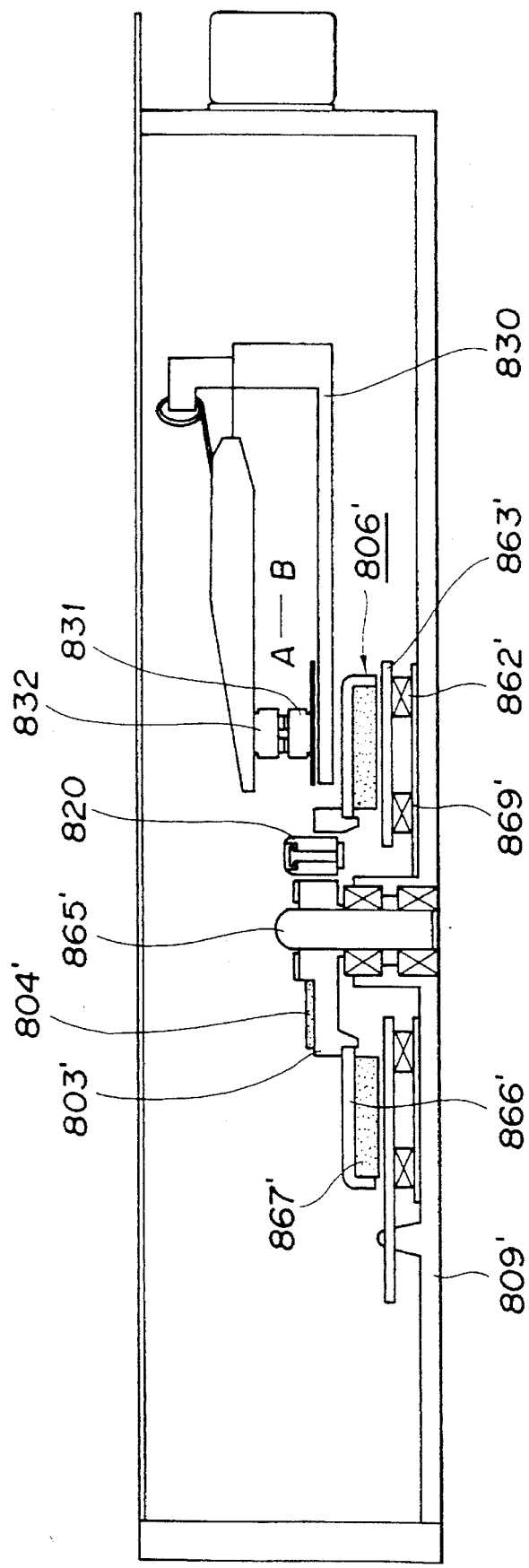
FIG. 35 is a cross sectional side view showing a conventional disc unit having a single rotor type motor.

Further, a conventional 3.5 inch floppy disc unit is shown in FIG. 35 as another example of a disc drive unit of the same kind. A single rotor type motor is used, as in the case of the example shown in FIG. 34. In FIG. 35 a motor 806' for driving a floppy disc (not shown) to rotate comprises a stator 869' fixed to a coil assembly 862' and a rotatable rotor 866' fixed to a magnet 867'.

However, in contrast to the unit shown in FIG. 34, in FIG. 35 the turn table 803' for holding the floppy disc (not shown) is mounted integrally with the rotor 866' and is engaged with the central portion thereof. The turn table 803' is fixed to a spindle 865' and the floppy disc (not shown) is held on the turn table 803' due to the attraction of a magnet 804' provided on the turn table 803' and due to an engagement pin 820. When electrical current flows through the coil 862', the rotor 866' and the turn table 803' are rotated, and thus, the disc is driven to rotate.

Magnetic heads 831 and 832 are mounted on a head carriage 830 and are moved in the A-B direction as shown in FIG. 35 along the radius of the disc in accordance with the movement of the head carriage 830. The heads 831 and 832 slidably contact an arbitrary track of the rotating disc to record data on it, or read recorded data therefrom.

There are strong demands for making both the magneto-optical disc units and the floppy disc units as described above thinner and miniaturized, in line with the trend to make information processing units which incorporate them portable. However, a problem associated with the structures described above is as follows.

That is a position which is a transfer limit in the A direction of the carriage of the optical head 807 or the magnetic heads 831 and 832. This transfer limit is predetermined according to the position of the innermost track of the optical disc 801 or the floppy disc. However, the outer periphery of the motor 806 or 806' protrudes in the B direction further than the transfer limit in the A direction of the carriage of the optical head 807 or the magnetic heads 831 and 832, because the motor 806 or 806' as a whole has a larger outer diameter.

Therefore, in order to prevent the carriage of the optical head 807 or the magnetic heads 831 and 832 from contacting the main body of the motor 806 or 806', the optical head 807 or the magnetic heads 831 and 832 must be disposed higher than the main body of the motor 806 or 806' so that a transfer area of the carriage of the optical head 807 or the magnetic heads 831 and 832 overlooks the main body of the motor 806 or 806'. However, this means that further is necessary. Thus, it is difficult to make the unit thin.

To solve the above problem, one might consider making the outer diameter of the motor sufficiently smaller than the diameter of the innermost track so that the head and the motor can be disposed at a substantially equal level to prevent the head or the carriage from contacting the outer periphery of the motor.

However, when the diameter of the motor is made smaller, the magnet is also made smaller. Thus, the output of the motor is reduced. In order to make up for the output reduction, a strong magnet needs to be used. However, when the strong magnet is used, the load imposed on the bearing of the motor becomes larger. This causes an increase in the rotational load of the motor. In order to obtain a sufficient output by overcoming a large rotational load, the electric current needs to be large. In view of the above, utilizing a single rotor type motor with a reduced outer diameter is possible but this would cause a significant increase in the electric power consumption for the unit.

Each of the following embodiments are directed to solving the above problems associated with a disc drive unit of this kind. The following embodiments permit thin units as well as a large reduction in the electric power consumption.

According to these embodiments of a disc drive unit, a disc which serves as a recording medium is driven to rotate by means of a motor to record information or read recorded information. A double rotor type motor is used as the disc drive motor, the double rotor type motor having a coil assembly fixed to an coil holding member between two rotors disposed opposite to each other. The coil assembly of the motor is embedded in the coil holding member.

Since a double rotor type motor can reduce the eddy current core loss and provide a higher output than a single rotor type even though electric power consumption is low, the diameter thereof may be reduced to the extent that the head and the motor are of the same height substantially. This enables one to make the unit thin. Further, by embedding the coil assembly in the coil holding member, the height or size of both of them can be reduced, the whole height of the motor can be lowered, and thus the unit can be made thin.

Figure 36:
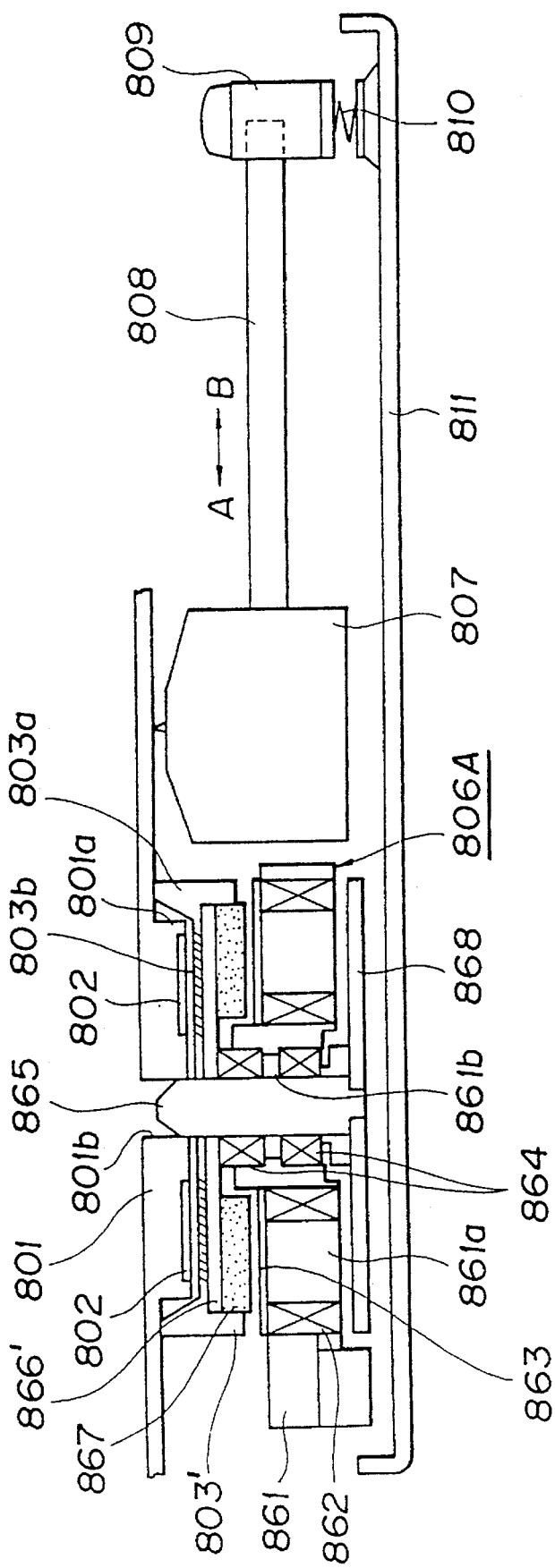
FIGS. 36 and 37 are a cross sectional side view and a plan view, respectively, showing the main portion of the disc unit having a double rotor type motor in accordance with the sixth embodiment of the present invention.
Figure 37:
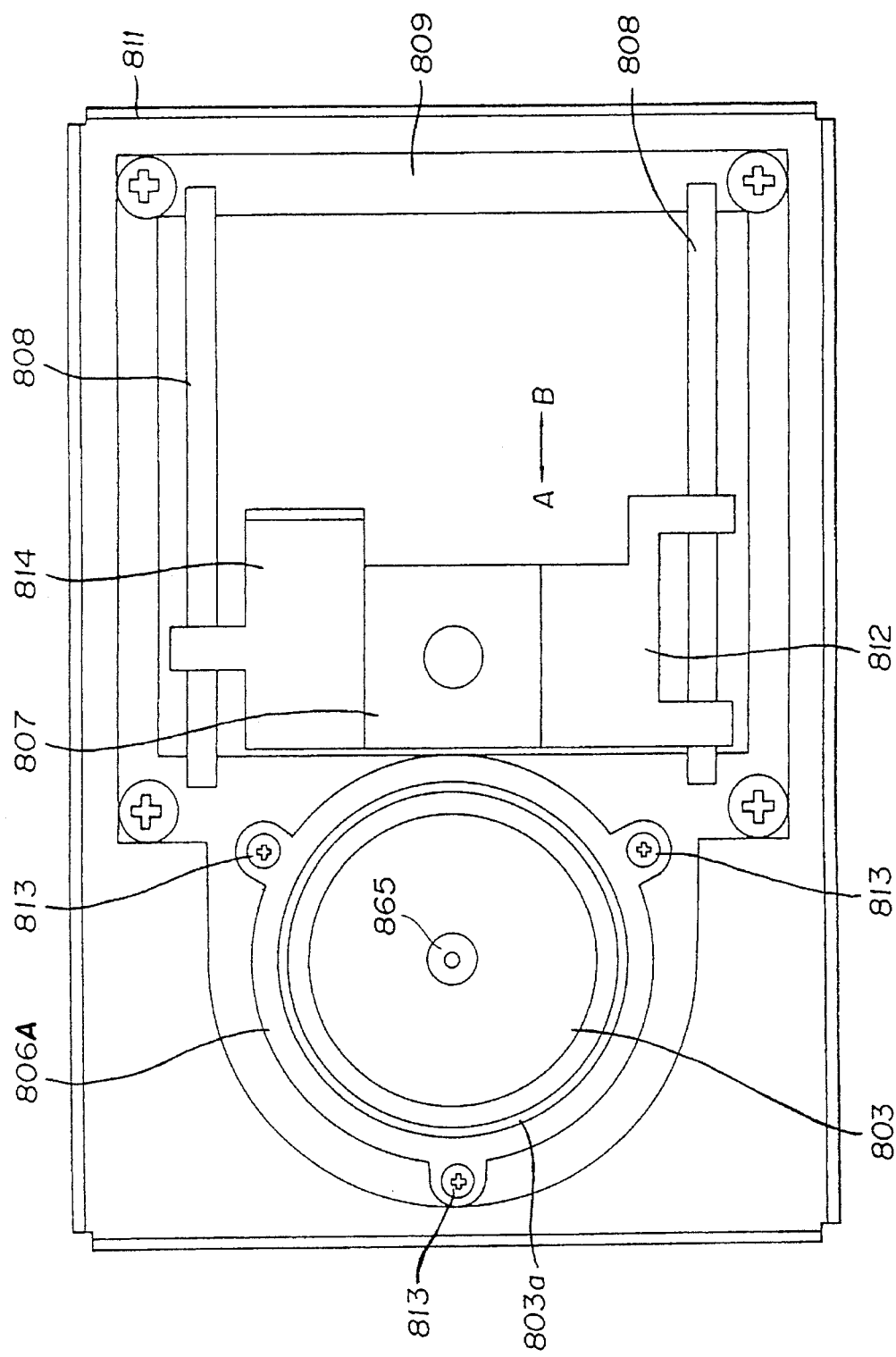

FIGS. 36 and 37 are views showing the main portions of a magneto-optical disc unit according to the sixth embodiment of the present invention.

In the structure as shown in both of the figures, reference numeral 811 denotes a bottom plate of a housing, which is the same as the base of the first embodiment, on which constituent members of the unit are accommodated and supported. On the bottom plate 811, a frame type second base 809 is floatably supported via a damper spring 810.

Further, a pair of guide bars 808 and 808 are disposed in parallel on the second base body 809, and a head carriage 812 is slidably disposed on the guide bars 808 and 808 for movement in the directions A and B in the axial direction of the guide bars 808. An optical head 807, which is a transducer for recording and reading out information on an optical disc 801 by means of the magneto-optical recording system, is mounted on a head carriage 812. Here, the optical disc 801 is the same as that used in the above embodiments. Reference to the structure thereof is omitted.

A linear motor 814 for driving the head carriage 812 is provided on the head carriage 812.

A motor 806A for rotating the optical disc 801 is provided on the second base 809 at a portion leftward from the middle in FIG. 37. This motor 806A is structured as a double rotor type motor in which a coil assembly is fixedly held and comprises the following members represented by reference numerals 861 through 868.

Reference numeral 861 denotes a housing for fixedly holding the coil assembly, and is fixed on the second base 809 by screws 813. This housing 861 is provided in the form of a circle when seen from its top. A predetermined number of holes 861a are formed in housing 861 at a predetermined distance apart from one another in the direction of its periphery and an exciting coils 862 are embedded in the holes 861a. The housing 861 has a thickness equivalent to the height of the coil assembly 862 so that the coil assembly 862 is embedded in the housing 861 without any difference in level. Provided on the coil assembly 862 is a PCB (Printed Circuit Board) 863 on which connection wiring for the terminals of the coil assembly 862 and a pattern or the like for a frequency generator for detecting the number of revolutions are formed.

In the center of the housing 861, a hole 861b penetrates through it vertically. A spindle 865 serving as the output rotation shaft of the motor is rotatably supported in the hole 861b via bearings 864. The upper and lower ends of spindle 865 respectively project from the housing 861 upwardly and downwardly. A turn table 803' is fixed to the top end of spindle 865. A rotor yoke (referred to as the "rotor" hereinafter) 866' is fixed to the lower side of the turn table 803' by means of insert molding or the like. Further, a magnet 867 is fixed to the lower side of the rotor 866', and is disposed opposite to the coil assembly 862 through a slightest air gap and the motor PCB 863.

An auxiliary rotor yoke (referred to as the auxiliary "rotor" hereinafter) 868 is fixed to the lower end of the spindle 865 and is disposed opposite to the coil assembly 862 through an air gap.

An electric current is provided to the coil assembly 862 of the motor 806A for exciting it by a predetermined exciting method, so that the magnet 867 is rotated by attractive force or repulsive force caused by the magnetism acting between the coil assembly 862 and the magnet 867, and thus, the rotors 866' and 868 as well as the spindle 865 fixed to the rotors 866' and 868 are rotated.

The disc shaped turn table 803', which holds the disc 801 thereon, is fixed on the upper end portion of the spindle 865. The turn table 803' is in the form of a disc having a diameter larger than that of the hub 801a of the optical disc 801. A ring shaped projection 803a corresponding to the conventional flange 803a as shown in FIG. 34, projects upwardly over the whole circumferential periphery portion of its upper surface. The rotor 866' fixed to the magnet 867 as described above is fixed to the lower side of the turn table 803'.

Now, the turn table 803' is integrally formed of a plastic magnet, as it is called, which is magnetized by mixing resin with magnetic powder. The magnetized portion, which should be magnetized by mixing the magnetic powder in the turn table 803', is denoted by reference numeral 803b and hatched with oblique lines in FIG. 36. That is, magnetized portion 803b is confined only to the portion substantially opposite the magnetic plate 802 of the optical disc 801 held on the turn table 803'. The peripheral portion, including the ring shaped projection 803a of the turn table 803', is not magnetized.

Now, a disc loading operation, and a recording and reading out operation of the unit according to the present embodiment, will be explained.

In a preliminary operation, the optical disc 801 is loaded on the turn table 803' by means of a disc loading mechanism (not shown), which may be substantially the same as the loading mechanism according to the first embodiment, for example. Then, the spindle 865 is engaged with the center hole 801b, and the disc is mounted on the projection 803a of the turn table 803'. Then, the optical disc 801 is held on the ring shaped projection 803a of the turn table 803' since the magnetic plate 802 is attracted by the magnetic force of a magnetized portion 803b of the turn table 803'. Then, the turn table 803' is rotated by the motor 806A and the optical disc 801 is rotated.

The head carriage 812 is moved in the A and B direction by the linear motor 814. The optical head 807 is moved in the A and B direction along the radius of the optical disc 801, and then, recording or reading out of data is performed on an arbitrary track by the drive of the optical head 807 through a magneto-optical recording and reading out system.

According to the present embodiment as described above, the turn table 803' is structured of a plastic magnet so that the magnetic plate 802 is attracted to hold the optical disc 801. Thus, the thickness of the turn table 803' can be made thinner than that of the conventional turn table on which a magnet for attracting and the yoke are provided. The thickness of the unit may be made thinner than that of the conventional unit. Further, constituent members corresponding to an attracting magnet and a yoke in the conventional unit can be eliminated, thereby permitting cost reduction.

Since the ring shaped projection 803a is not magnetized in the present embodiment, magnetic powder or the like which falls off from the optical disc 801 does not stick to the ring shaped projection 803a due to magnetic force, and surface deflection of the optical disc 801 caused by such sticking can be prevented.

Further, the present embodiment, uses a double rotor type motor in which a coil assembly is fixedly held, as in the motor 806A. Since the double rotor type motor can reduce the eddy current core loss, a high output is obtained while the diameter thereof is smaller than that of a single rotor type motor. In the present embodiment, the diameter of the motor may be made sufficiently smaller than that of the innermost track of the disc. This prevents the optical head of the carriage from contacting the motor even when the motor extends to the position of the transfer limit corresponding to the innermost track position and the height of the motor is substantially equal to that of the optical head. In this manner, as shown in FIG. 36, the motor 806A and the optical head 807 may be arranged to have an equal height. Such an arrangement is different from the conventional arrangement in which the end portion of the transfer area the optical head extends over the main body of the motor. Therefore, the whole rotating driving mechanism of the disc, including the motor 806A and the turn table 803', may be significantly lowered in height as compared with the conventional mechanism. Further, the optical head 807 may be arranged at a lower position, thereby enabling one to make the unit thin. Additionally, since the coil assembly 862 of the motor 806A is embedded in the housing 861 of the coil holding member, the height or space occupied by the coil assembly and the coil holding member can be lowered as compared with the case where the coil assembly is provided on the coil holding member. That is, the height of the whole motor may be further lowered and accordingly, thinning of the whole unit may be achieved.

Next, modifications of the disc rotating driving portion, including the turn table 803' and the motor 806A, will be described with reference to FIGS. 38 through 42. In these figures, as the same reference numbers are given to common or corresponding portions in FIGS. 36 and 37, reference thereto will not be made.

The Seventh Embodiment

Figure 38:
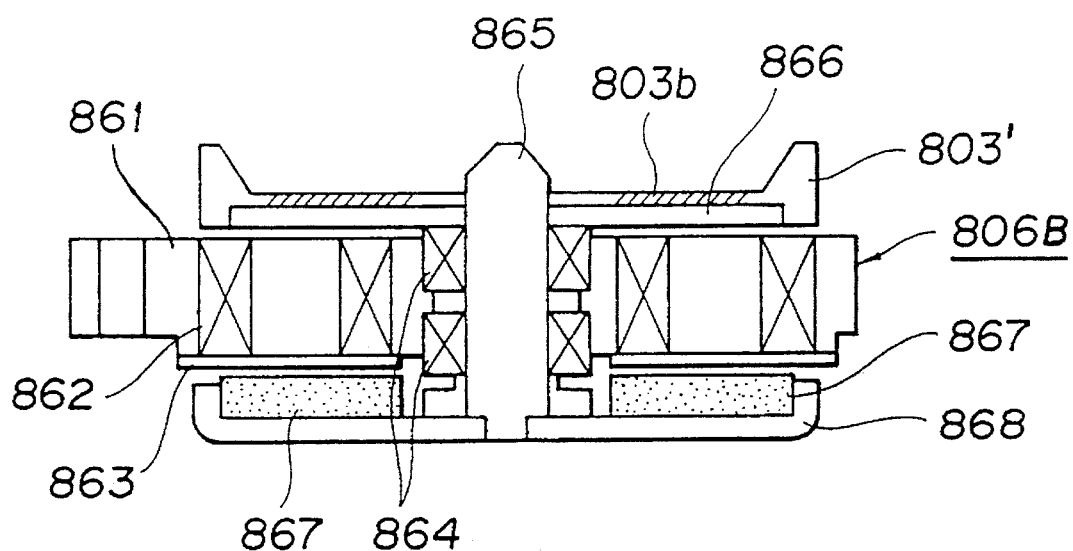
FIGS. 38, 39 and 40 are cross sectional side views showing the rotating driving portion for rotating the disc in accordance with the seventh, eighth and ninth embodiments of the present invention.

FIG. 38 is a view showing a disc rotating driving portion of a magneto-optical disc unit according to the seventh embodiment of the present invention. As shown in this figure, the magnet 867 of a motor 806B is provided on the upper surface of a lower rotor 868, not on the lower surface of an upper rotor 866'. The same effect as in the sixth embodiment as described above is obtained with such a structure.

The Eighth Embodiment

Figure 39:
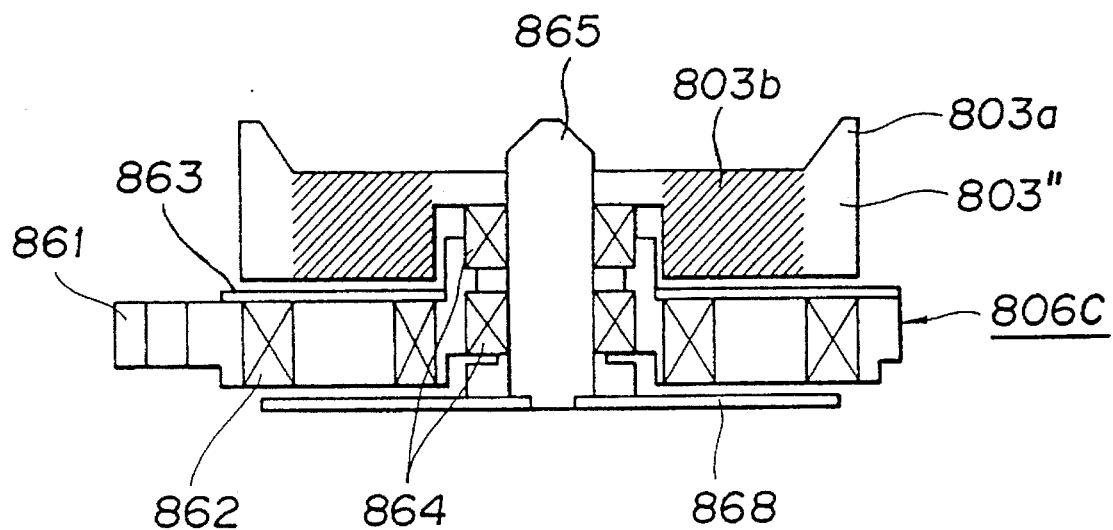

FIG. 39 is a view showing the rotating driving portion of a disc unit according to the eighth embodiment of the present invention. In this embodiment, a turn table 803" structured of a plastic magnet as described above is made significantly thicker than the turn table 803' in the sixth embodiment. The turn table 803" is rotated by motor 806c. Like the sixth embodiment, a peripheral portion of the turn table 803" has a ring shaped projection 803b which is not magnetized. A magnetized portion 803b is provided opposite to the magnetic plate 802 of the optical disc 801 and substantially opposite to a coil assembly 862 through an air gap and a motor PCB 863. Magnetized portion 803b is shown by the oblique hatching.

The magnetized portion 803b of the turn table 803" performs the same function as that of the magnet for the motor (the magnet 867 in the sixth embodiment as shown in FIG. 36). Since the magnetized portion 803b performs the same function as that of the magnet of the motor, the whole turn table 803" also performs the same function as that of the rotor of the motor 806A (the rotor 866' in the sixth embodiment as shown in FIG. 36).

That is, the turn table serves as a chucking means and is so structured to be integral with the rotor. The above structure permits the number of the constituent members to be reduced more effectively than the structures in accordance with the sixth and seventh embodiments, and thus, cost reduction is achieved.

The Ninth Embodiment

Figure 40:
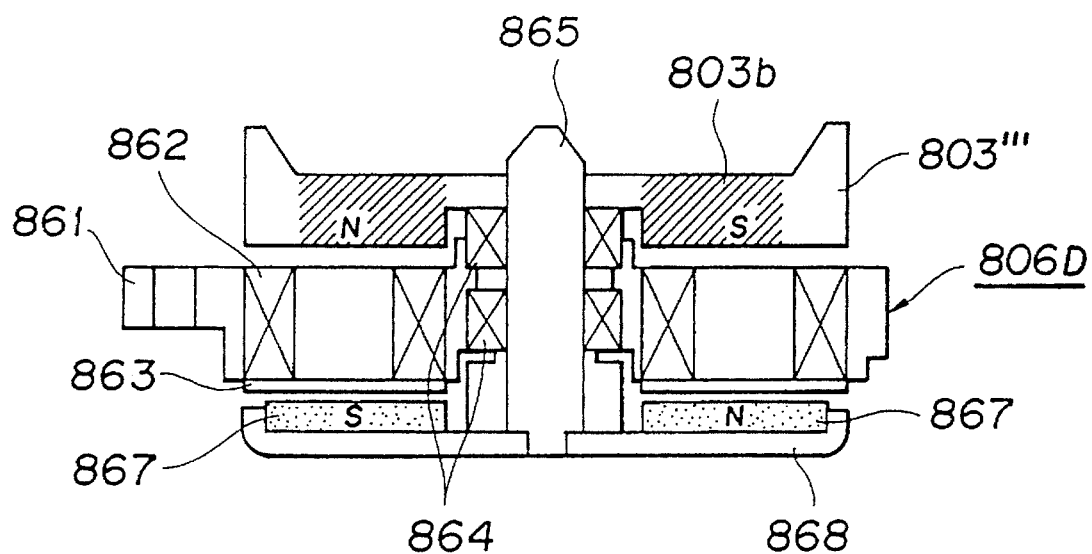

FIG. 40 is view showing the rotating driving portion according to the ninth embodiment. As shown in the figure, in this embodiment magnet 867 is provided on the upper surface of a rotor 868, which is arranged on the lower side of a motor 806D like in the seventh embodiment as shown in FIG. 38. Furthermore turn table 803'" is thick, similar to the eighth embodiment as shown in FIG. 39, so that the magnetized portion 803b of the turn table 803'" also performs the same function as that of a magnet in the motor 806A. The magnetized portion 803b is magnetized in the circumferential direction of the turn table 803'" at every predetermined angle so as to have alternately N and S poles. The magnet 867 is also magnetized in the circumferential direction as well. Further, the turn table 803'" is fixed to the spindle 865 in such a manner that the magnetized portion 803b and the magnet 867 are arranged so that their portions having mutually reverse polarities are disposed opposite to each other as shown in the figure. The magnet 867 is fixed to the rotor 868.

According to the structure as described above, the magnetic flux which flows through the coil assembly 862 by interlinkage is stronger than that of each of the embodiments described above in view of the arrangement of the magnetized portion 803b and the magnet 867, in which their portions having mutually reverse polarities are disposed opposite to each other. Therefore, the output of motor 806D can be made larger than that obtained in the embodiments described above.

The Tenth Embodiment

Figure 41:
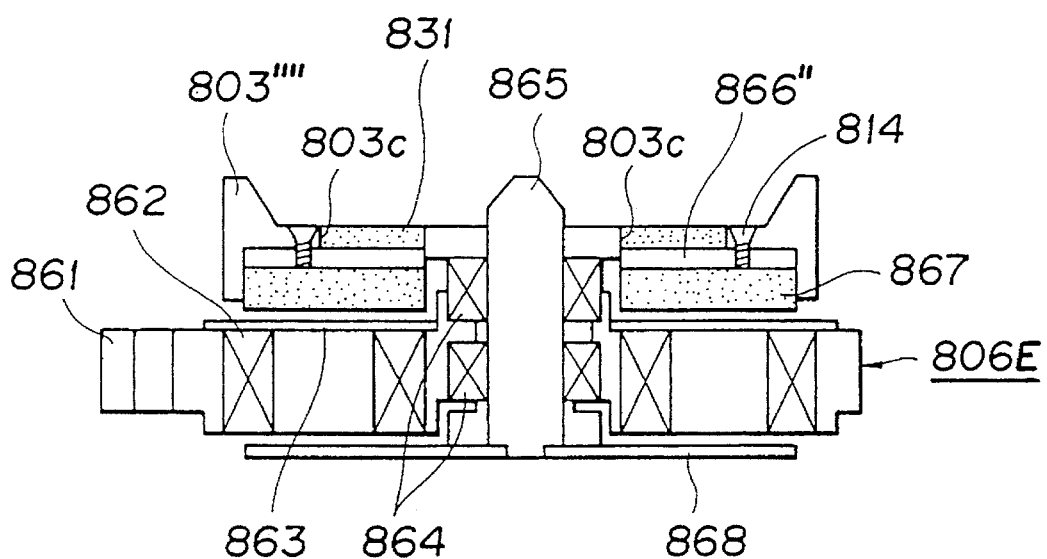
FIGS. 41 and 42 are a cross sectional side view and a plan view, respectively, showing the rotating driving portion for rotating the disc in accordance with the tenth embodiment of the present invention.
Figure 42:
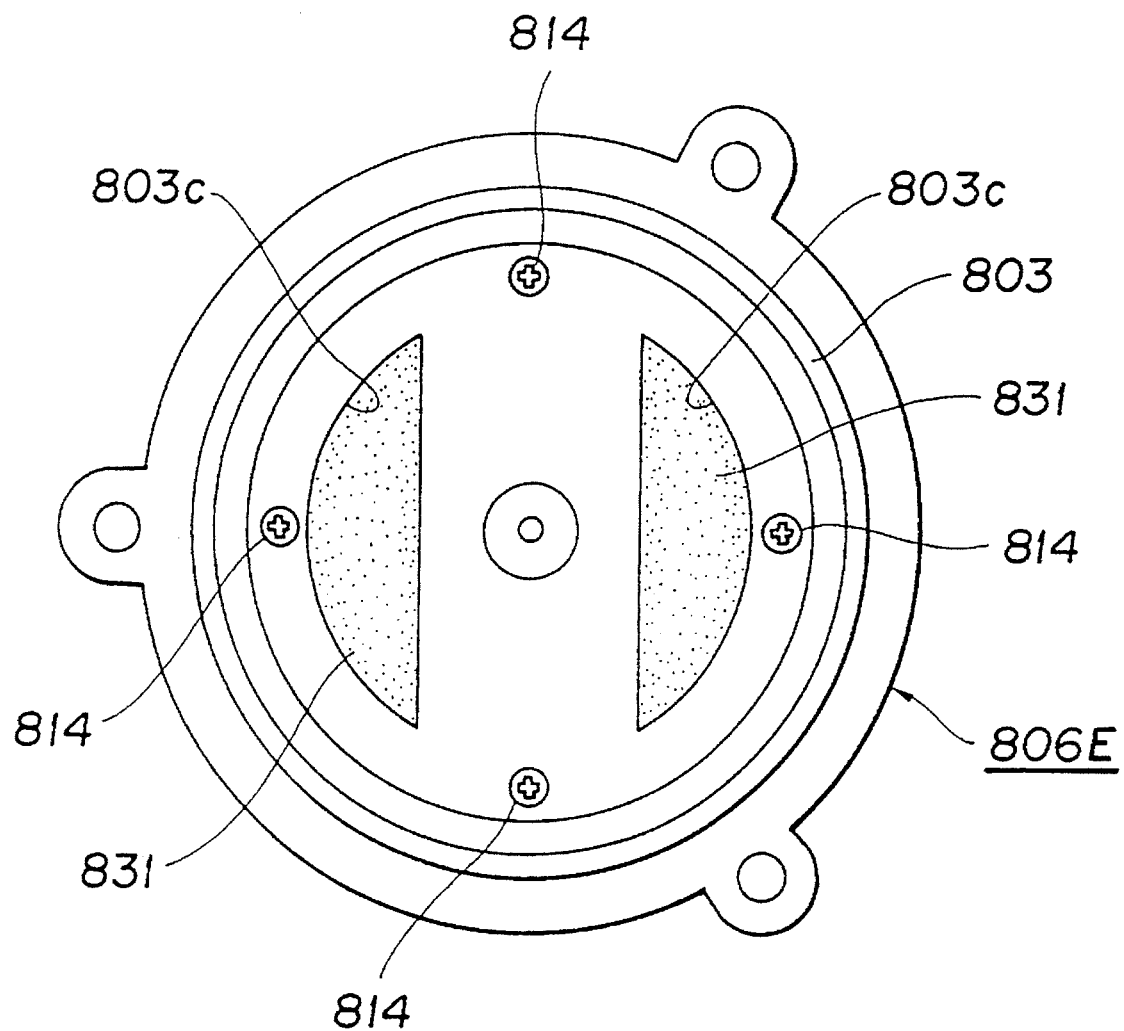

FIGS. 41 and 42 show a rotating driving portion according to the tenth embodiment of the present invention. In the present embodiment the turn table 803"" is formed of a non-magnetic body, and may be die cast from aluminum. The turn table 803"" has a pair of crescent shaped holes 803C disposed opposite to the magnetic plate 802 of an optical disc 801, and these holes 803C are disposed opposite to each other. Magnets 831 and 831 for attracting the magnetic plate 802 are embedded in the holes 831. A rotor 866" which is fixed to a magnet 867 of the motor 806C is fixed to the lower surface of the turn table 803"" with a screw 814.

The same effects as in the sixth and seventh embodiments can be obtained according to the structure as described above. Further, the die cast aluminum turn table 803"" has dimensional accuracy higher than that of a turn table formed of a plastic magnet, and is excellent in durability.

As is apparent from the above descriptions, according to the sixth through tenth embodiments, in a disc drive unit which record information or reads information using a disc serving as a recording medium that is rotated and driven by a motor, a double rotor type motor, in which a coil assembly is fixedly held by a coil holding member between two rotors disposed oppositely, is used as the disc drive motor. The coil assembly of the motor is embedded in the coil holding member and the disc drive motor is arranged to have substantially the same height as that of a head. Further, the height of the whole motor can be lowered. Thus, thinning of the unit can be achieved without cancelling the effects according to the first through forth embodiments, and electric power consumption can be reduced. The effects of the present invention are remarkable.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A disc unit for recording information on or reading information from a disc serving as a recording medium which is being rotated, comprising:

a chassis;

a drive motor having a rotor yoke which is rotatably mounted on said chassis, said rotor yoke having a bottom surface and having a top surface which receives and supports said disc, said rotor yoke additionally having a center and an opening which is offset from said center; and chucking means, provided integrally with said rotor yoke, for chucking and holding said disc supported on said top surface of said rotor yoke so as to rotate said disc along with said rotor yoke, said chucking means including a supporting member on said bottom surface of said rotor yoke and a drive pin which is movably supported by said supporting member so as to project from said top surface of said rotor yoke through said opening in said rotor yoke and to engage said disc when said disc is received on said top surface of said rotor yoke.

2. A disc unit as claimed in claim 1, further comprising at least one read/write head, and means for selectively moving said at least one read/write head to different positions on said disc.

3. A disk unit as claimed in claim 1, wherein said supporting member comprises a magnet.

4. A disc unit as claimed in claim 1, wherein said disc has a central hole and an eccentric hole; wherein said drive motor further comprises a spindle shaft extending through the center of said rotor yoke for engagement with the central hole of said disc; wherein said drive pin engages the eccentric hole of said disc to transmit rotational force to said disc; and wherein said chucking means further comprises a chucking magnet disposed on said rotor yoke for attracting said disc.

5. A disc unit as claimed in claim 4, wherein said drive pin is movable between protruding and withdrawn positions with respect to said top surface of said rotor yoke; and wherein said chucking means further comprises means for urging said drive pin toward said protruding position.

6. A disc unit as claimed in claim 5, wherein said rotor yoke extends in a radial direction, and wherein said drive pin is also movable in the radial direction of said rotor yoke.

7. A disc unit for recording information on or reading information from a disc serving as a recording medium, said disc having a central hub, said hub having a center hole and an offset opening which is offset from said center hole in a radial direction of said recording medium, comprising:

a drive motor for rotating said disc at least when information is being recorded or read, said drive motor including
   a center spindle shaft which fits in said center hole of said hub,
   a stator yoke having a drive coil,
   a rotor yoke which is fixed to said spindle shaft, said rotor yoke having a bottom surface and having a top surface on which said disc is received, said rotor yoke additionally having an opening offset from said spindle shaft,
   a magnet mounted on said rotor yoke to generate a rotational force in cooperation with said drive coil, and
   chucking means, provided integrally with said rotor yoke, for chucking and holding said disc on said top surface of said rotor yoke to rotate said disc along with said rotor yoke, said chucking means including a supporting member provided on said bottom surface of said rotor yoke and a drive pin which is movably supported by said supporting member so as to project from said top surface of said rotor yoke through said opening in said rotor yoke and to engage said offset opening in said hub of said disc when said disc is mounted on said top surface of said rotor yoke.

8. A disc unit as claimed in claim 7, further comprising:

a base body for supporting constituent members of said unit;

a control circuit board which is provided with a control circuit for said disc unit; and a cover member mounted on said base body to provide noise shielding, said control circuit board being interposed between said cover member and said base body so that said control circuit board is supported by said base body, and said control circuit board being disposed around said stator yoke at the bottom surface of said base body.

9. A disc unit as claimed in claim 8, further comprising an enclosure in which said drive motor is disposed, said enclosure including said base body, said base body having spaced-apart side walls and said cover member joined to said side walls, a head carriage mounted in said enclosure for radial movement with respect to said disc, a head carried by said head carriage, means for selectively moving said head carriage radially, and loading means for moving said head in a direction substantially normal to said disc.

10. A disc unit as claimed in claim 7, wherein said drive motor is a direct drive motor.

11. A disc unit as claimed in claim 10, wherein said chucking means further comprises urging means for urging said drive pin radially with respect to said hub.

12. A disc unit as claimed in claim 11, wherein said hub comprises a portion formed of a magnetic material, wherein said supporting member is formed of a magnetic material, said drive pin being provided on said supporting member, wherein said chucking means further comprises a magnet formed integrally with said rotor yoke, and wherein said hub is magnetically attracted by said magnet as well as said supporting member to allow said drive pin to be urged.

13. A disc unit as claimed in claim 11, wherein said supporting member is formed of a magnet, said drive pin being fixed to said supporting member, said supporting member being arranged to allow said drive pin to be urged radially with respect to said hub by utilizing magnetic force to attract said supporting member to said rotor yoke.

14. A disc unit as claimed in claim 13, wherein said hub comprises a portion formed of a magnetic material, and wherein said chucking means further comprises a magnet for attracting said hub to said rotor yoke.

* * * * *